US012259883B2

(12) United States Patent
Park et al.

(10) Patent No.: US 12,259,883 B2
(45) Date of Patent: Mar. 25, 2025

(54) ROW DISPERSAL ACROSS PARALLELIZED PROCESSES DURING QUERY EXECUTION BASED ON FORWARDING DATA BLOCKS

(71) Applicant: Ocient Holdings LLC, Chicago, IL (US)

(72) Inventors: Andrew Park, St. Charles, IL (US); Jason Arnold, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/329,019

(22) Filed: Jun. 5, 2023

(65) Prior Publication Data

US 2024/0403293 A1 Dec. 5, 2024

(51) Int. Cl.
*G06F 16/2453* (2019.01)

(52) U.S. Cl.
CPC .. *G06F 16/24532* (2019.01); *G06F 16/24544* (2019.01)

(58) Field of Classification Search
CPC .............. G06F 16/24532; G06F 16/24544
See application file for complete search history.

(56) References Cited

U.S. PATENT DOCUMENTS

| | | |
|---|---|---|
| 5,548,770 A | 8/1996 | Bridges |
| 6,230,200 B1 | 5/2001 | Forecast |
| 6,633,772 B2 | 10/2003 | Ford |
| 7,499,907 B2 | 3/2009 | Brown |
| 7,908,242 B1 | 3/2011 | Achanta |
| RE42,664 E * | 8/2011 | Hallmark ............... G06F 9/466 709/200 |
| 2001/0051949 A1 | 12/2001 | Carey |
| 2002/0032676 A1 | 3/2002 | Reiner |
| 2004/0162853 A1 | 8/2004 | Brodersen |
| 2008/0133456 A1 | 6/2008 | Richards |
| 2009/0063893 A1 | 3/2009 | Bagepalli |
| 2009/0183167 A1 | 7/2009 | Kupferschmidt |
| 2010/0082577 A1 | 4/2010 | Mirchandani |
| 2010/0241646 A1 | 9/2010 | Friedman |
| 2010/0274983 A1 | 10/2010 | Murphy |

(Continued)

OTHER PUBLICATIONS

A new high performance fabric for HPC, Michael Feldman, May 2016, Intersect360 Research.

(Continued)

*Primary Examiner* — Mark D Featherstone
*Assistant Examiner* — Kweku William Halm
(74) *Attorney, Agent, or Firm* — Garlick & Markison; Katherine C. Stuckman; Bruce E. Stuckman

(57) ABSTRACT

A database system is operable to execute a row dispersal operator, in conjunction with execution of a query operator execution flow for a corresponding query, to disperse a plurality of input rows across the set of parallelized operations based on determining a plurality of input data blocks that collectively includes the plurality of input rows, where each input data block in the plurality of input data blocks a corresponding proper subset of the plurality of input rows. Each data block of the plurality of input data blocks is assigned to a corresponding one of the set of parallelized operations for processing in accordance with a uniform assignment scheme, and each data block is forwarded to the corresponding one of the set of parallelized operations by reference.

17 Claims, 52 Drawing Sheets

(56) References Cited

U.S. PATENT DOCUMENTS

| | | | |
|---|---|---|---|
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | McWilliams |
| 2013/0318068 | A1* | 11/2013 | Apte ................. G06F 16/24532 707/718 |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2024/0143595 | A1* | 5/2024 | Bove .................... G06F 16/248 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy . . . com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37 node 37

FIG. 20 query processing system 2510 query execution module 2504 database system 10 query execution module 2504 database system 10 join process 2530 join process 2530

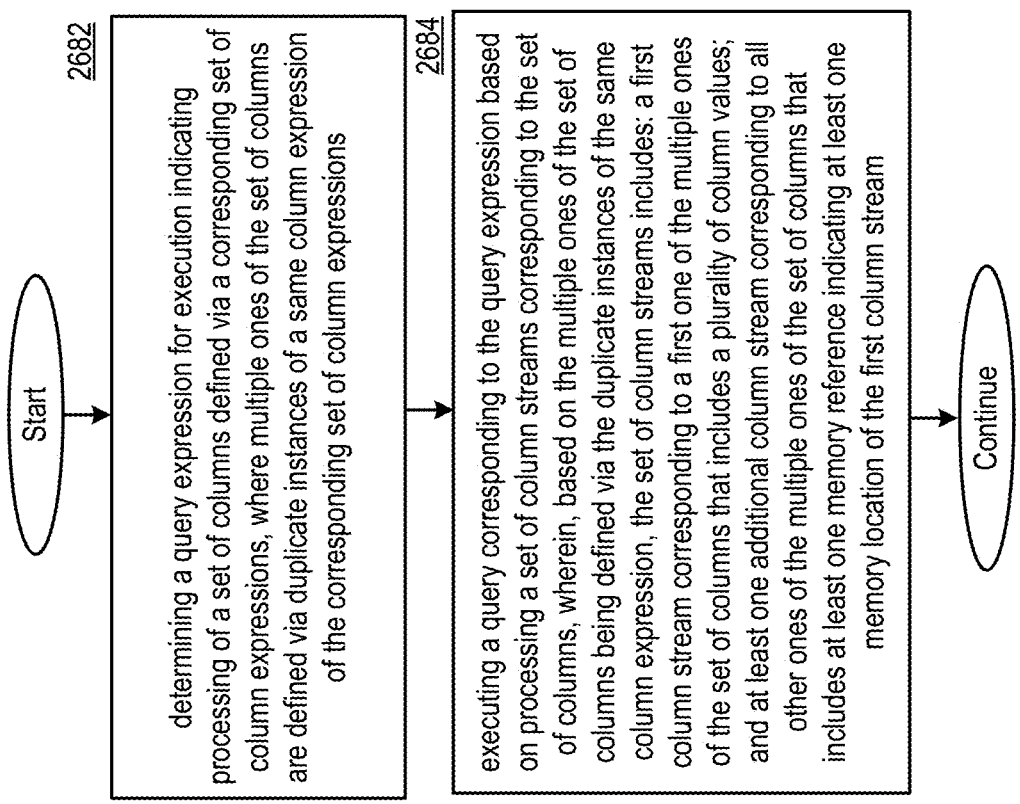

query execution module 2504 query execution module 2504 query execution module 2504 query execution module 2504

ROW DISPERSAL ACROSS PARALLELIZED PROCESSES DURING QUERY EXECUTION BASED ON FORWARDING DATA BLOCKS

CROSS-REFERENCE TO RELATED APPLICATIONS

None.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

FIG. 26B is a logic diagram illustrating a method for execution in accordance with various embodiments;

DETAILED DESCRIPTION OF THE INVENTION

Figure 1:
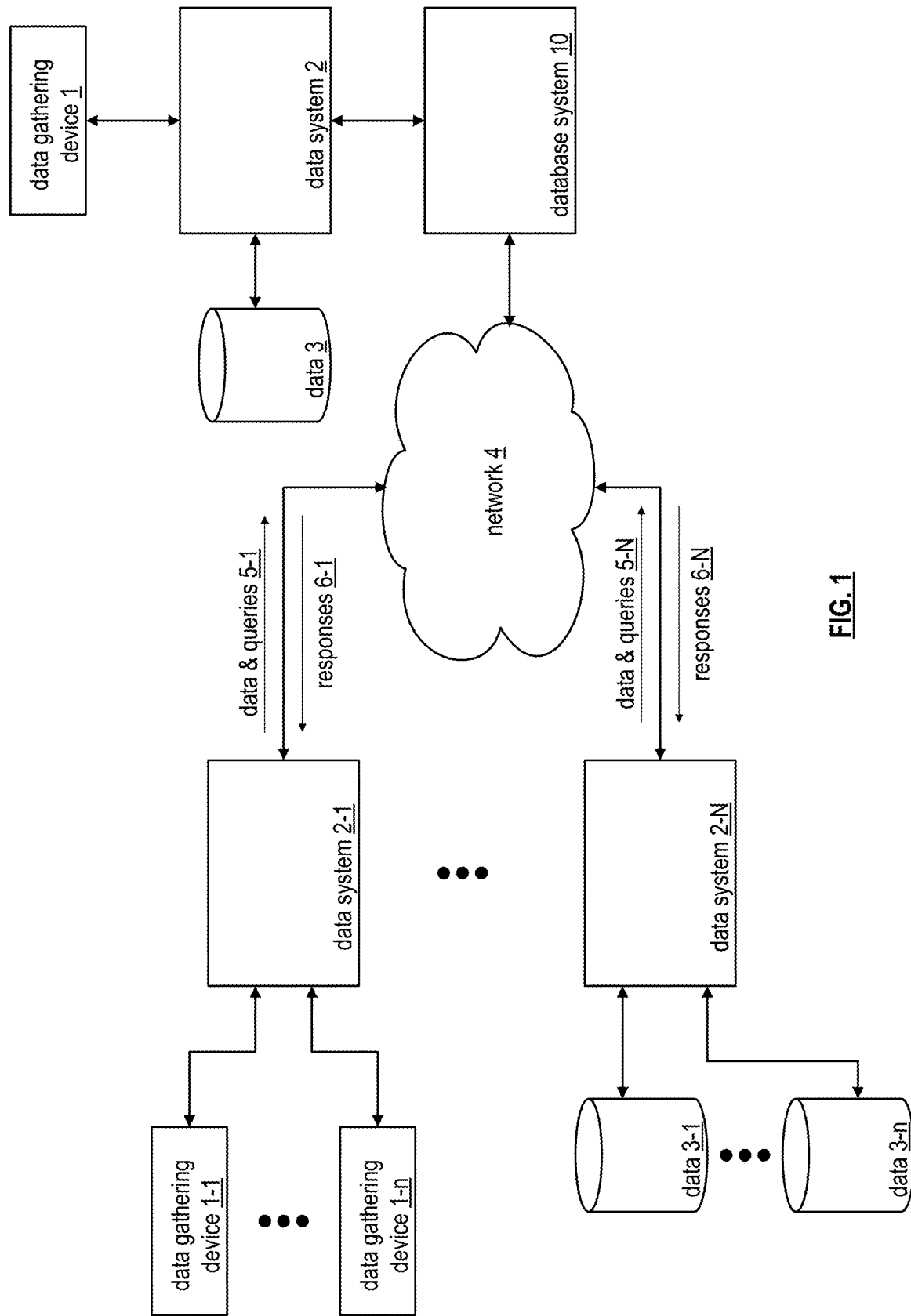
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
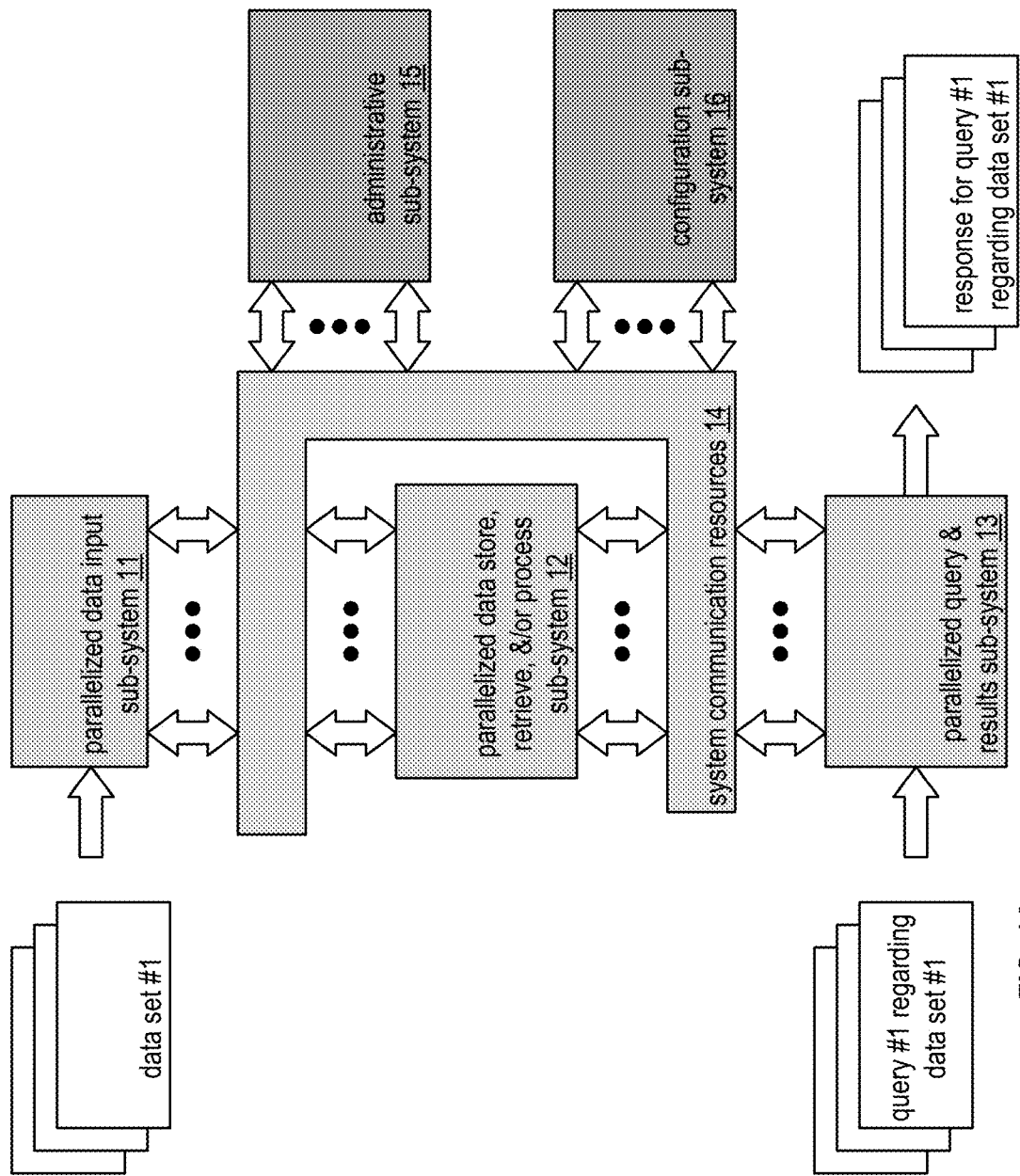
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
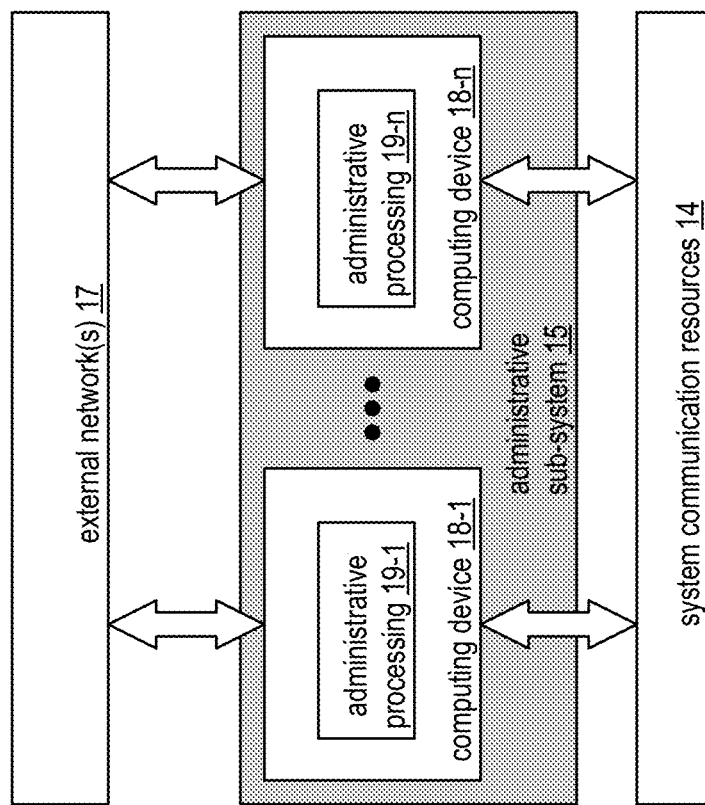
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
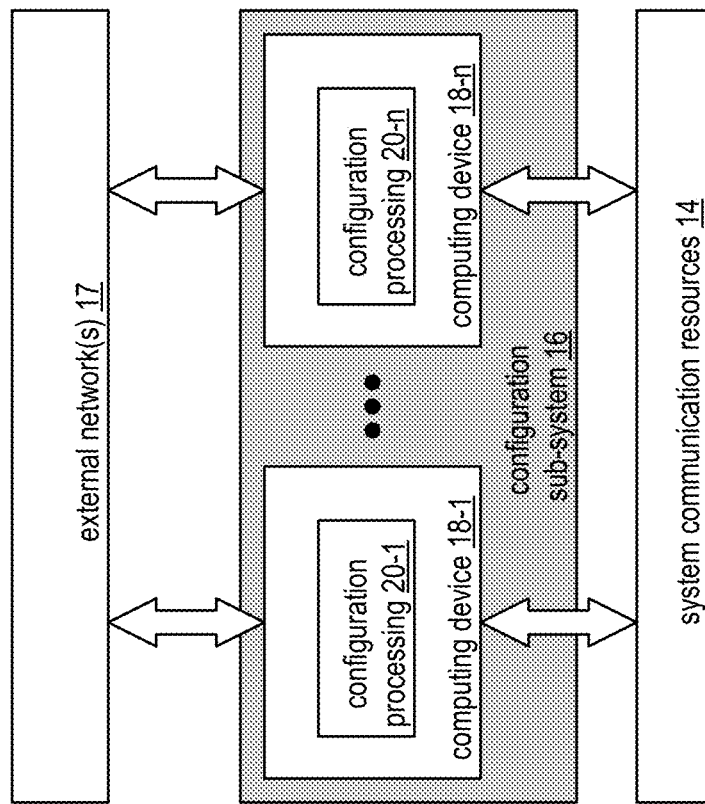
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
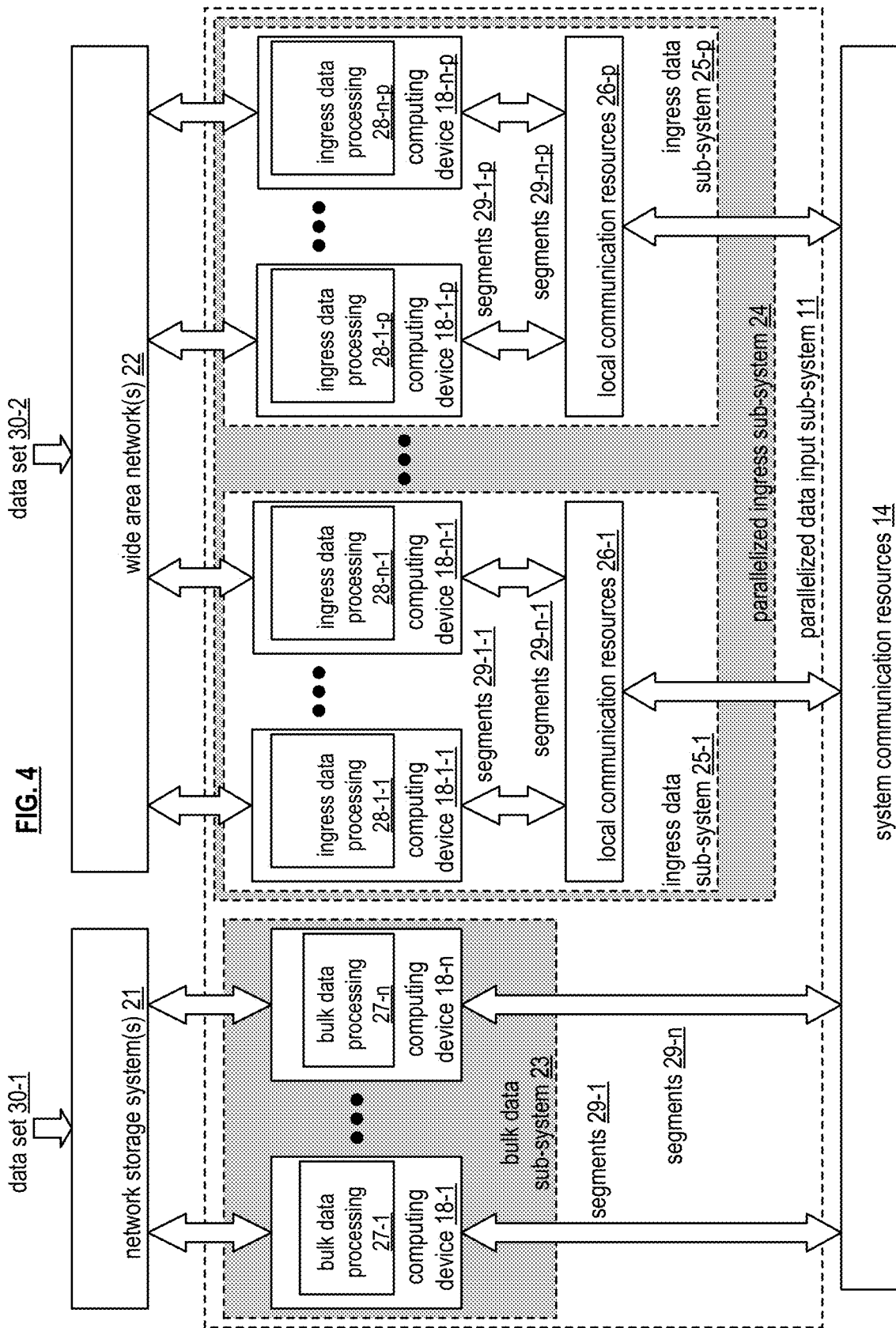
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
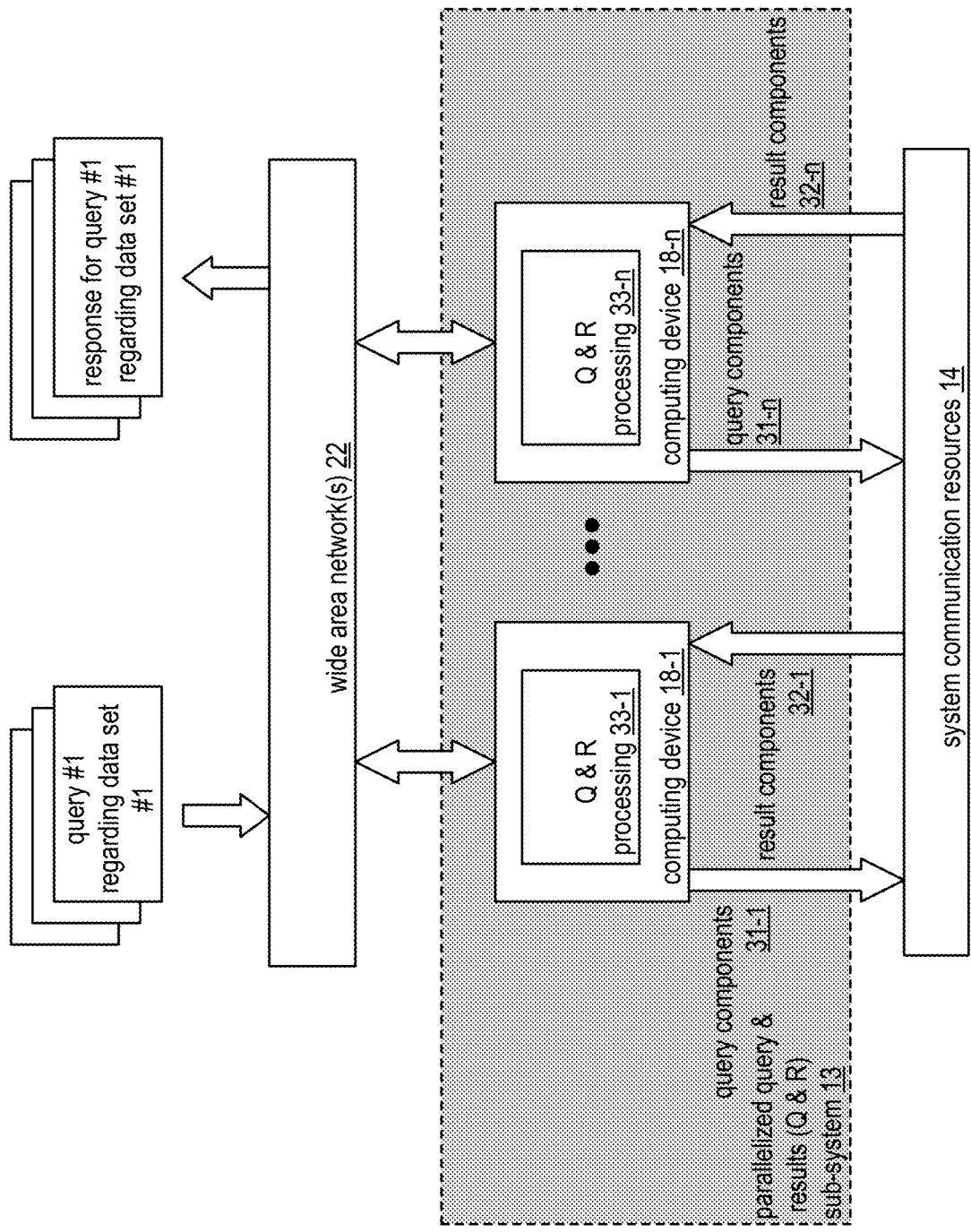
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
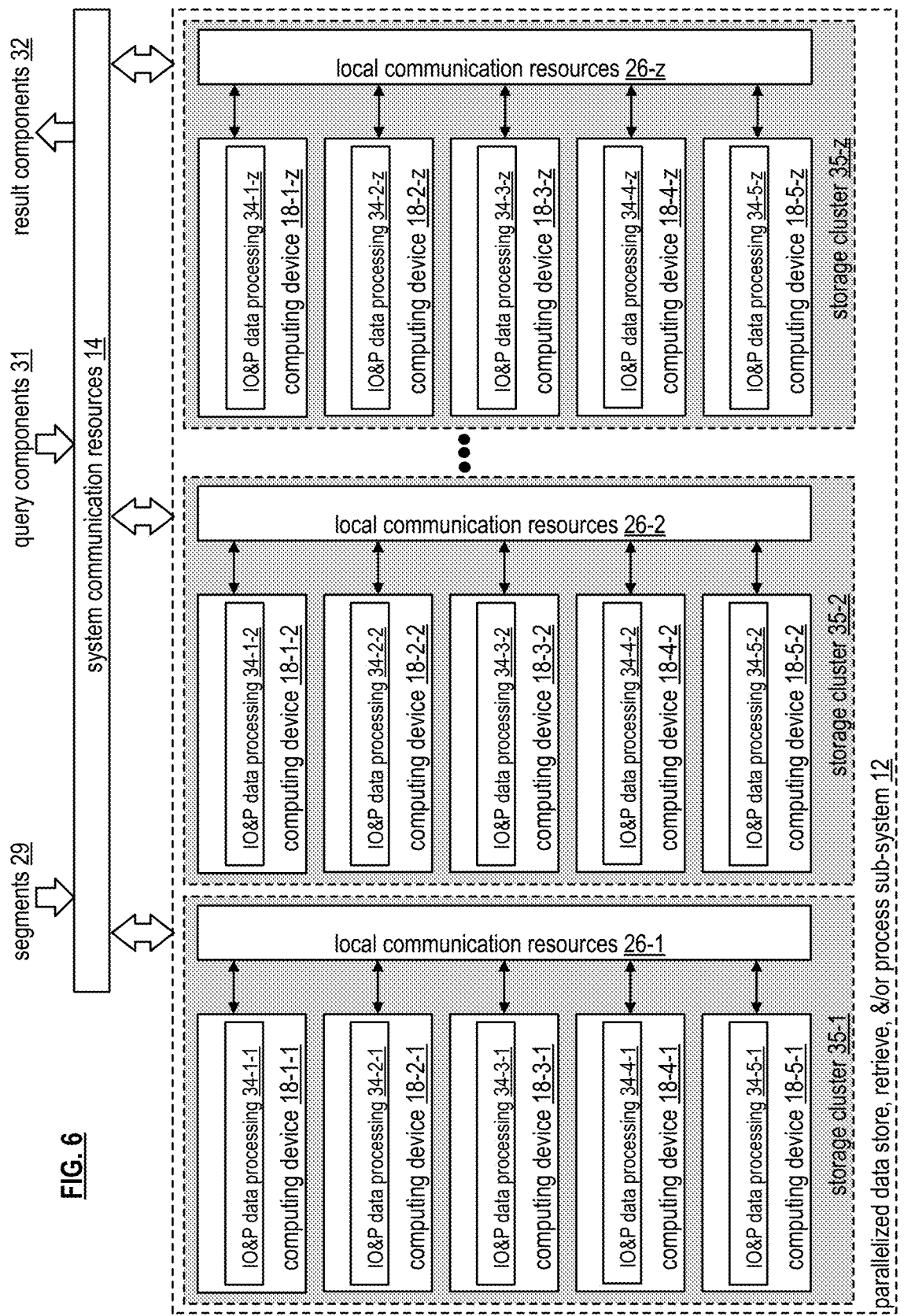
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5.

Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-*n* are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
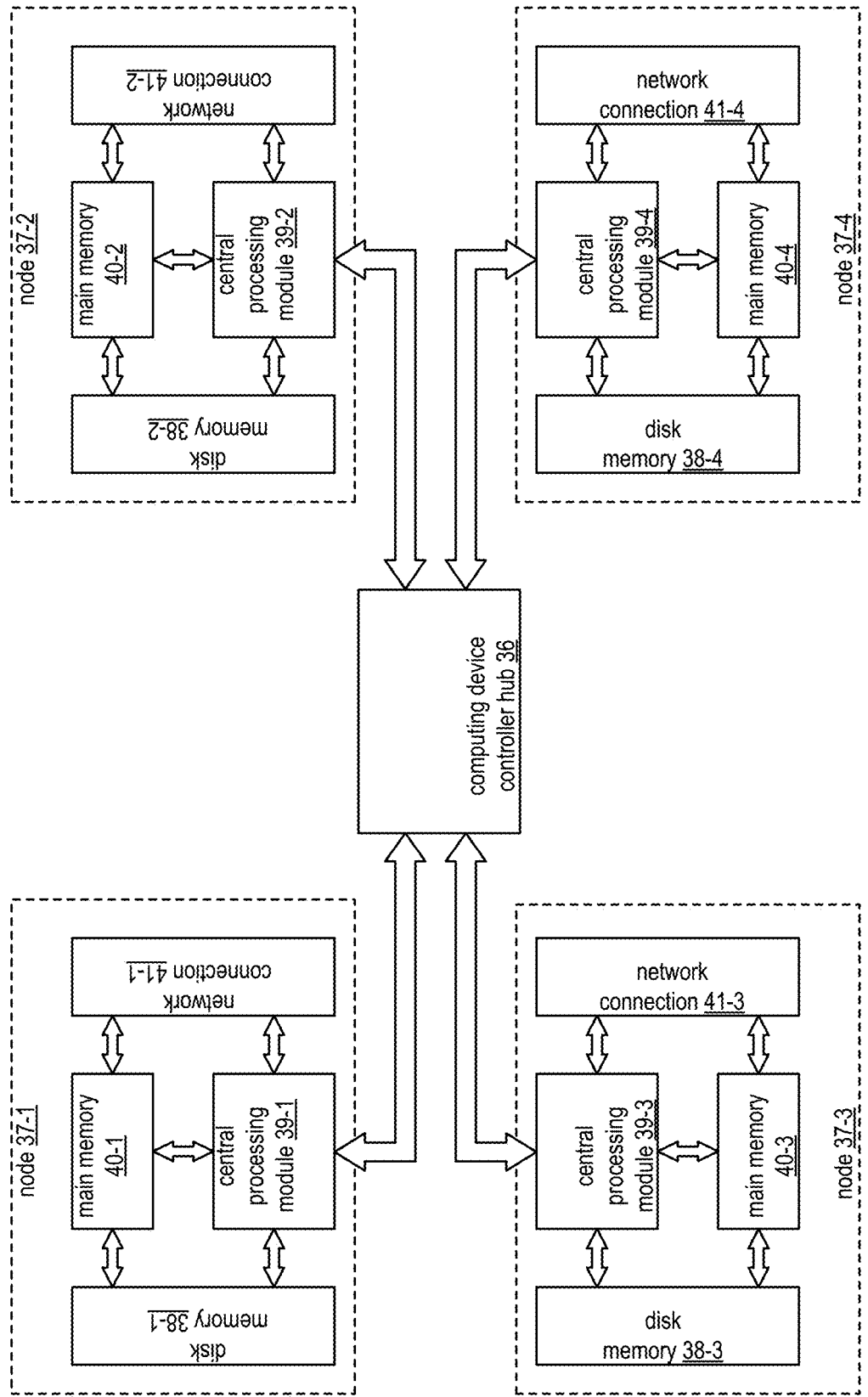
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
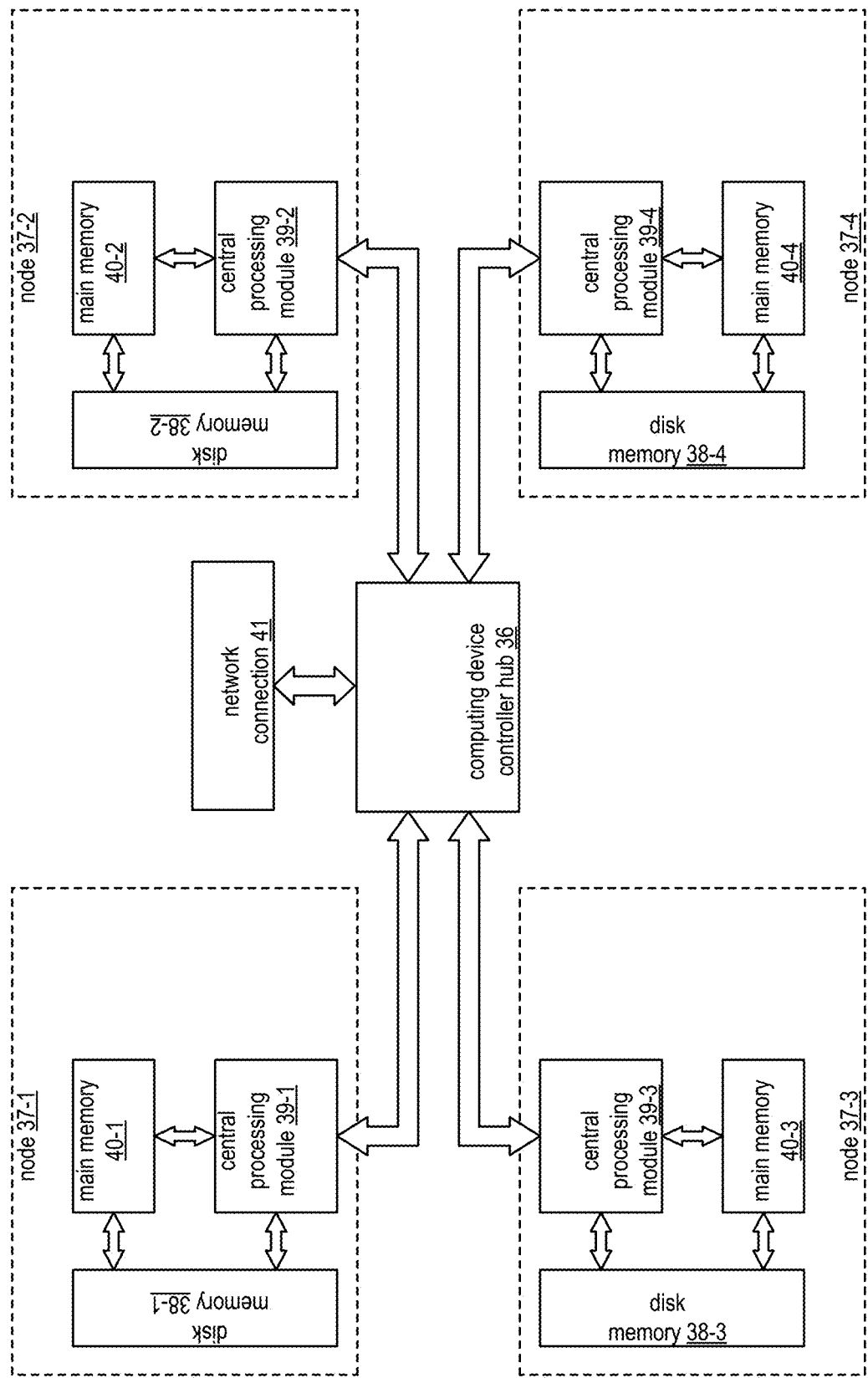
FIG. 8 is a schematic block diagram of another embodiment of a computing device in accordance with the present invention.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
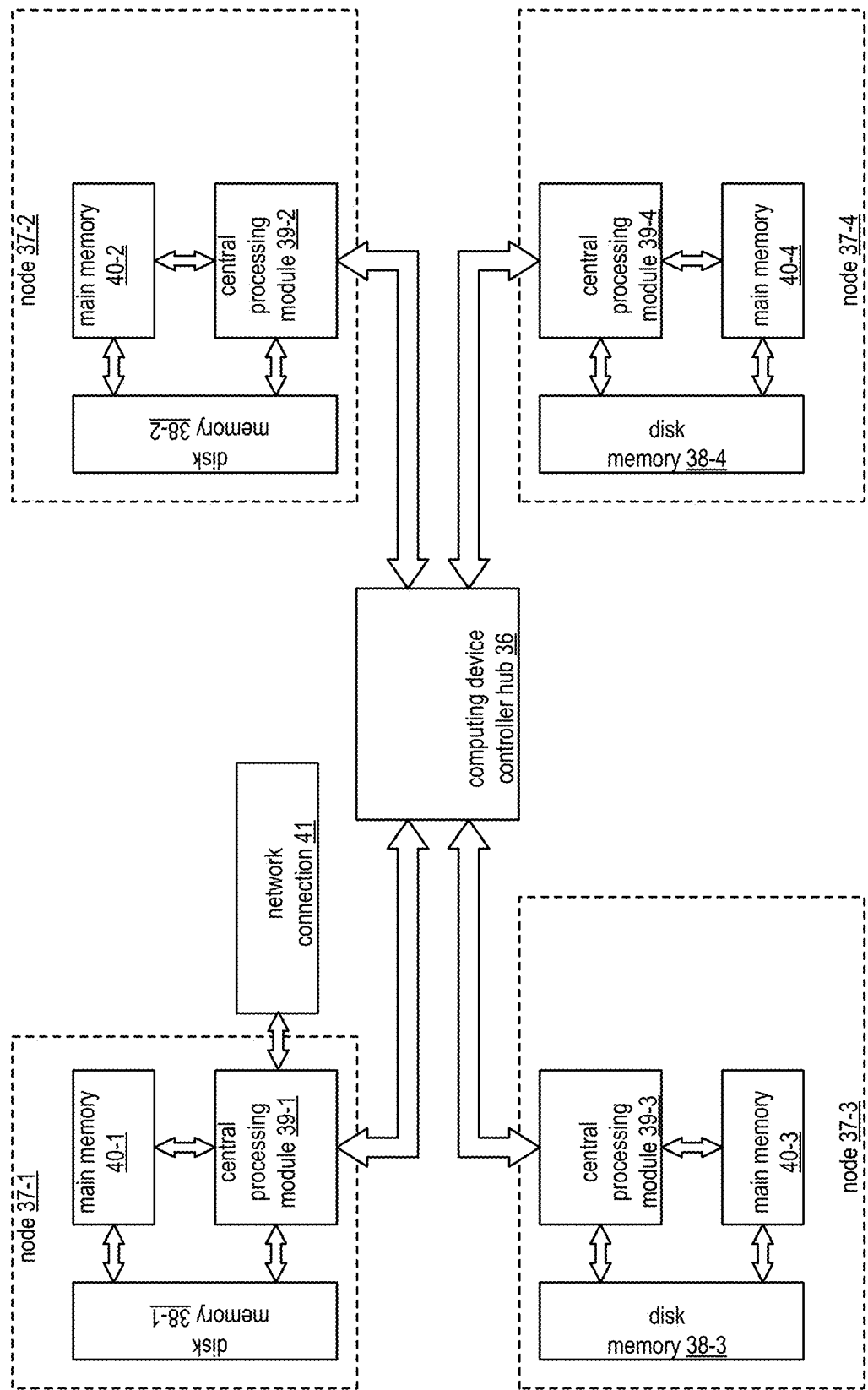
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
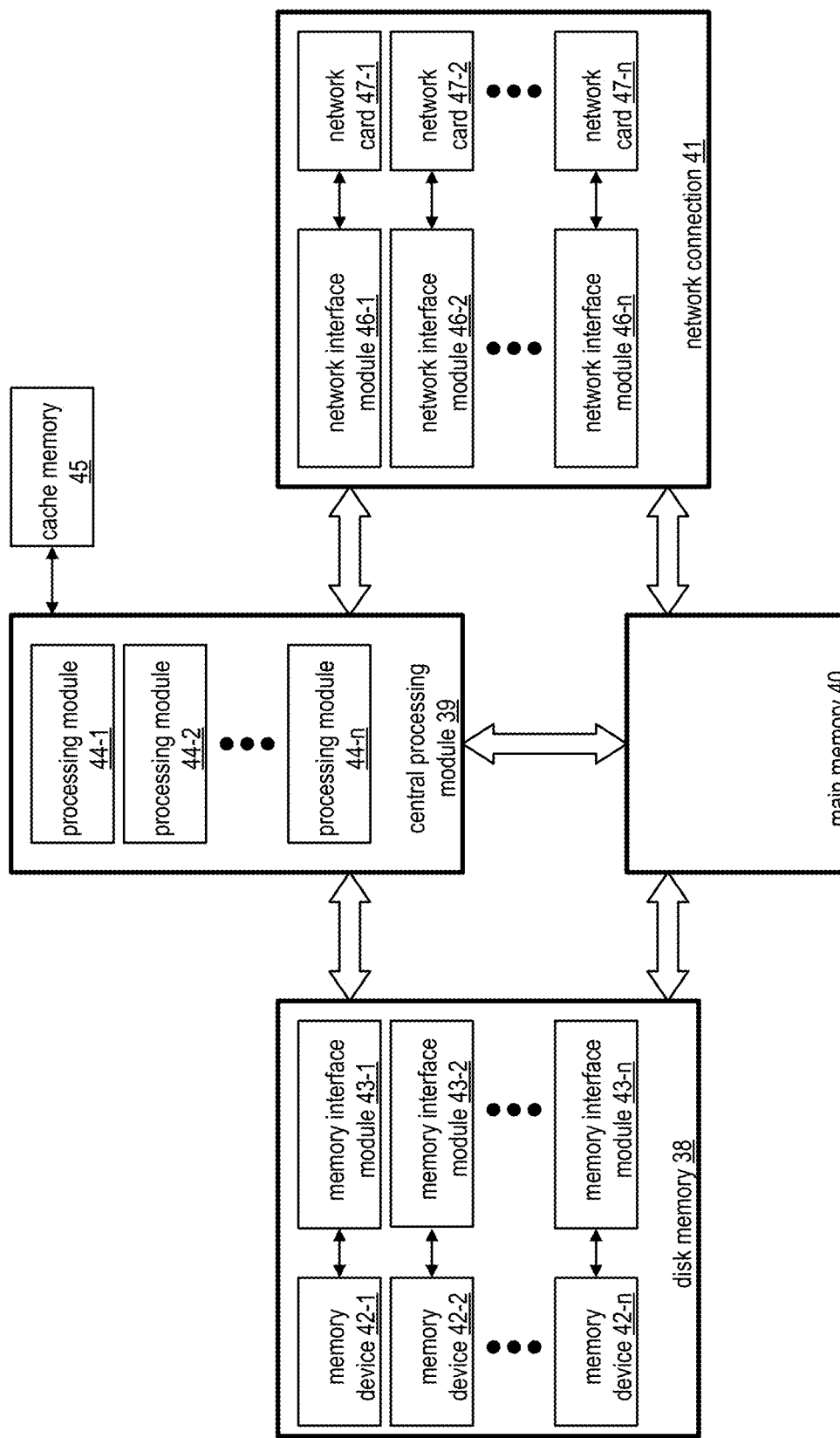
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-*n* and an associated one or more cache memory 45. A processing module is as defined at the end of the detailed description.

The disk memory 38 includes a plurality of memory interface modules 43-1 through 43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n* is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
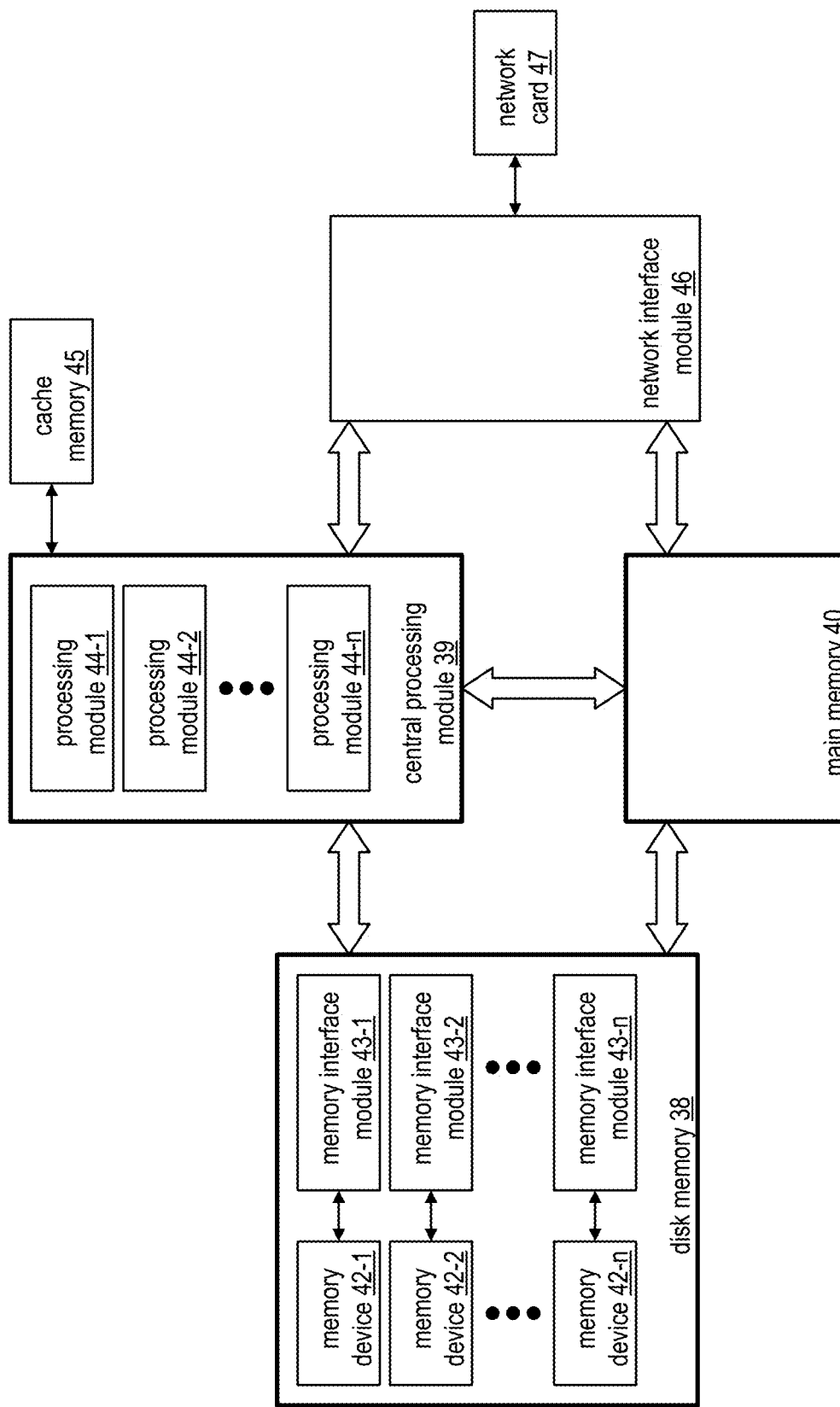
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
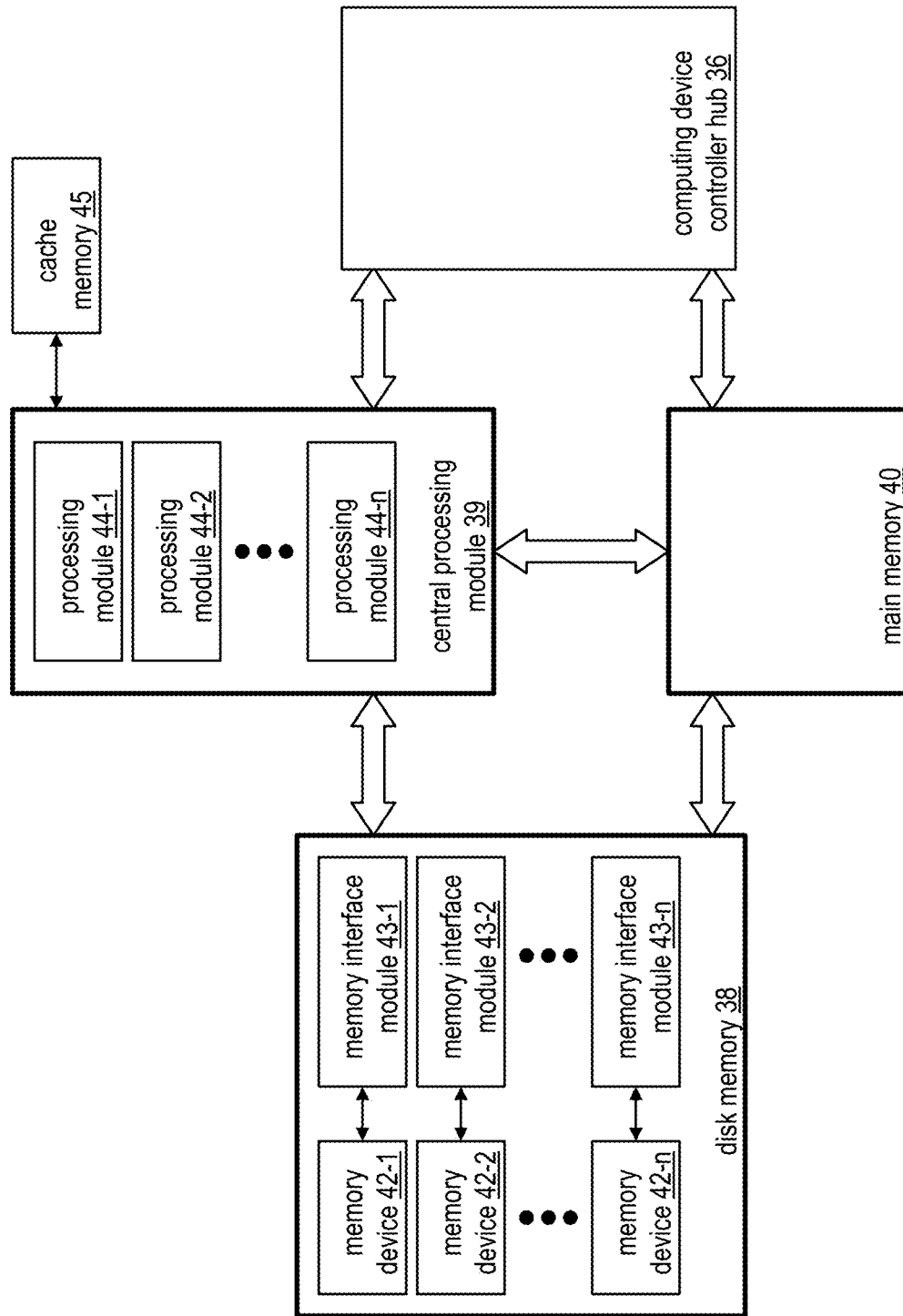
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
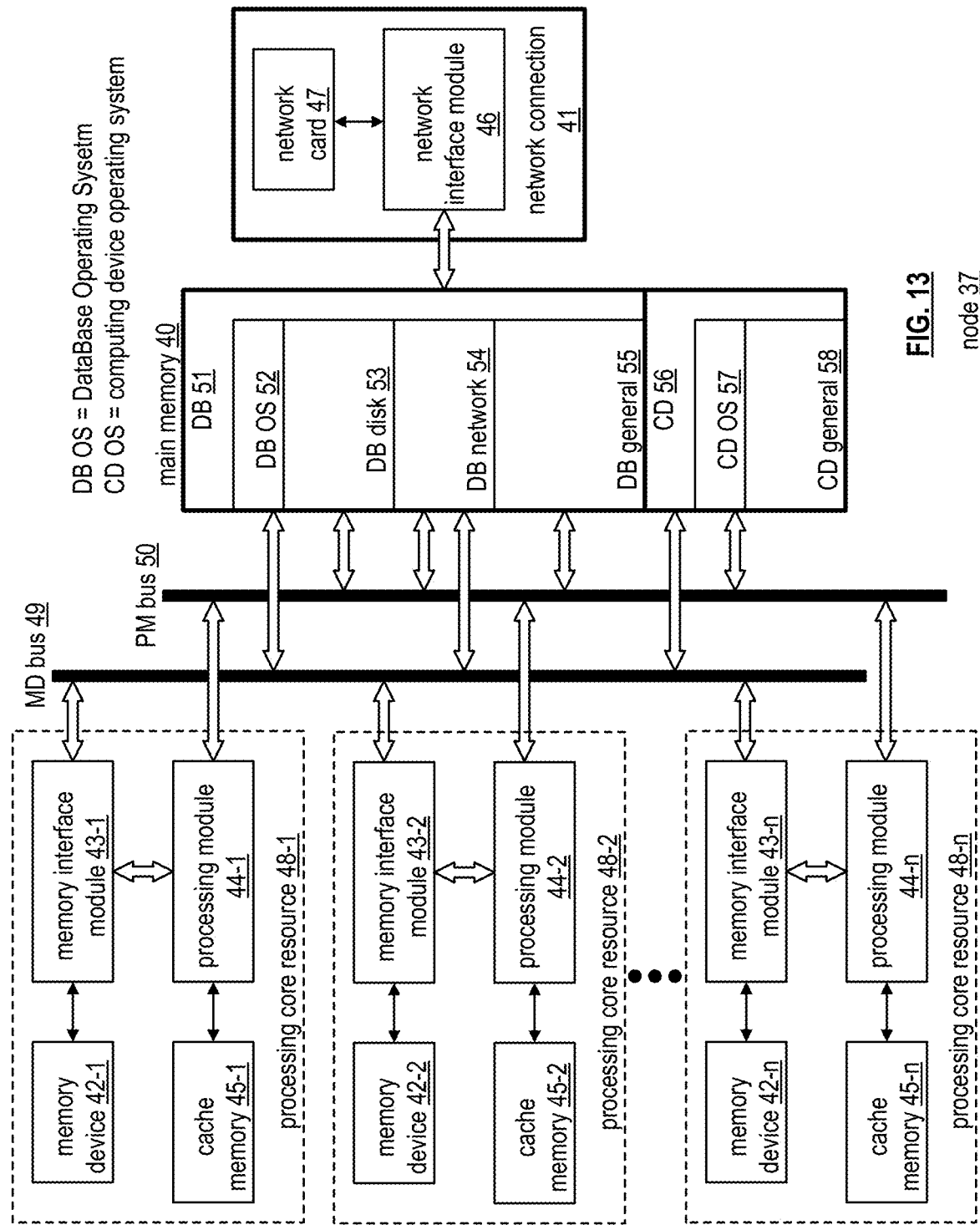
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-$n$, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-$n$, a corresponding memory interface module 43-1 through 43-$n$, a corresponding memory device 42-1 through 42-$n$, and a corresponding cache memory 45-1 through 45-$n$. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
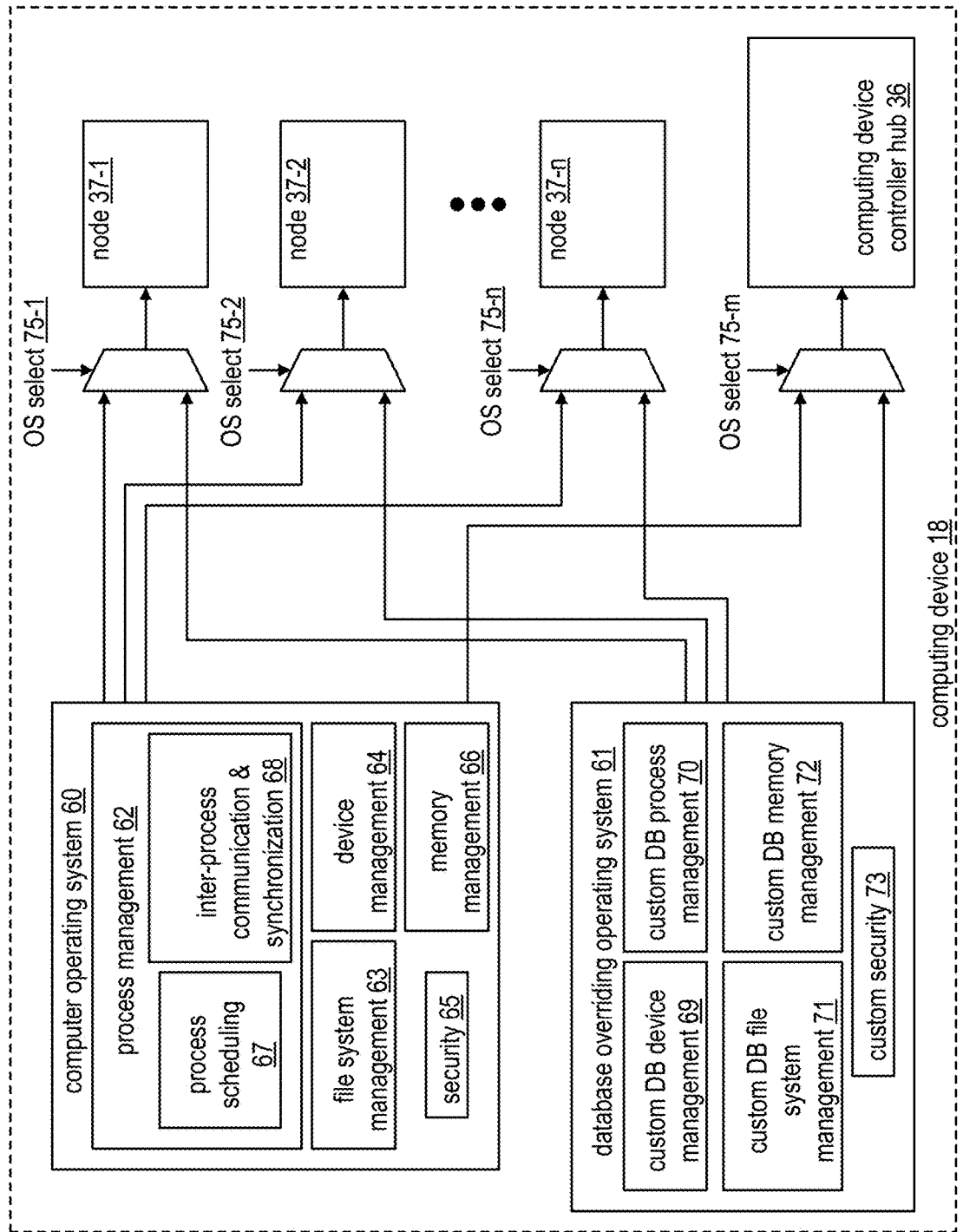
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-$n$ when communicating with nodes 37-1 through 37-$n$ and via OS select 75-$m$ when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
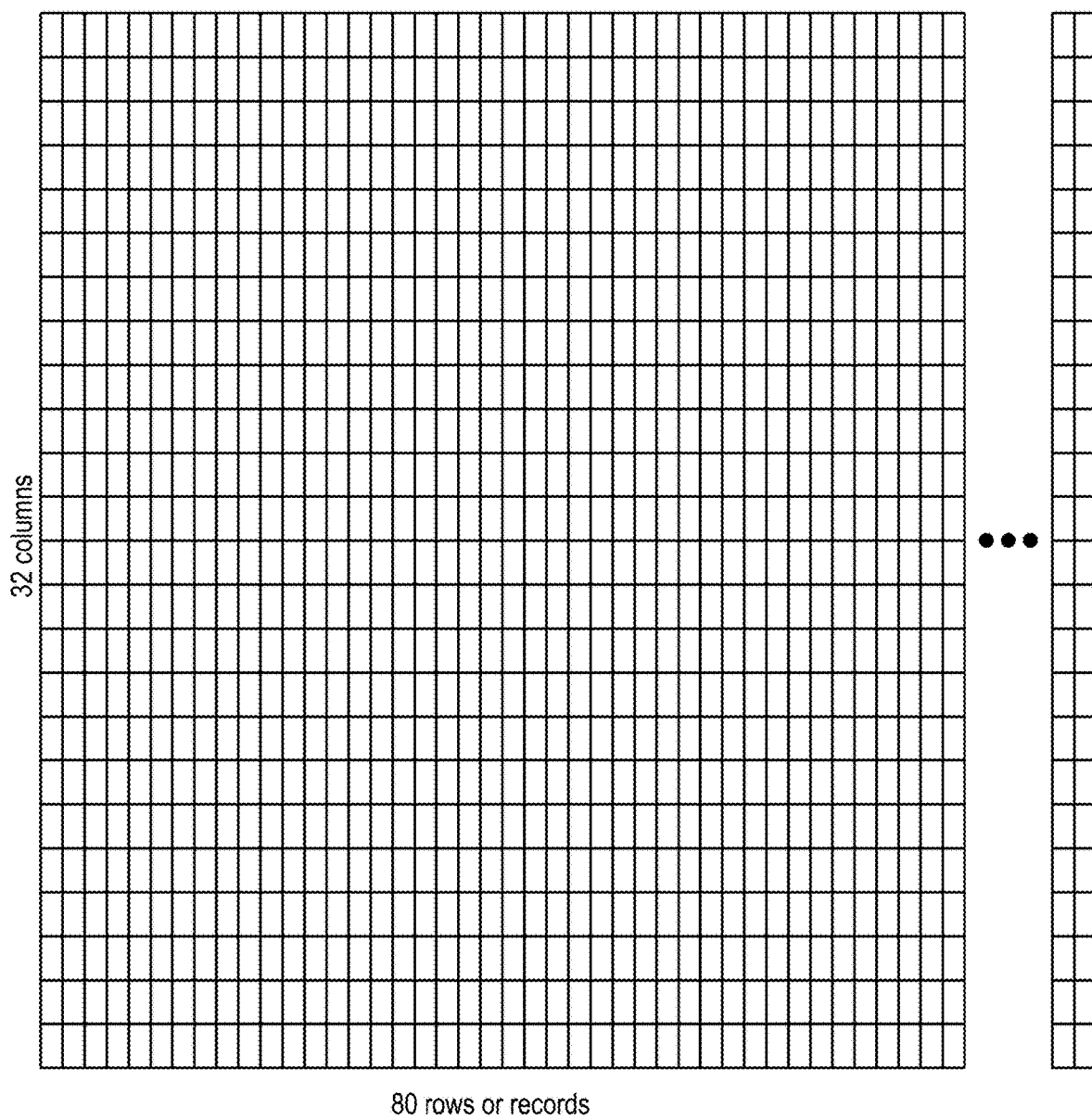

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
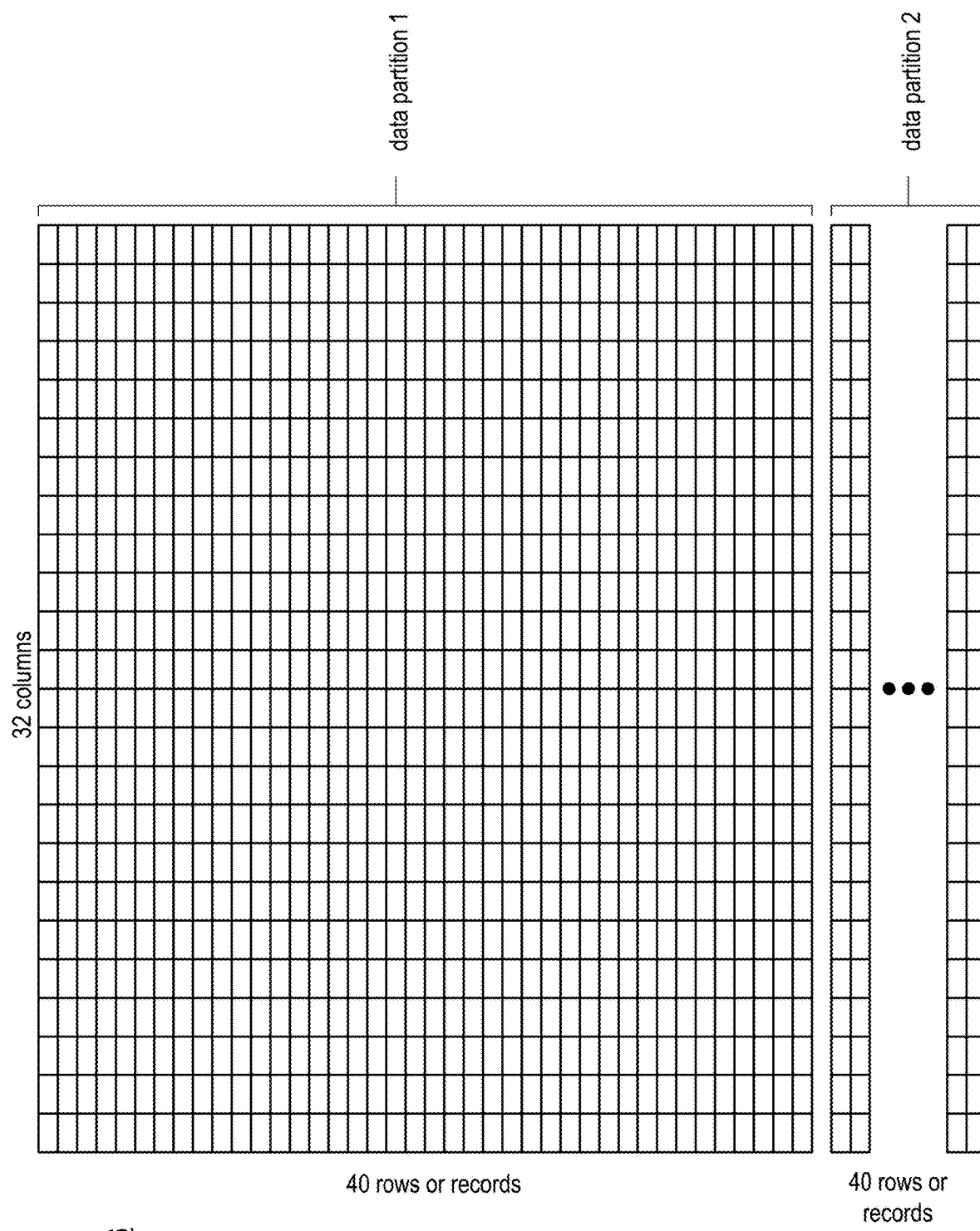

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
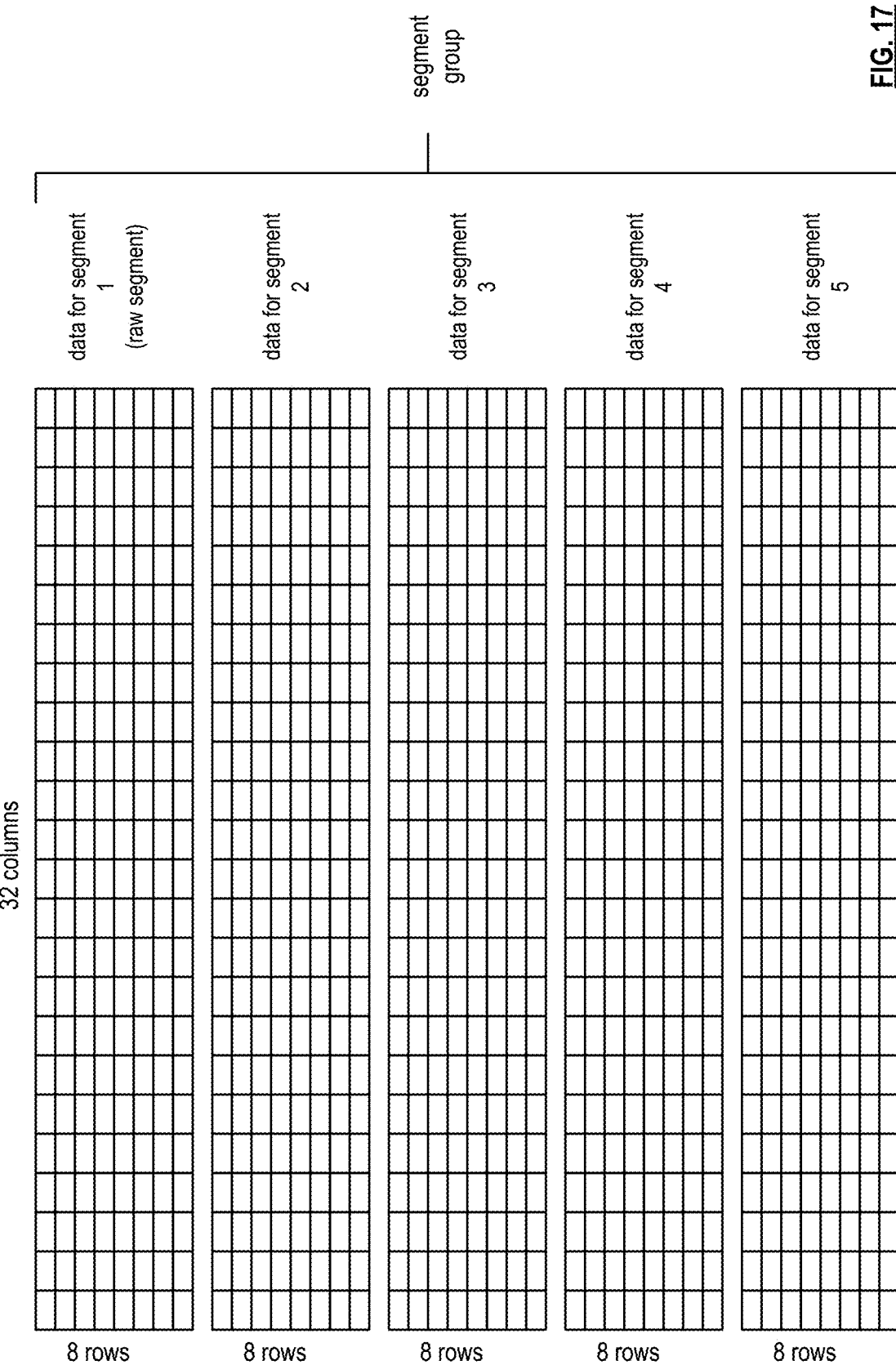

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
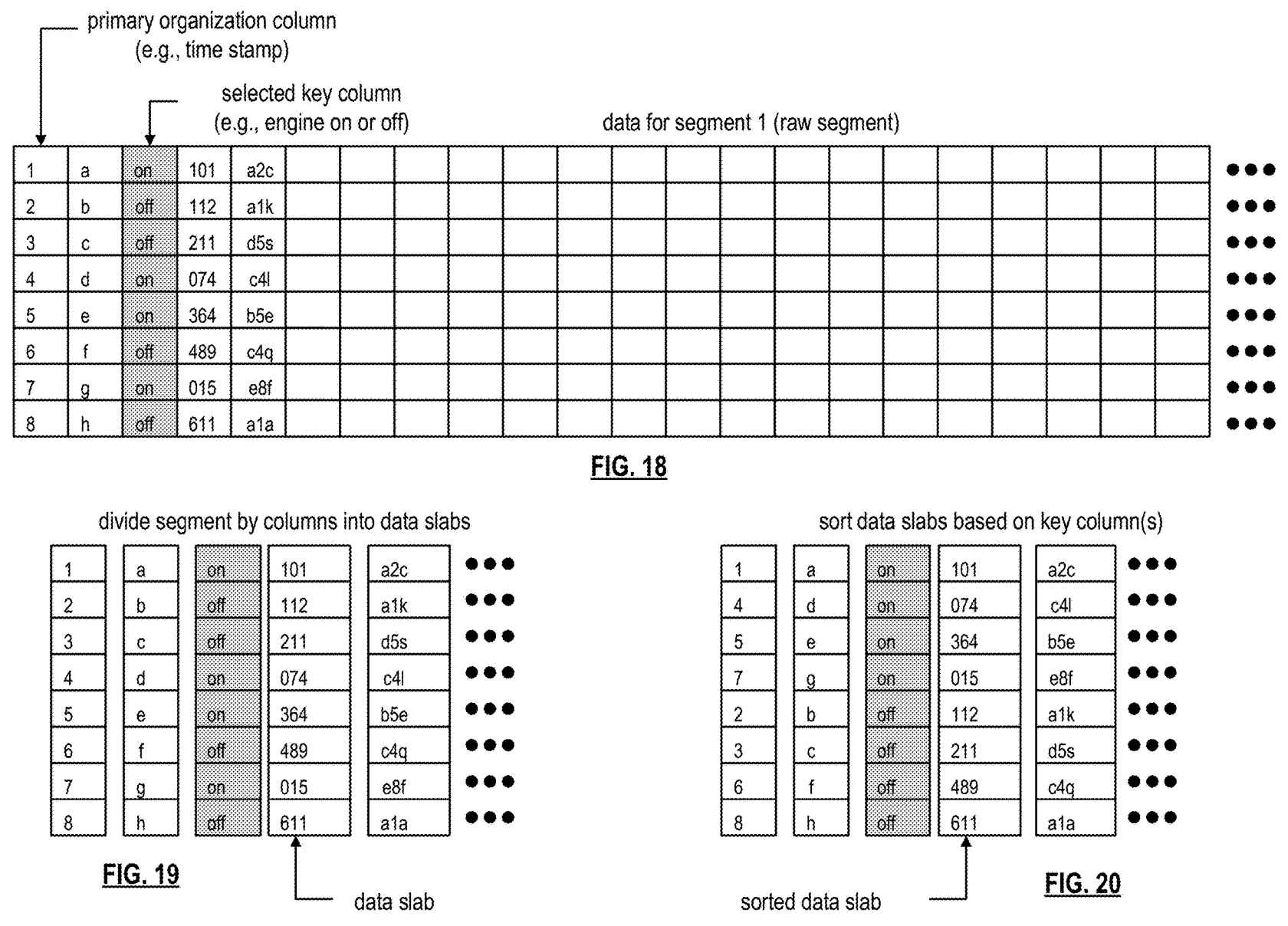

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
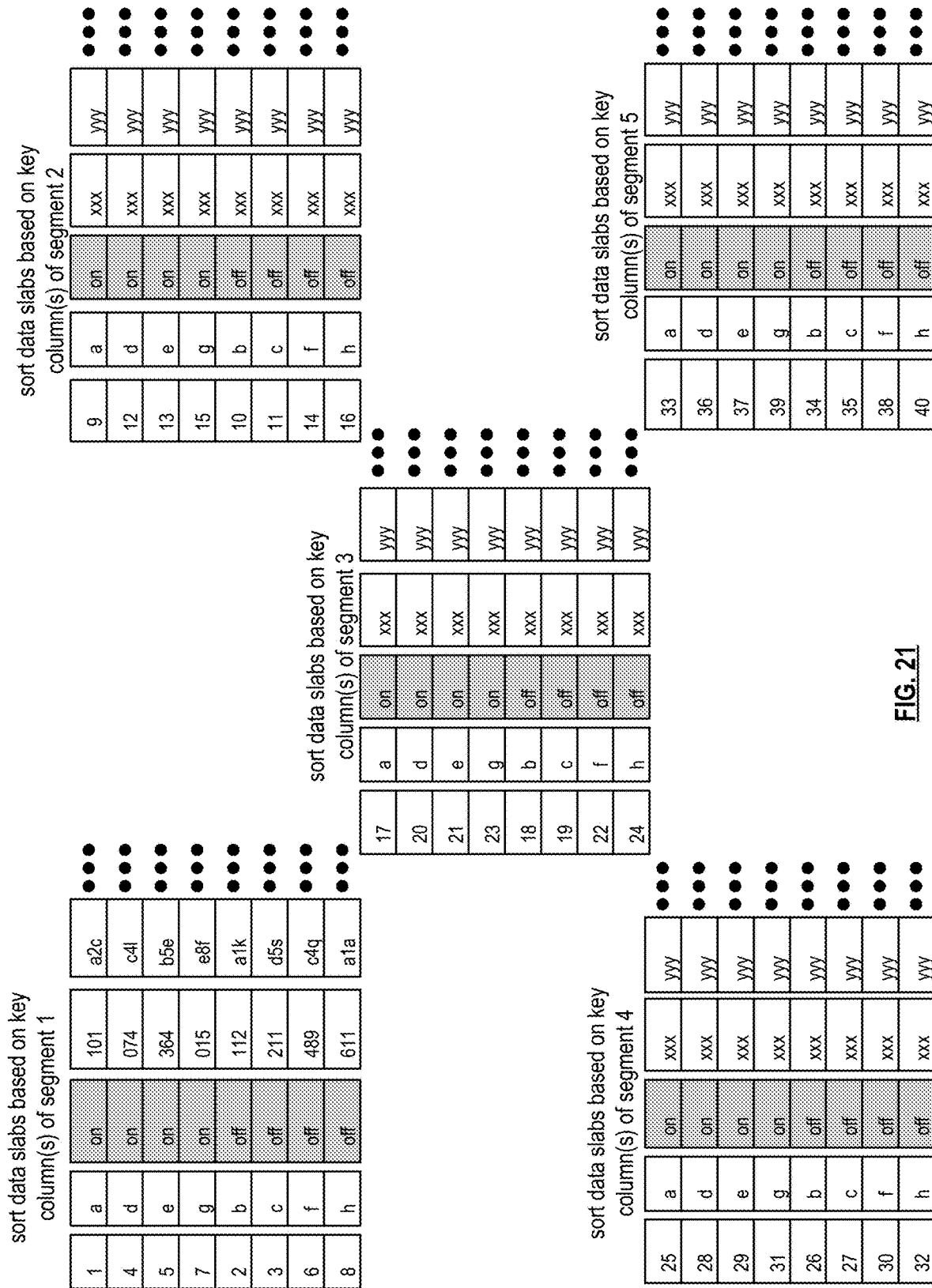

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
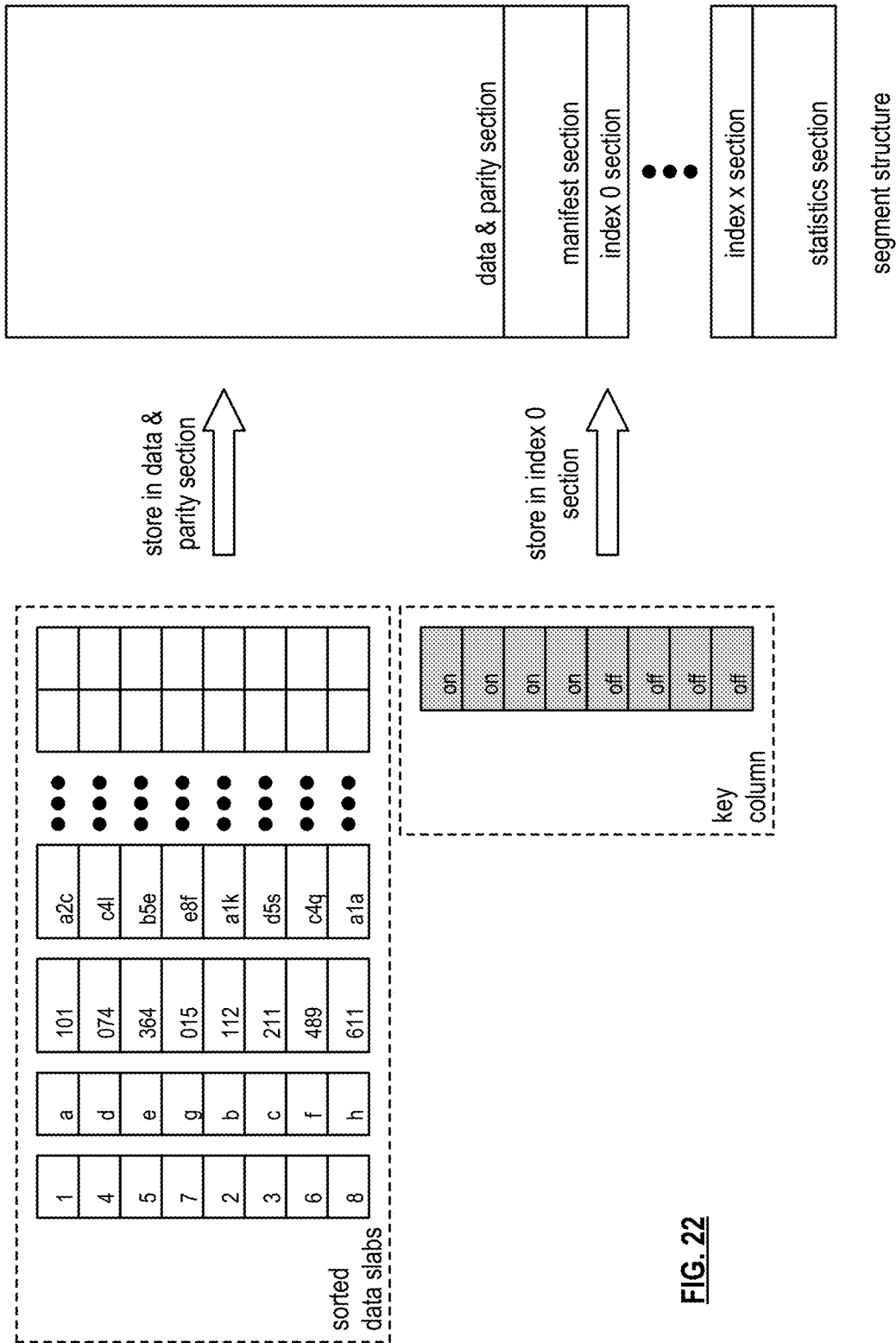

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
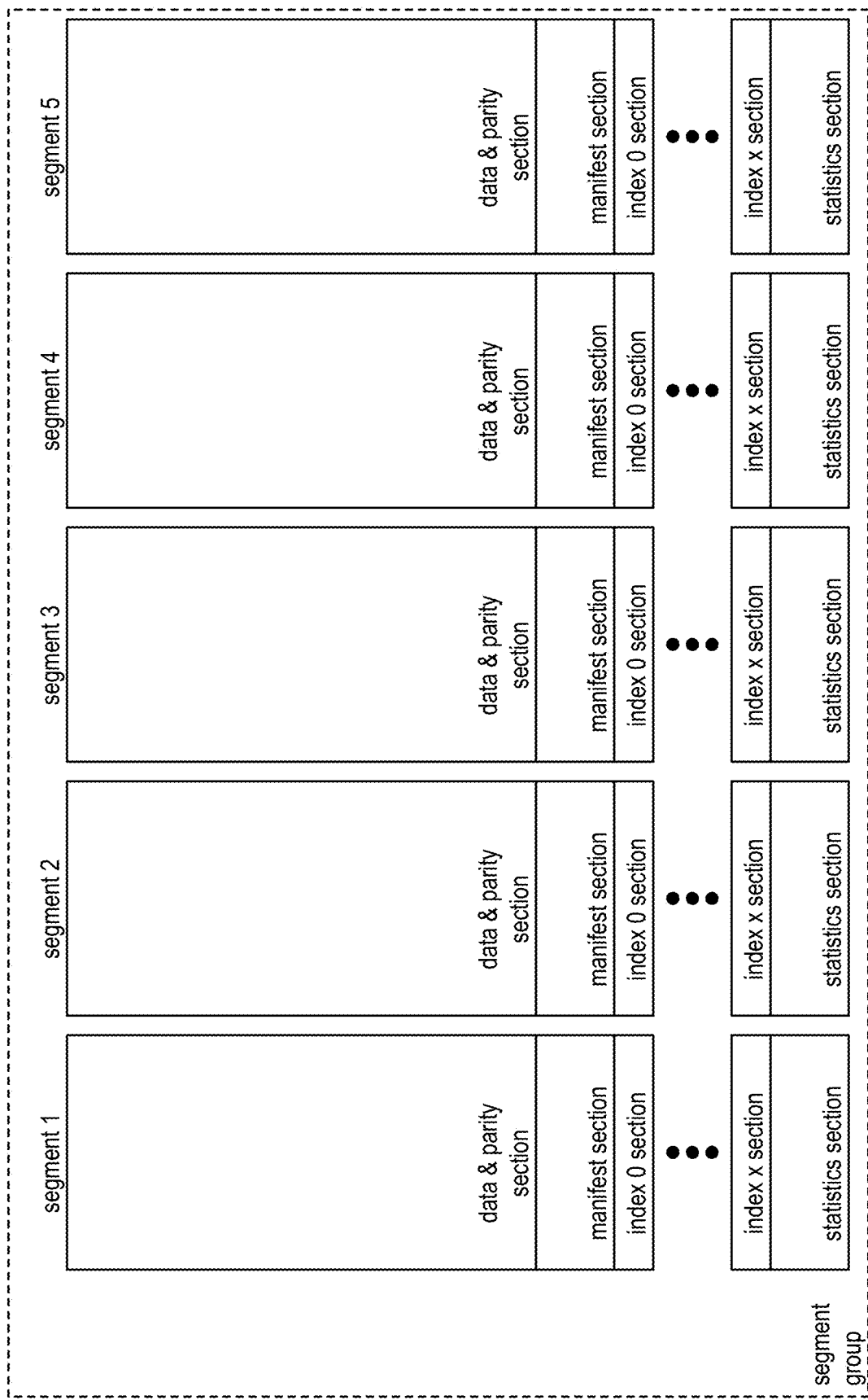

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
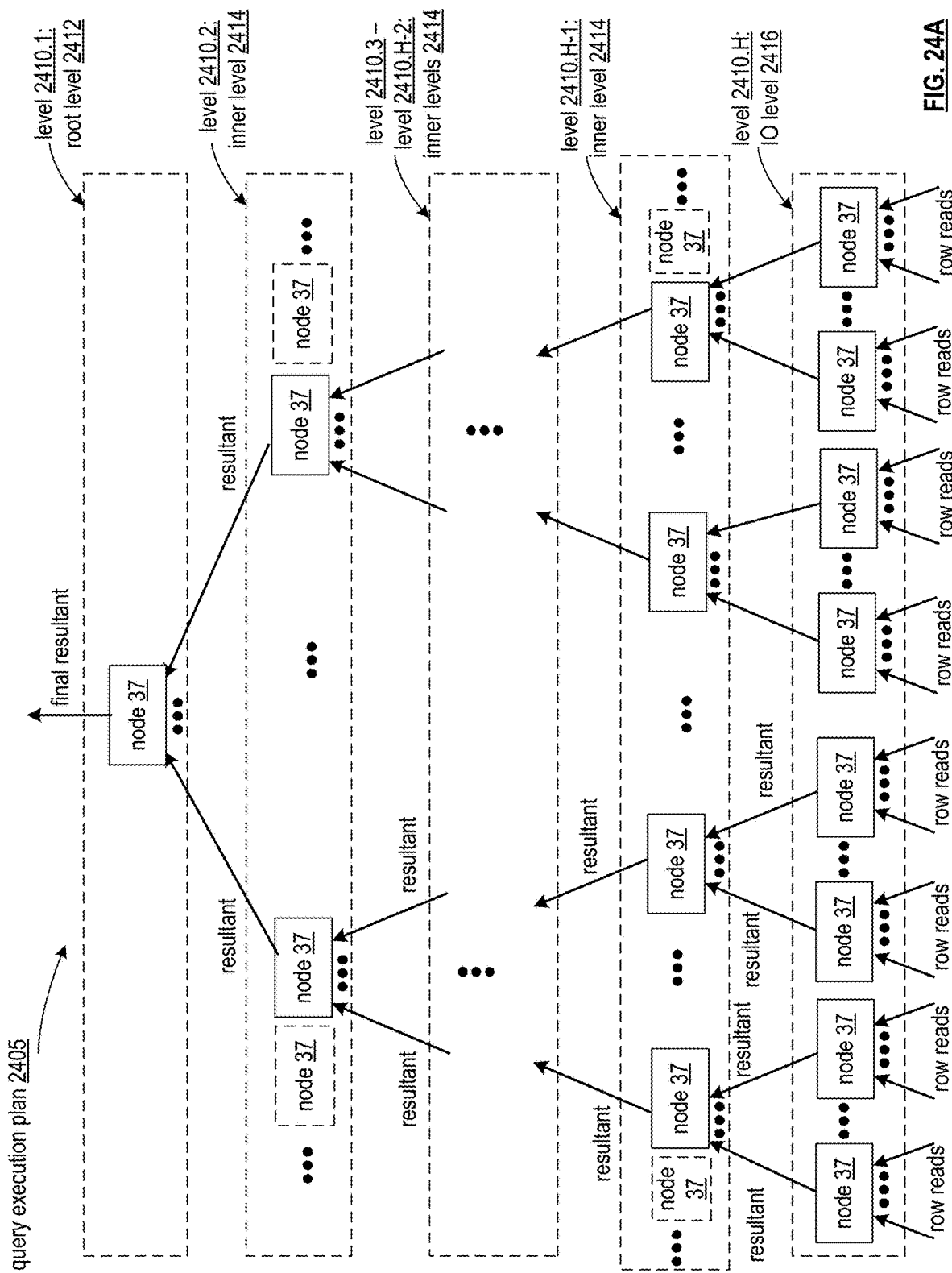
FIG. 24A is a schematic block diagram of a query execution plan in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level

2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
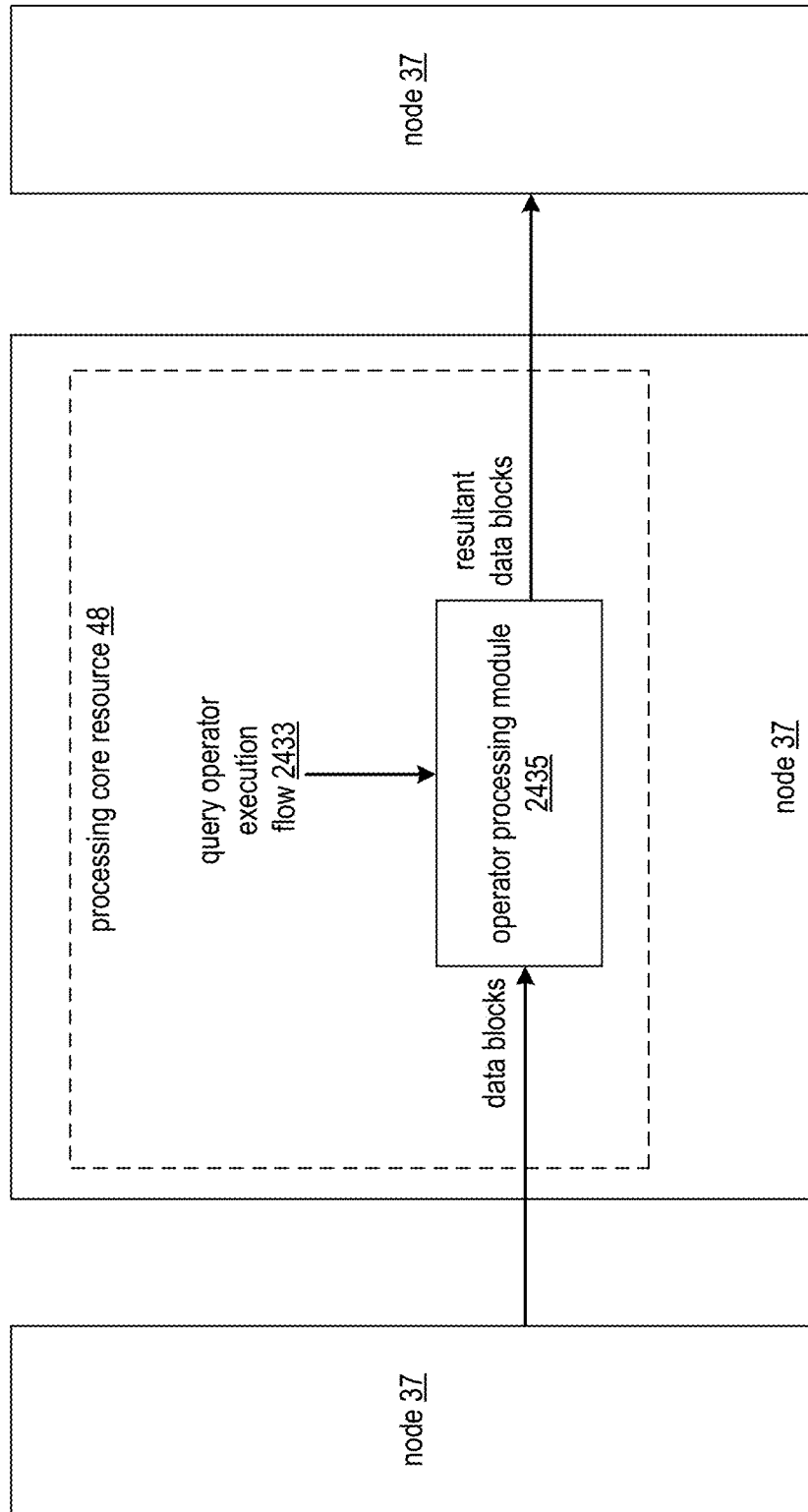
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing an operator processing module 2435. The operator processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes an operator processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2416 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2412 can be gathered into a final result of the query, for example, by the node 37 at root level 2412 if this inner level is the top-most inner level 2414 or the only inner level 2414. As another example, resultants generated by each of the plurality of nodes at this inner level 2412 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the operator processing module 2435 can be implemented by a single processing core resource 48 of the node 37, for example, by utilizing a corresponding processing module 44. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query. Alternatively, the operator processing module 2435 can be implemented via multiple processing core resources 48 and/or via one or more other processing modules of the node 37.

Figure 24C:
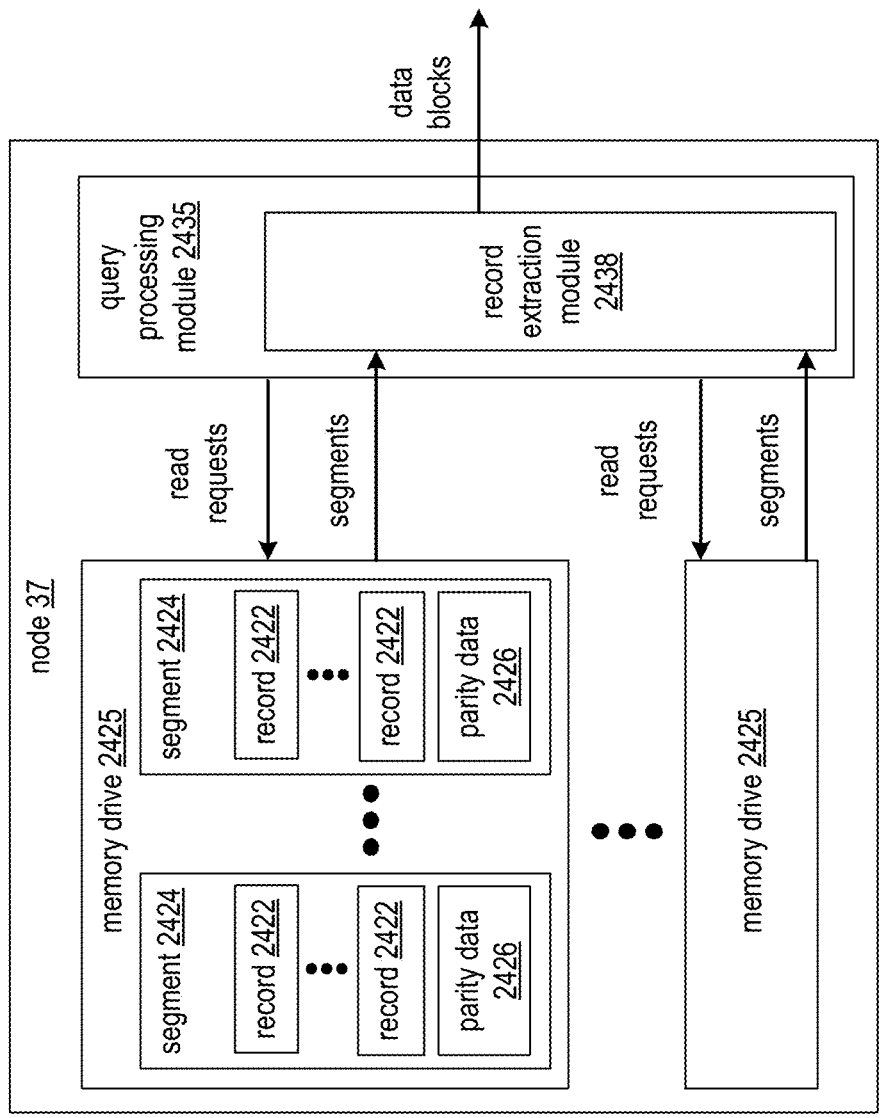

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24D:
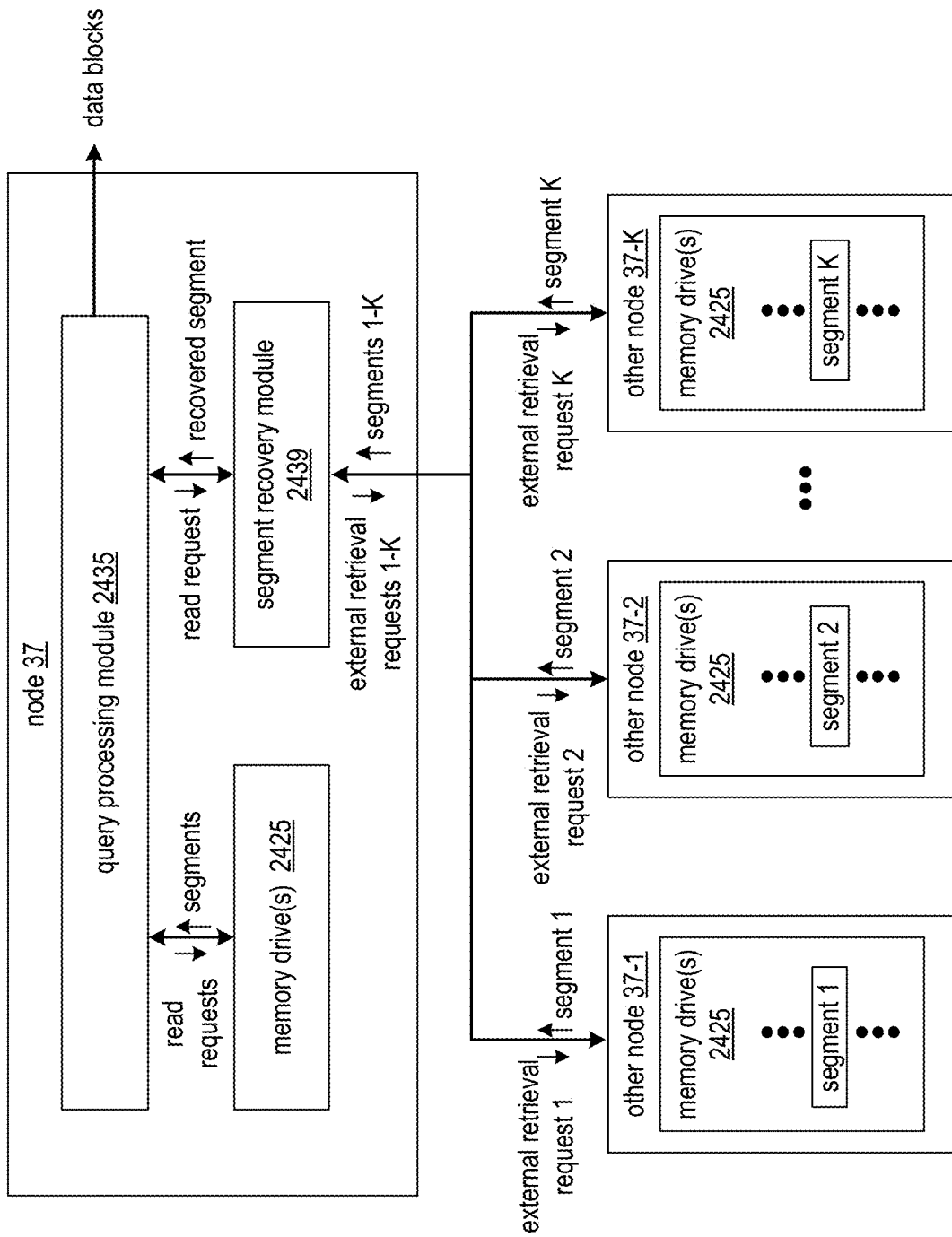

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
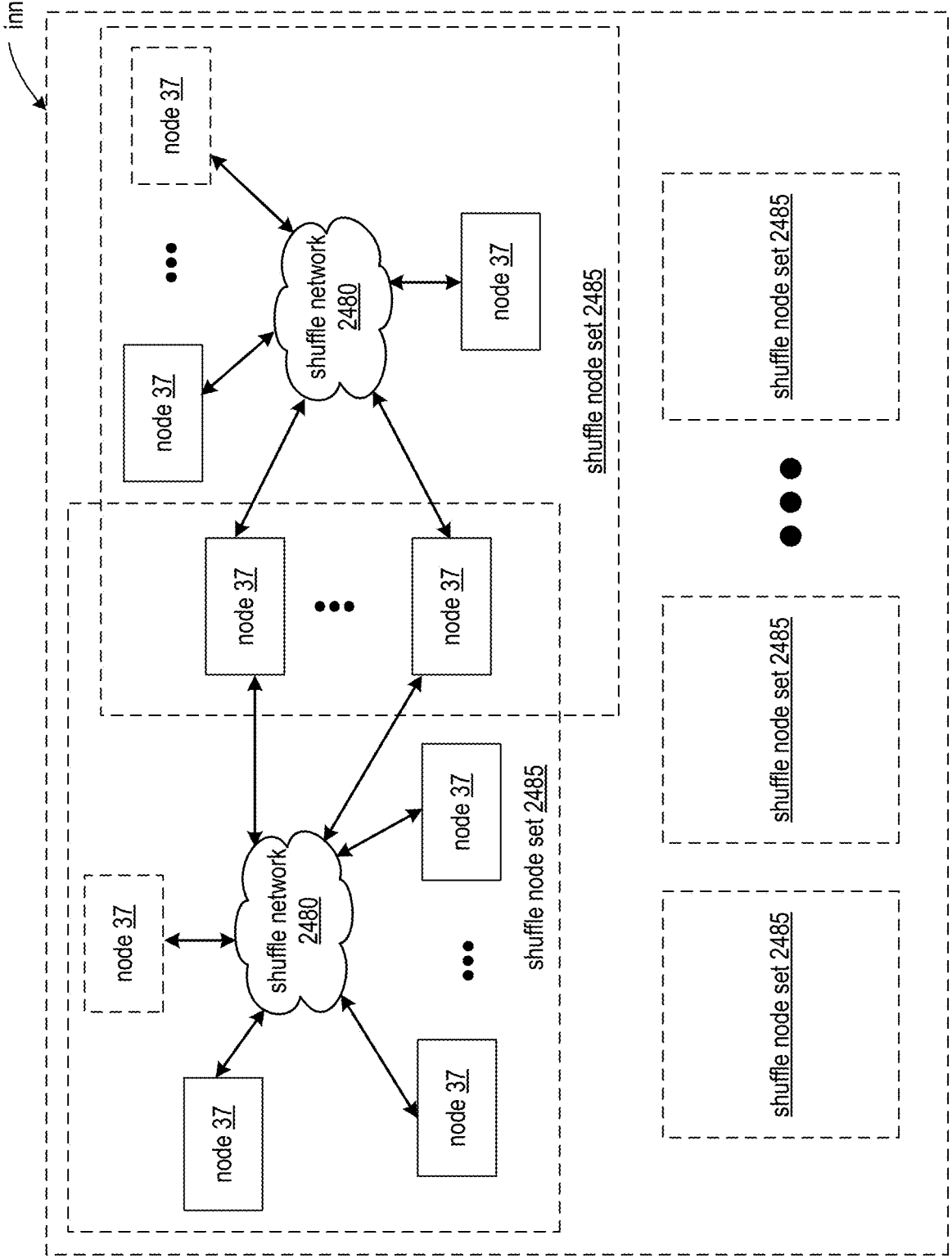
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were accessed in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 24F:
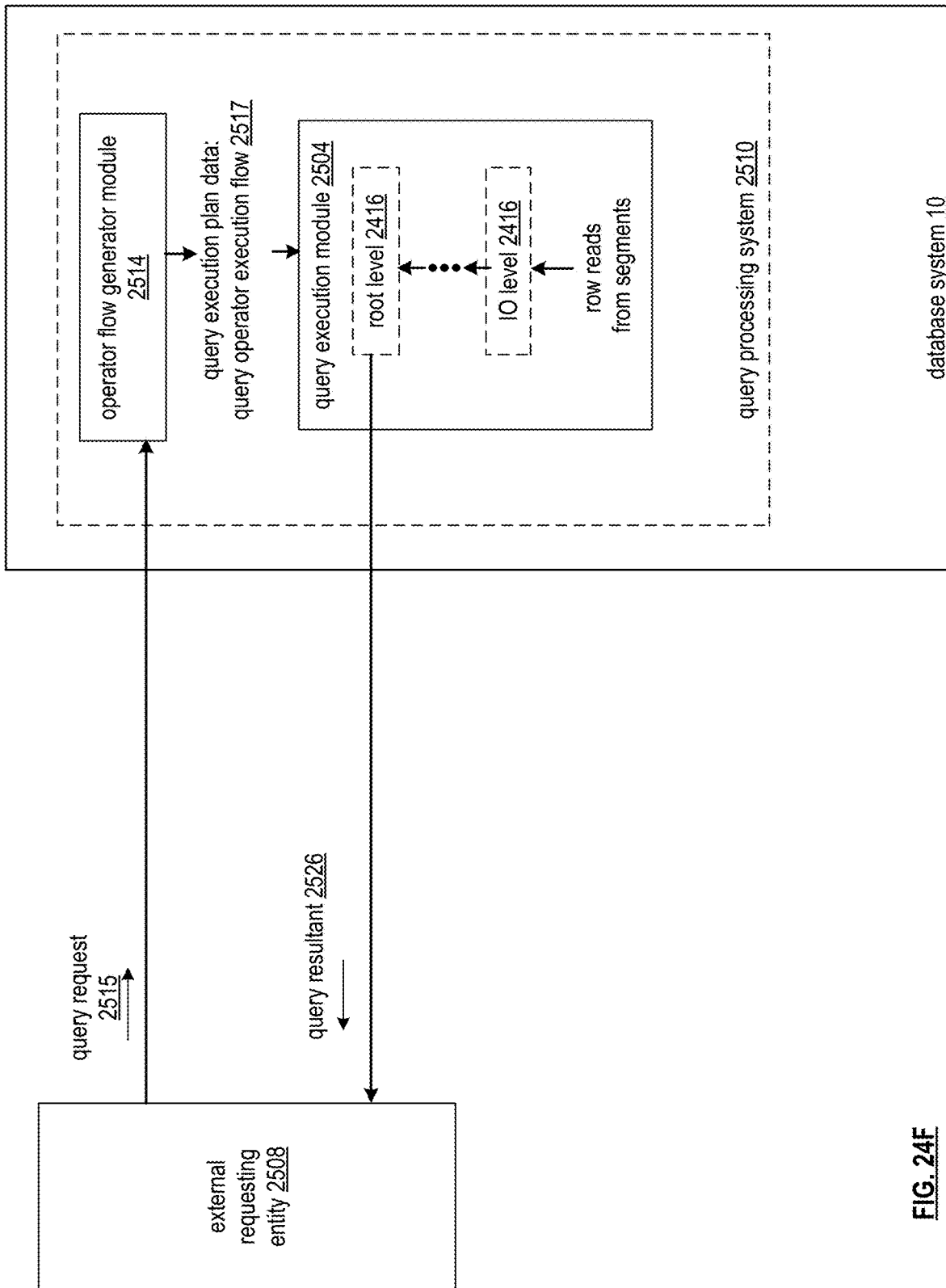
FIG. 24F is a schematic block diagram of a database system communicating with an external requesting entity in accordance with various embodiments.

FIG. 24F illustrates an embodiment of a database system that receives some or all query requests from one or more external requesting entities 2508. The external requesting entities 2508 can be implemented as a client device such as a personal computer and/or device, a server system, or other external system that generates and/or transmits query requests 2515. A query resultant 2526 can optionally be transmitted back to the same or different external requesting entity 2508. Some or all query requests processed by database system 10 as described herein can be received from external requesting entities 2508 and/or some or all query resultants generated via query executions described herein can be transmitted to external requesting entities 2508.

For example, a user types or otherwise indicates a query for execution via interaction with a computing device associated with and/or communicating with an external requesting entity. The computing device generates and transmits a corresponding query request 2515 for execution via the database system 10, where the corresponding query resultant 2526 is transmitted back to the computing device, for example, for storage by the computing device and/or for display to the corresponding user via a display device.

Figure 24G:
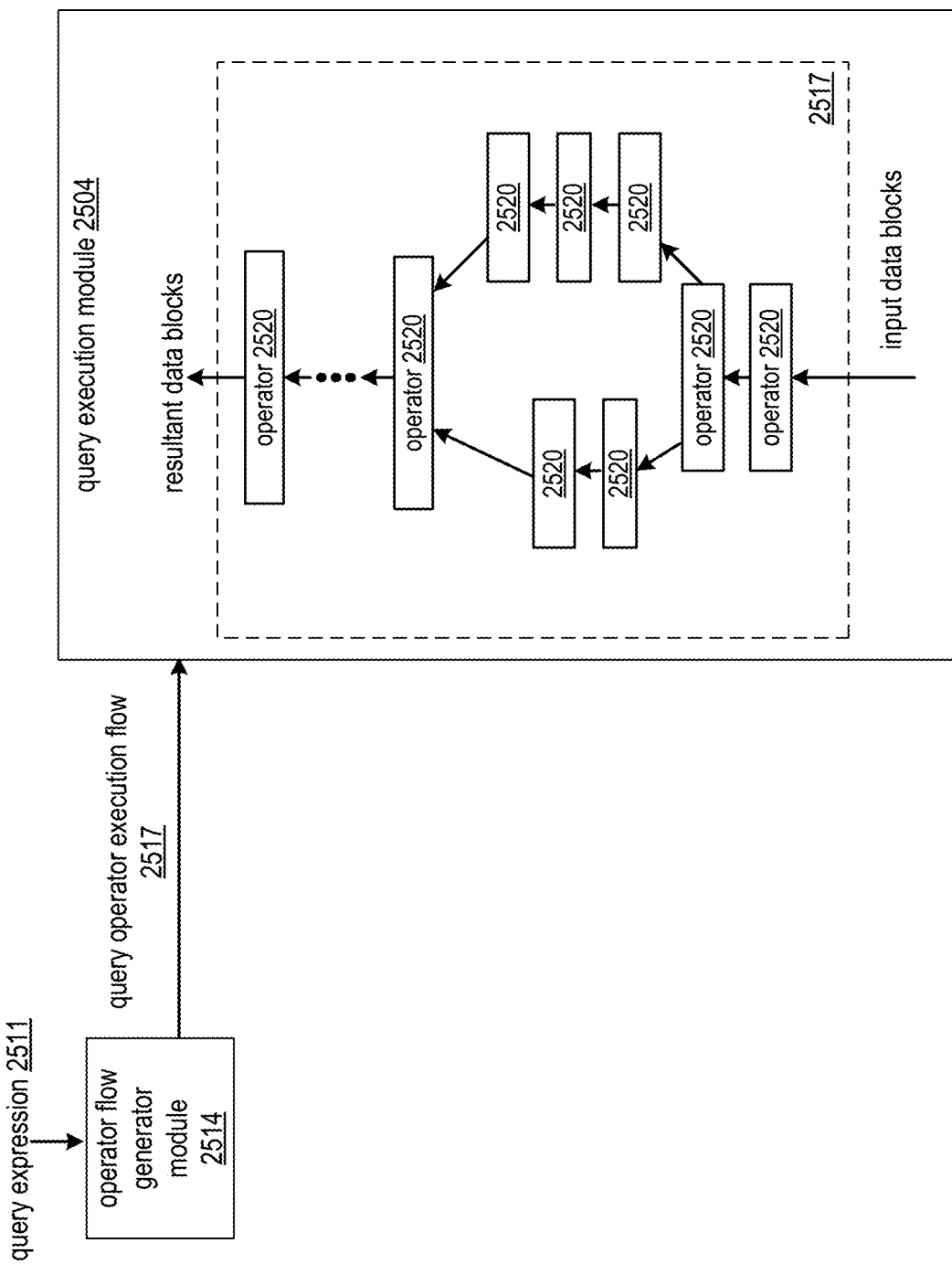
FIG. 24G is a schematic block diagram of a query processing system in accordance with various embodiments.

FIG. 24G illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 24G, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by performing a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Figure 24H:
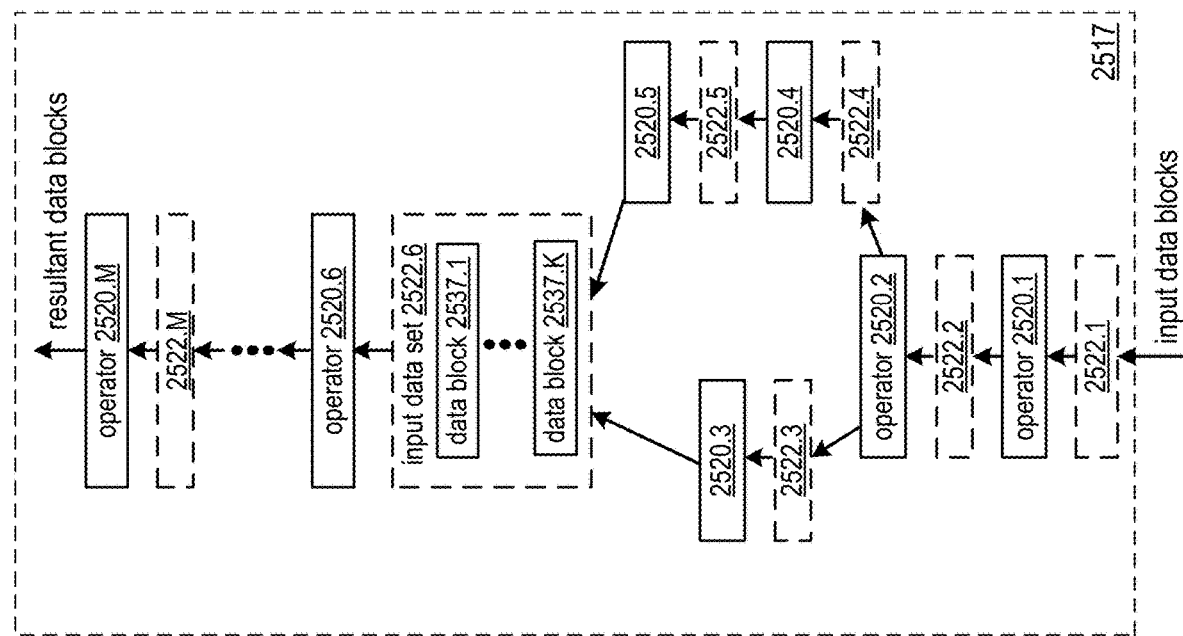
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in a same shuffle node set based on being serially next in the sequential ordering.

In some cases, in addition to a particular node sending this output generated via a node's execution of a particular operator 2520.$i$ to one or more other nodes to be input data set 2522 the next operator 2520.$i$+1 in the common query operator execution flow 2433 of the one or more other nodes 37, the particular node also receives output generated via some or all of these one or more other nodes' execution of this particular operator 2520.$i$ in their own query operator execution flow 2433 upon their own corresponding input data set 2522 for this particular operator. The particular node adds this received output of execution of operator 2520.$i$ by the one or more other nodes to the be input data set 2522 of its own next operator 2520.$i$+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.$i$+1 corresponds to and/or is utilized to implement JOIN operator and/or a custom-join operator of the query operator execution flow 2517, and where the operator 2520.$i$+1 thus utilizes input received from many different nodes in the shuffle node set in accordance with their performing of all of the operators serially before operator 2520.$i$+1 to generate the input to operator 2520.$i$+1.

As used herein, a child operator of a given operator corresponds to an operator immediately before the given operator serially in a corresponding query operator execution flow and/or an operator from which the given operator receives input data blocks for processing in generating its own output data blocks. A given operator can have a single child operator or multiple child operators. A given operator optionally has no child operators based on being an IO operator and/or otherwise being a bottommost and/or first operator in the corresponding serialized ordering of the query operator execution flow. A child operator can implement any operator 2520 described herein.

A given operator and one or more of the given operator's child operators can be executed by a same node 37 of a given node 37. Alternatively or in addition, one or more child operators can be executed by one or more different nodes 37 from a given node 37 executing the given operator, such as a child node of the given node in a corresponding query execution plan that is participating in a level below the given node in the query execution plan.

As used herein, a parent operator of a given operator corresponds to an operator immediately after the given operator serially in a corresponding query operator execution flow, and/or an operator from which the given operator receives input data blocks for processing in generating its own output data blocks. A given operator can have a single parent operator or multiple parent operators. A given operator optionally has no parent operators based on being a topmost and/or final operator in the corresponding serialized ordering of the query operator execution flow. If a first operator is a child operator of a second operator, the second operator is thus a parent operator of the first operator. A parent operator can implement any operator 2520 described herein.

A given operator and one or more of the given operator's parent operators can be executed by a same node 37 of a given node 37. Alternatively or in addition, one or more parent operators can be executed by one or more different nodes 37 from a given node 37 executing the given operator, such as a parent node of the given node in a corresponding query execution plan that is participating in a level above the given node in the query execution plan.

As used herein, a lateral network operator of a given operator corresponds to an operator parallel with the given operator in a corresponding query operator execution flow. The set of lateral operators can optionally communicate data blocks with each other, for example, in addition to sending data to parent operators and/or receiving data from child operators. For example, a set of lateral operators are implemented as one or more broadcast operators of a broadcast operation, and/or one or more shuffle operators of a shuffle operation. For example, a set of lateral operators are implemented via corresponding plurality of parallel processes 2550, for example, of a join process or other operation, to facilitate transfer of data such as right input rows received for processing between these operators. As another example, data is optionally transferred between lateral network operators via a corresponding shuffle and/or broadcast operation, for example, to communicate right input rows of a right input row set of a join operation to ensure all operators have a full set of right input rows.

A given operator and one or more lateral network operators lateral with the given operator can be executed by a same node 37 of a given node 37. Alternatively or in addition, one or lateral network operators can be executed by one or more different nodes 37 from a given node 37 executing the given operator lateral with the one or more lateral network operators. For example, different lateral network operators are executed via different nodes 37 in a same shuffle node set 37.

Figure 24I:
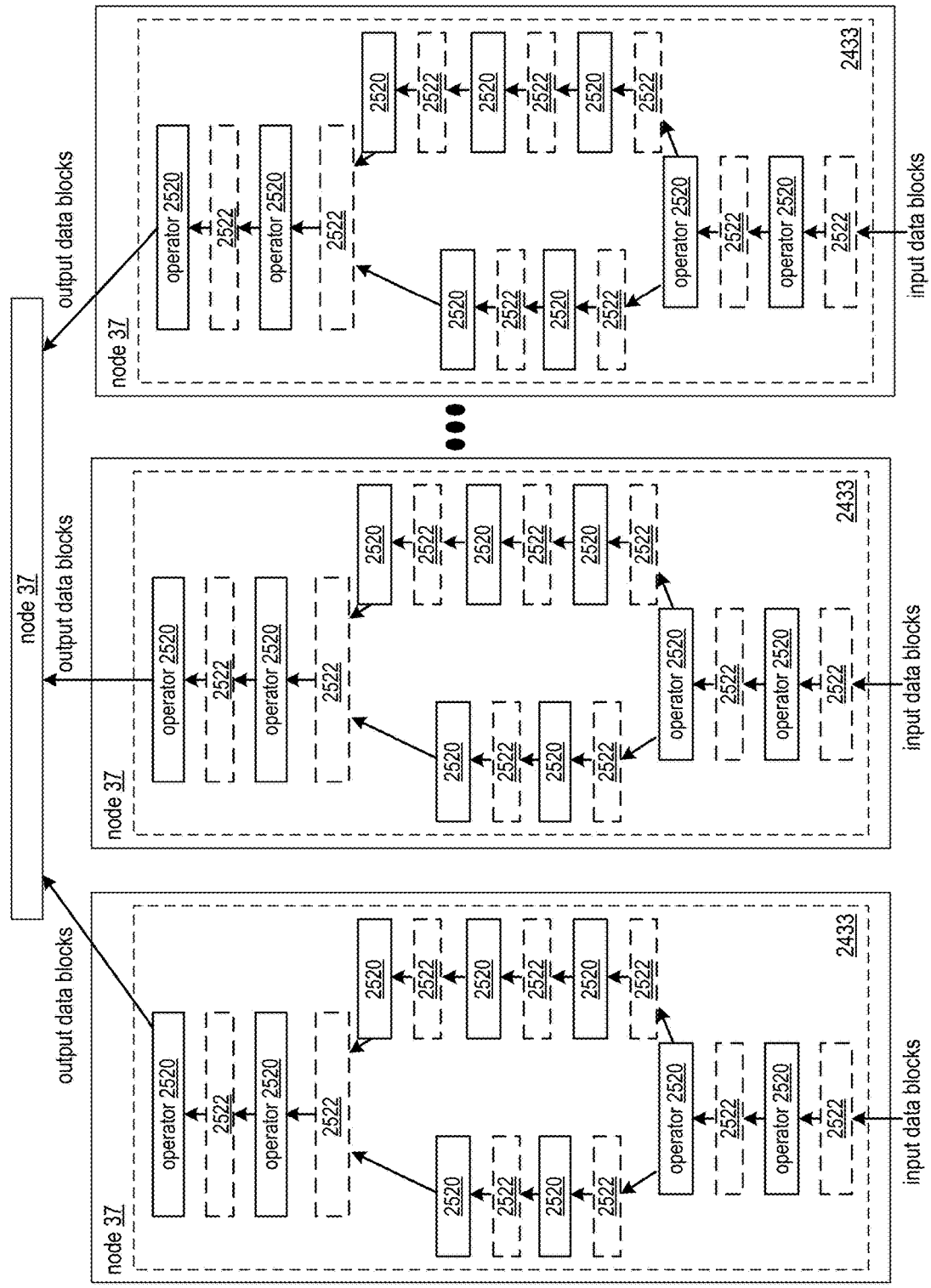
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Figure 24J:
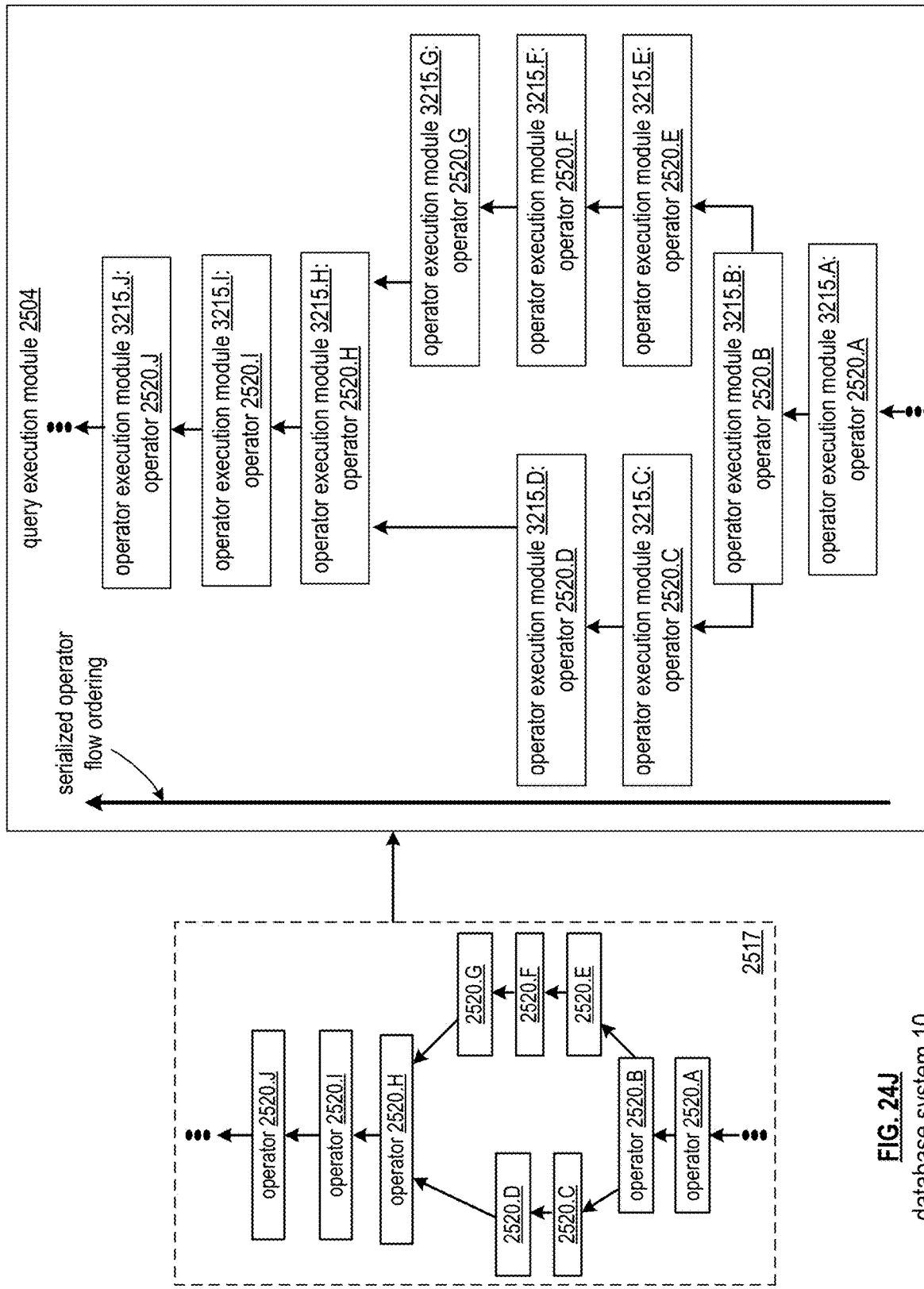
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 32A can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
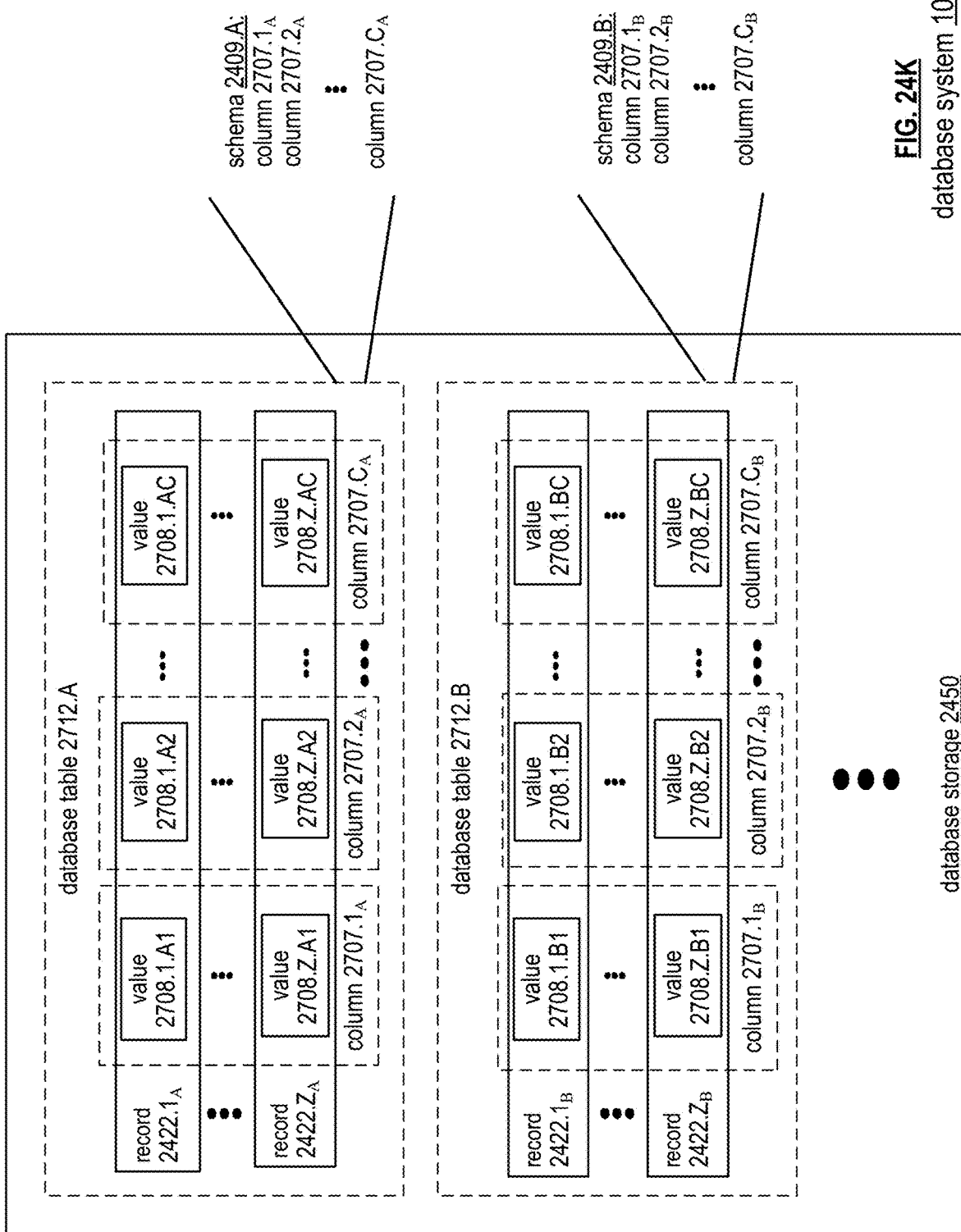
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709.A for database table 2712.A can have a different number of columns than and/or can have different datatypes for some or all columns of the set of columns $2707.1_B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
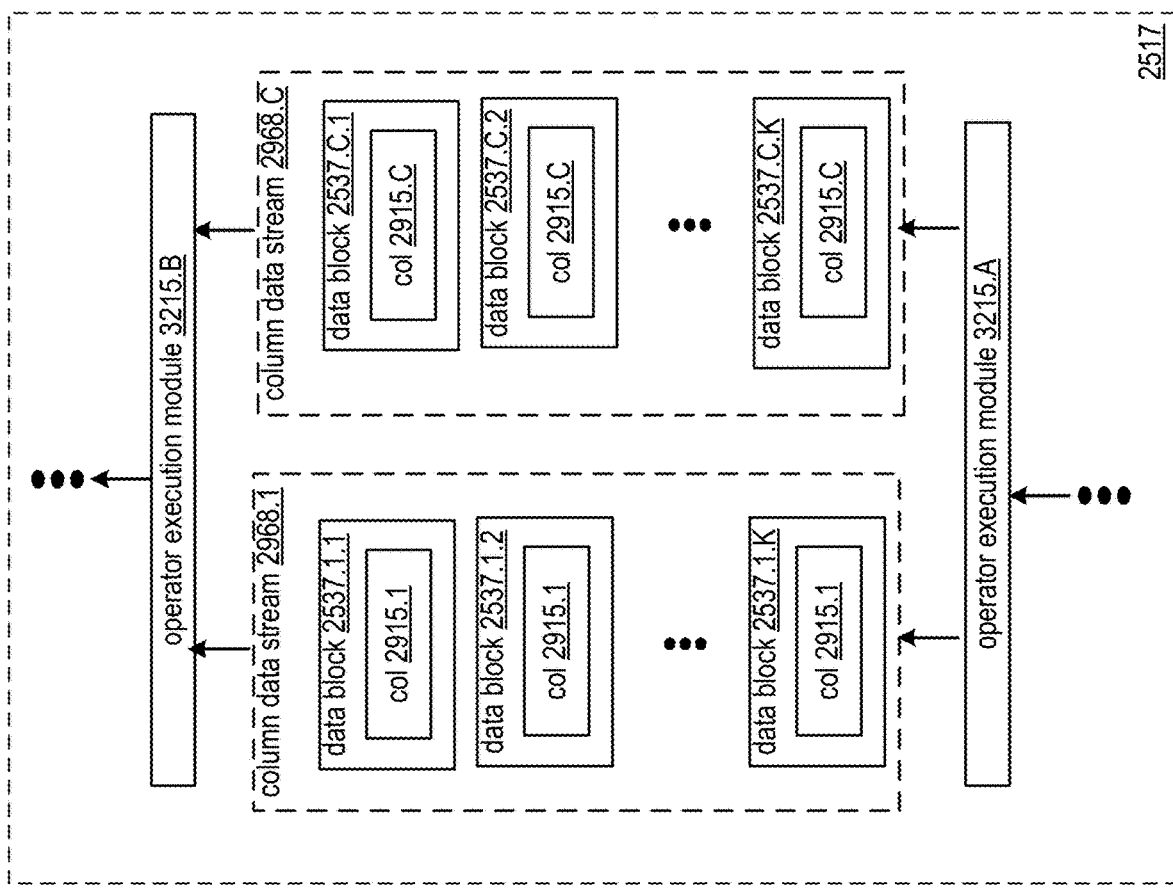
FIG. 24L is a schematic block diagram of a query execution module that implements a plurality of column data streams in accordance with various embodiments.
Figure 24M:
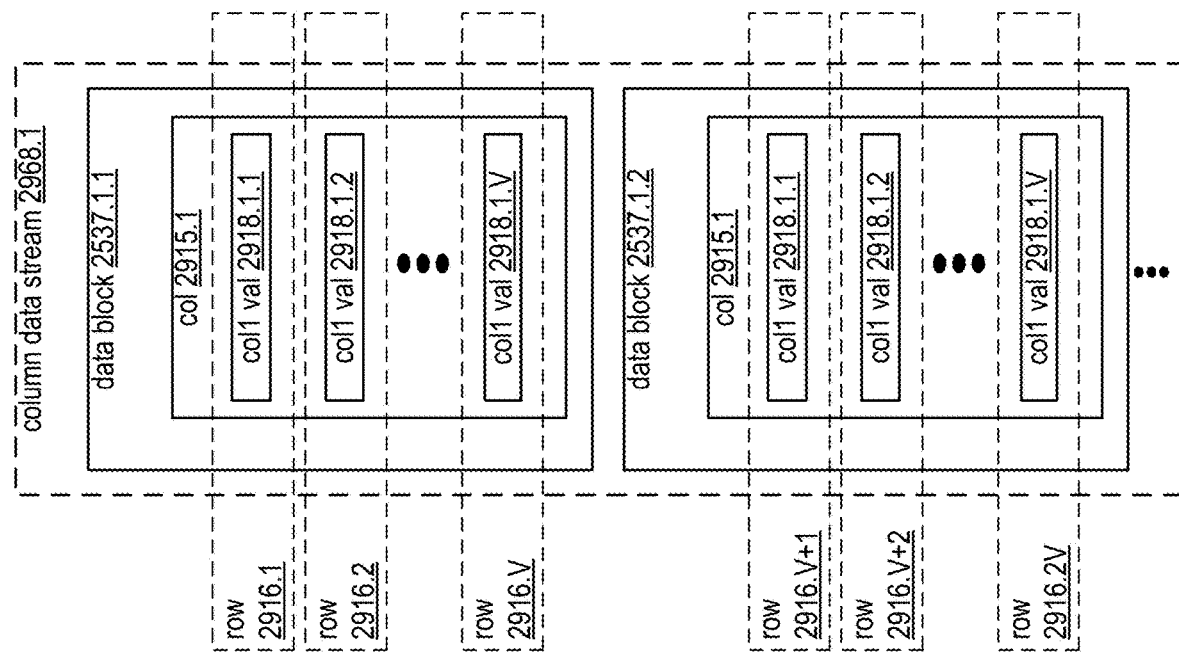
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple columns can be emitted in a same multi-column data stream.

Figure 24N:
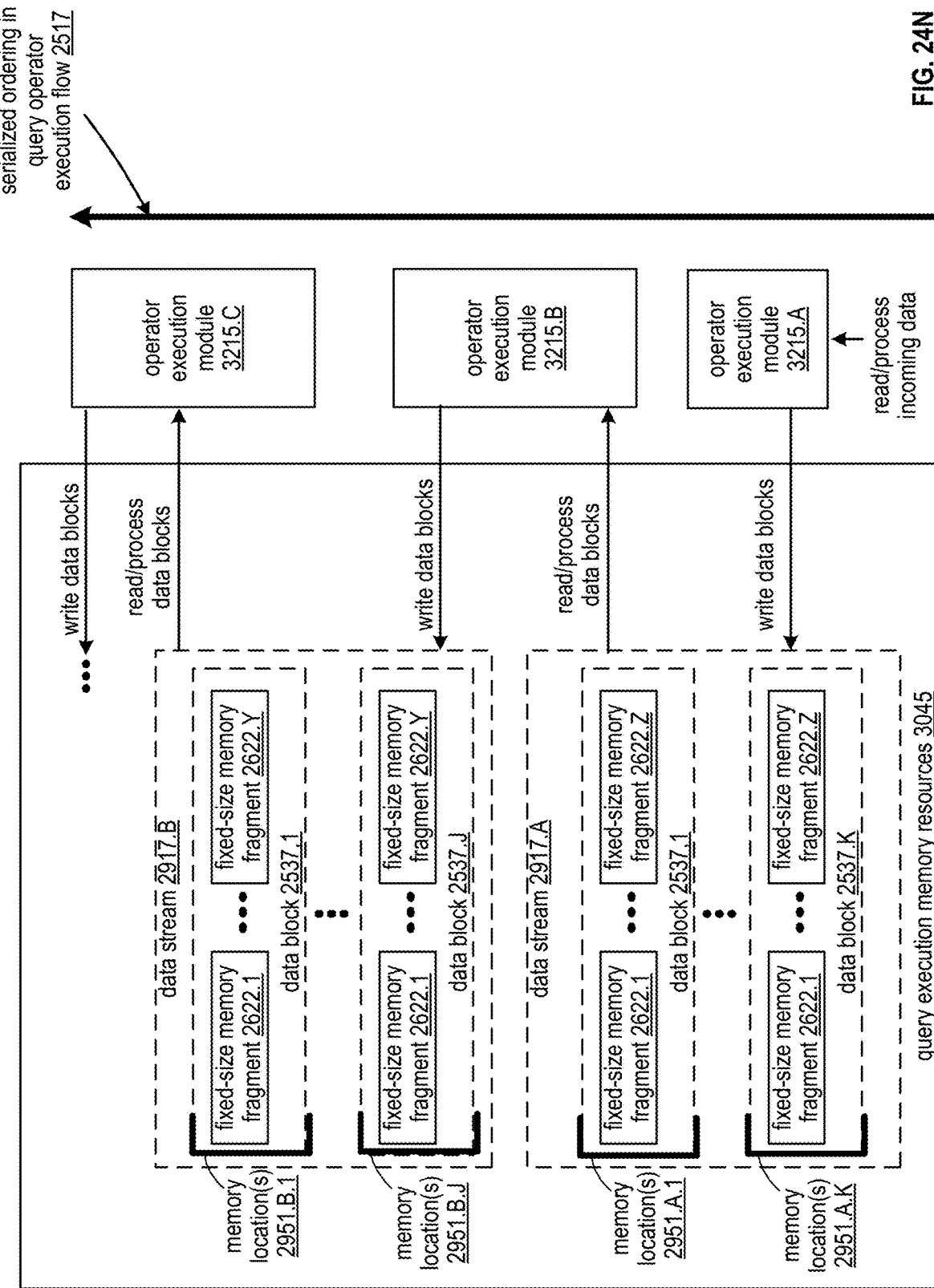
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations to filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

Figure 24O:
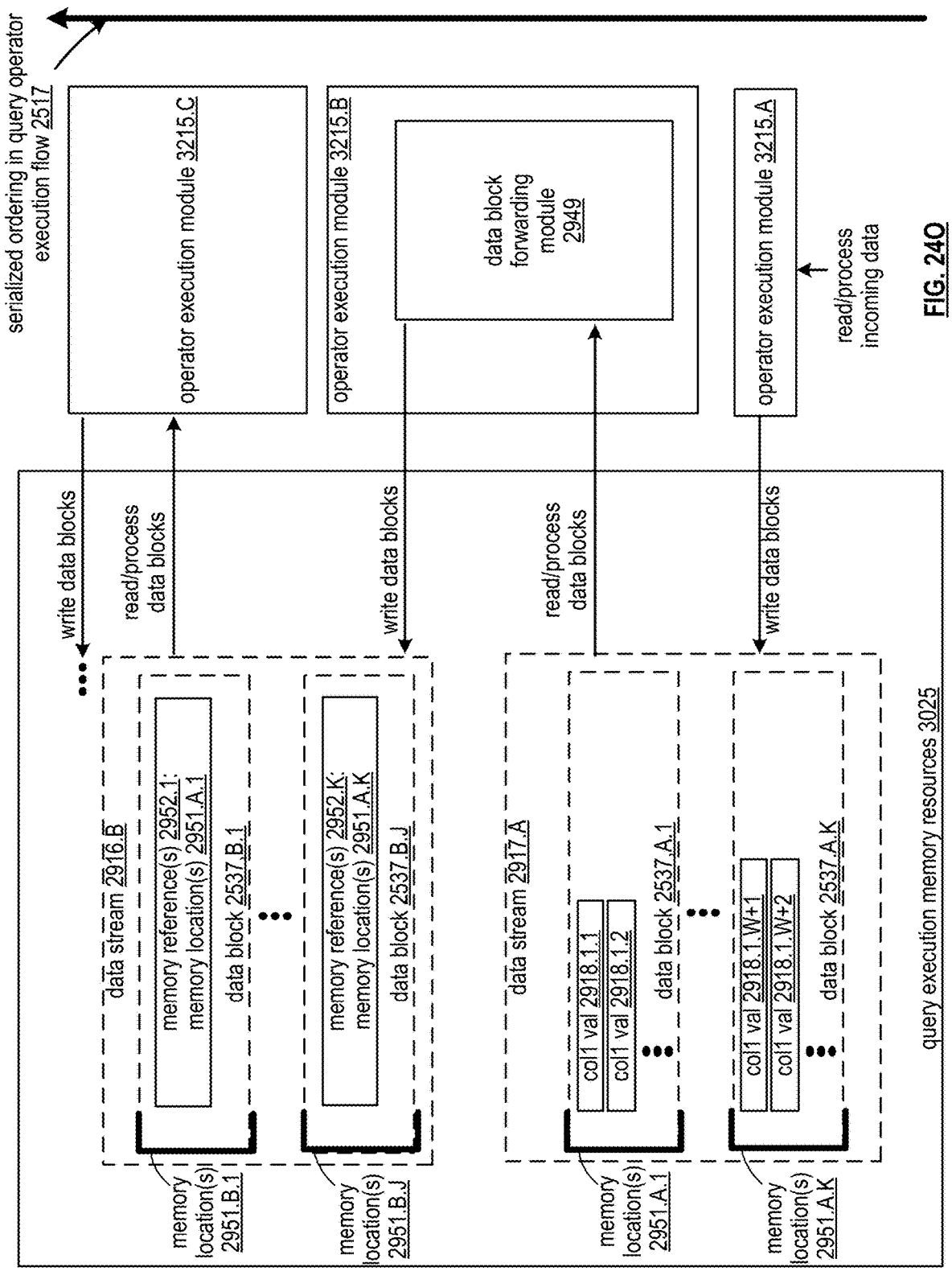
FIG. 24O is a schematic block diagram of an operator execution module that implements a data block forwarding module in accordance with various embodiments.

FIG. 24O illustrates an example where a data stream 2917.A generated by one operator execution module 3215 is forwarded by another operator execution module 3215 via a data block forwarding module 2949. The data stream 2917.A of FIG. 24O can be implemented as the data stream 2917.A of FIG. 24N and/or the data stream 2917.B of FIG. 24O can be implemented as the data stream 2916.B of FIG. 24N As illustrated in the example of FIG. 24O, data blocks 2537.1-2537.J are generated based on forwarding 2537.1-2537.K by data block forwarding module 2949 based on writing data blocks 2537.1-2537.J to include a reference to a corresponding one of the set of memory locations 2951.A.1-2959.A.K, for example, where data block 2537.B.1 indicates memory location of memory locations 2951.A.1, where data block 2537.B.2 indicates memory location of memory locations 2951.A.2, etc. For example, the value of J is equal to the value of K. This can be favorable over reading and copying all of the values 2918, particularly if the values 2918 and/or corresponding set of rows remain unchanged in the operator execution. In other embodiments where data blocks are fixed size, the value of J is far fewer than K, where multiple memory references 2952 and/or corresponding memory reference 2954 are included in the same data block 2537 based on being significantly smaller than the referenced values themselves.

FIGS. 25A-25F illustrate embodiments of a database system 10 operable to execute queries indicating join expressions based on implementing corresponding join processes via one or more join operators. Some or all features and/or functionality of FIGS. 25A-25F can be utilized to implement the database system 10 of FIGS. 24A-24N when executing queries indicating join expressions. Some or all features and/or functionality of FIGS. 25A-25F can be utilized to implement any embodiment of the database system 10 described herein.

Figure 25A:
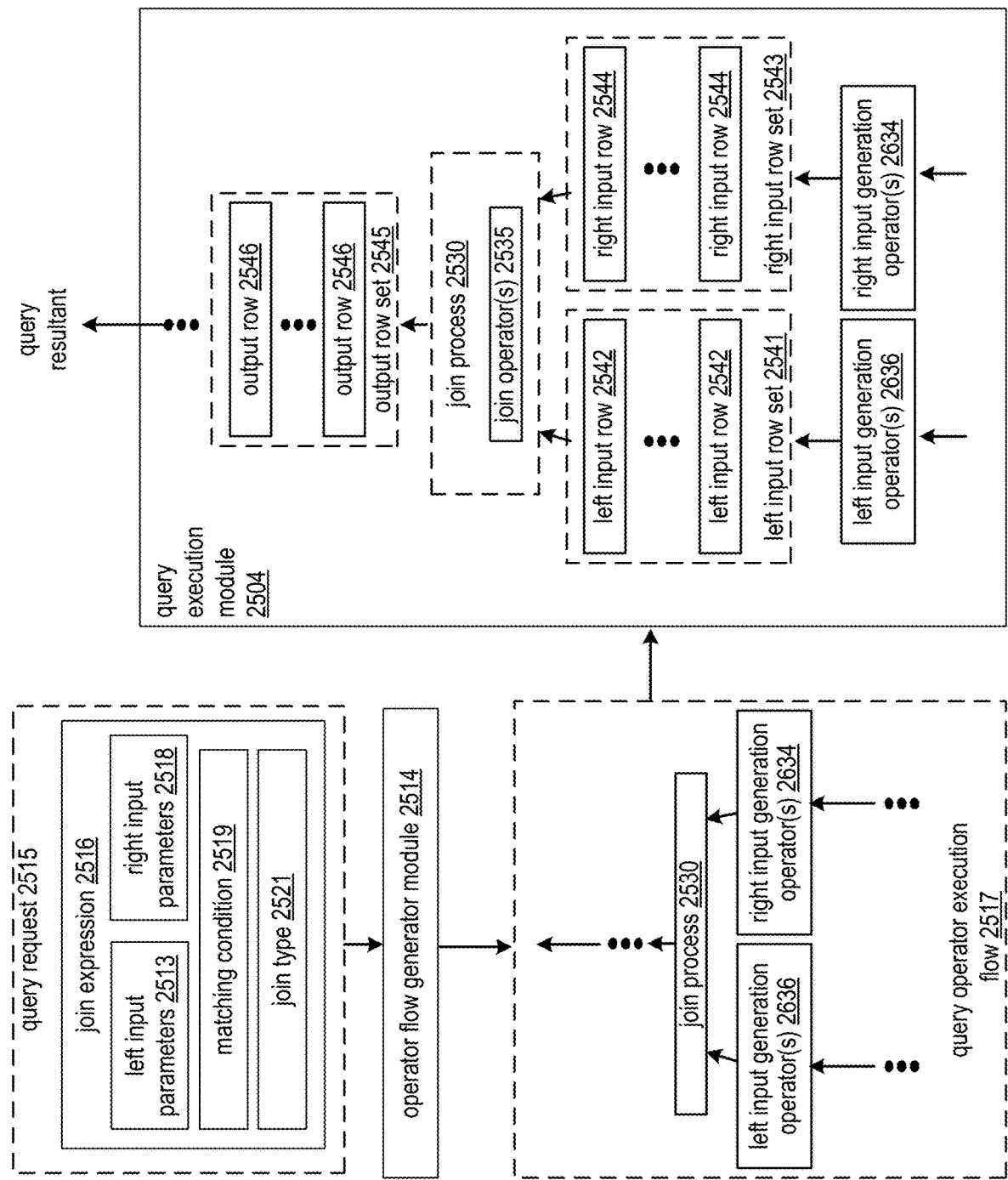
FIG. 25A is a schematic block diagram of a database system executing a join process based on a join expression of a query request in accordance with various embodiments.

FIG. 25A illustrates an example of processing a query request 2515 that indicates a join expression 2516. The join expression 2516 can indicate that columns from one or more tables, for example, indicated by left input parameters 2513 and/or right input parameters 2518, be combined into a new table based on particular criteria, such as matching condition 2519 and/or a join type 2521 of the join operation. For example, the join expression 2516 can be implemented as a SQL JOIN clause, or any other type of join operation in any query language.

The join expression 2516 can indicate left input parameters 2513 and/or right input parameters 2518, denoting how the left input rows and/or right input rows be selected and/or generated for processing, such as which columns of which tables be selected. The left input and right input are optionally not distinguished as left and right, for example, where the join expression 2516 simply denotes input values for two input row sets. The join expression can optionally indicate performance of a join across three or more sets of rows, and/or multiple join expressions can be indicated to denote performance of joins across three or more sets of rows. In the case of a self-join, the join expression can optionally indicate performance of a join across a single set of input rows.

The join expression 2516 can indicate a matching condition 2519 denoting what condition constitutes a left input row being matched with a right input row in generating output of the join operation, which can be based on characteristics of the left input row and/or the right input row, such as a function of values of one or more columns of the left input row and/or the right input row. For example, the matching condition 2519 requires equality between a value of a first column value of the left input rows and a second column value of the right input rows. The matching condition 2519 can indicate any conditional expression between values of the left input rows and right input rows, which can require equality between values, inequality between values, one value being less than another value, one value being greater than another value, one value being less than or equal to another value, one value being greater than or equal to another value, one value being a substring of another value, one value being an array element of an array, or other criteria. In some embodiments, the matching condition 2519 indicates all left input rows be matched with all right input rows. Two values and/or two corresponding rows can meet matching condition 2519 based on comparing favorably to one another and/or based on comparing favorably to the matching condition 2519.

The join expression 2516 can indicate a join type 2521 indicating the type of join to be performed to produce the output rows. For example, the join type 2521 can indicate the join be performed as a one of: a full outer join, a left outer join, a right outer join, an inner join, a cross join, a cartesian product, a self-join, an equi-join, a natural join, a hash join, or any other type of join, such as any SQL join type and/or any relational algebra join operation.

The query request 2515 can further indicate other portions of a corresponding query expression indicating performance of other operators, for example, to define the left input rows and/or the right input rows, and/or to further process output of the join expression.

The operator flow generator module 2514 can generate the query operator execution flow 2517 to indicate performance of a join process 2530 via one or more corresponding operators. The operators of the join process 2530 can be configured based on the matching condition 2519 and/or the join type 2521. The join process can be implemented via one or more serialized operators and/or multiple parallelized branches of operators 2520 configured to execute the corresponding join expression.

The operator flow generator module 2514 can generate the query operator execution flow 2517 to indicate performance of the join process 2530 upon output data blocks generated via one or more left input generation operators 2636 and one or more right input generation operators 2634. For example, the left input generation operators 2636 include one or more serialized operators and/or multiple parallelized branches of operators 2520 utilized to retrieve a set of rows from memory, for example, to perform IO operations, to filter the set of rows, to manipulate and/or transform values of the set of rows to generate new values of a new set of rows for performing the join, or otherwise retrieve and/or generate the left input rows, in accordance with the left input parameters 2513. Similarly, the right input generation operators 2634 include one or more serialized operators and/or multiple parallelized branches of operators utilized to retrieve a set of rows from memory, for example, via IO operators, to filter the set of rows, to manipulate and/or transform values of the set of rows to generate new values of a new set of rows for performing the join, or otherwise retrieve and/or generate the right input rows, in accordance with the right input parameters 2518. The left input generation operators 2636 and right input generation operators 2634 can optionally be distinct and performed in parallel to generate respective left and right input row sets separately. Alternatively, one or more of the left input generation operators 2636 and right input generation operators 2634 can optionally be shared operators between left input generation operators 2636 and right input generation operators 2634 to aid in generating both the left and right input row sets.

The query execution module 2504 can be implemented to execute the query operator execution flow 2517 to facilitate performance of the corresponding join expression 2516. This can include executing the left input generation operators 2636 to generate a left input row set 2541 that includes a plurality of left input rows 2542 determined in accordance with the left input parameters 2513, and/or executing the right input generation operators 2634 to generate a right input row set 2543 that includes a plurality of right input rows 2544 determined in accordance with the right input parameters 2518. The plurality of left input rows 2542 of the left input row set 2541 can be generated via the left input generation operators 2636 as a stream of data blocks sent to the join process 2530 for processing, and/or the plurality of right input rows 2544 of the right input row set 2543 can be generated via the right input generation operators 2634 as a stream of data blocks sent to the join process 2530 for processing.

The join process 2530 can implement one or more join operators 2535 to process the left input row set 2541 and the right input row set 2543 to generate an output row set 2545 that includes a plurality of output rows 2546. The one or more join operators 2535 can be implemented as one or more operators 2520 configured to execute some or all of the corresponding join process. The output rows 2546 of the output row set 2545 can be generated via the join process 2530 as a stream of data blocks emitted as a query resultant of the query request 2515 and/or sent to other operators serially after the join process 2530 for further processing.

Each output row 2546 can be generated based on matching a given left input row 2542 with a given right input row 2544 based on the matching condition 2519 and/or the join type 2521, where one or more particular columns of this left input row are combined with one or more particular columns of this given right input row 2544 as specified in the left input parameters 2513 and/or the right input parameters 2518 of the join expression 2516. A given left input row 2542 can be included in no output rows based on matching with no right input rows 2544. A given left input row 2542 can be included in one or more output rows based on matching with one or more right input rows 2544 and/or being padded with null values as the right column values. A given right input row 2544 can be included in no output rows based on matching with no left input rows 2542. A given right input row 2544 can be included in one or more output rows based on matching with one or more left input rows 2542 and/or being padded with null values as the left column values.

The query execution module 2504 can execute the query operator execution flow 2517 via a plurality of nodes 37 of a query execution plan 2405, for example, in accordance with nodes 37 participating across different levels of the plan. For example, the left input generation operators 2636 and/or the right input generation operators 2634 are implemented via nodes at a first one or more levels of the query execution plan 2405, such as an IO level and/or one or more inner levels directly above the IO level.

The left input generation operators 2636 and the right input generation operators 2634 can be implemented via a common set of nodes at these one or more levels. Alternatively some or all of the left input generation operators 2636 are processed via a first set of nodes of these one or more levels, and the right input generation operators 2634 are processed via a second set of nodes that have a non-null difference with and/or that are mutually exclusive with the first set of nodes.

The join process 2530 can be implemented via nodes at a second one or more levels of the query execution plan 2405, such as one or more inner levels directly above the first one or more levels, and/or the root level. For example, one or more nodes at the second one or more levels implementing the join process 2530 receive left input rows 2542 and/or right input rows 2544 for processing from child nodes implementing the left input generation operators 2636 and/or child nodes implementing the right input generation operators 2634. The one or more nodes implementing the join process 2530 at the second one or more levels can optionally belong to a same shuffle node set 2485, and can laterally exchange left input rows and/or right input rows with each other via one or more shuffle operators and/or broadcast operators via a corresponding shuffle network 2480.

Figure 25B:
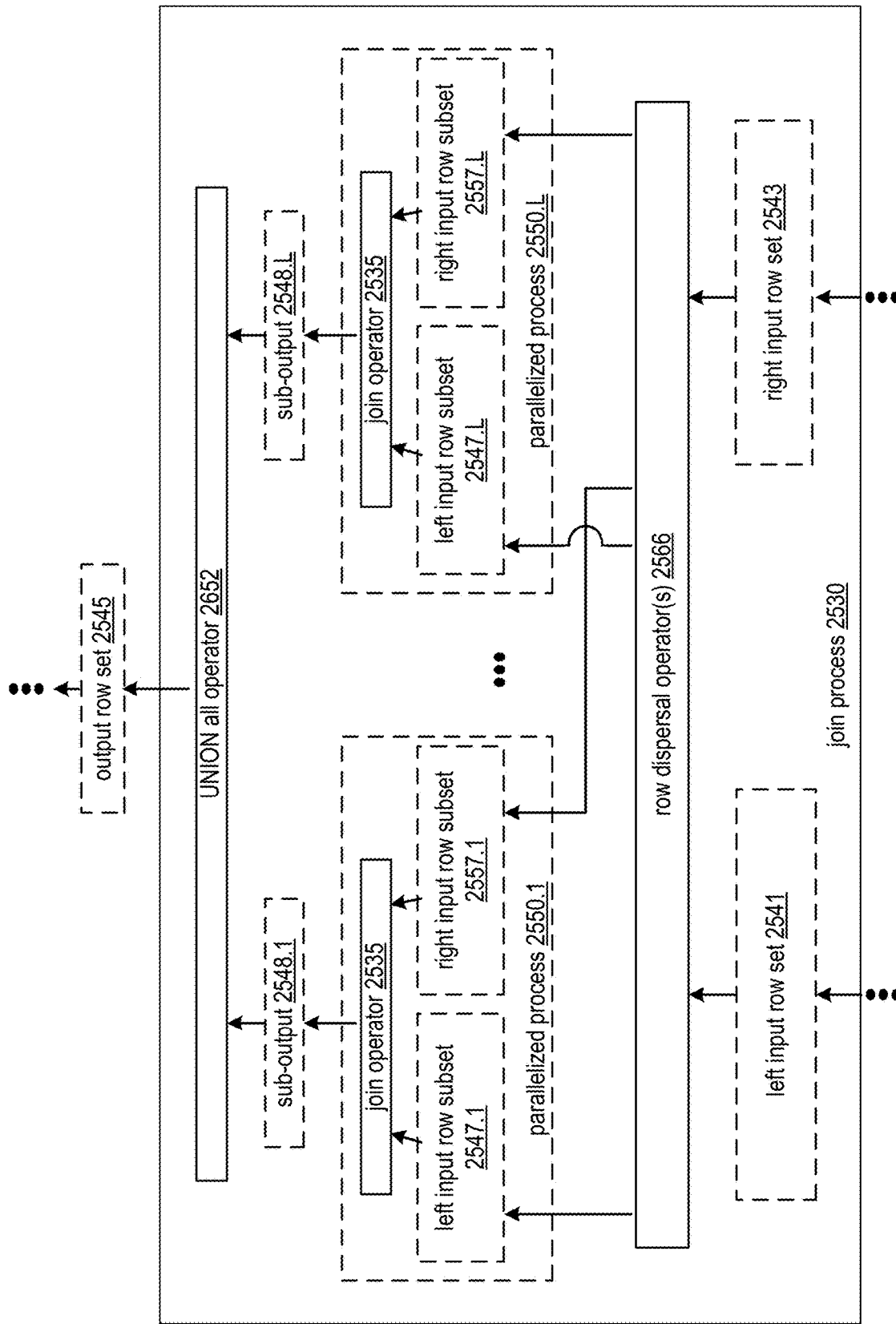
FIGS. 25B-25E are schematic block diagrams of example join processes executed via multiple parallel processes in accordance with various embodiments.

FIG. 25B illustrates an embodiment of a query execution module 2504 executing a join process 2530 via a plurality of parallelized processes 2550.1-2550.L. Some or all features and/or functionality of the query execution module 2504 can be utilized to implement the query execution module 2504 of FIG. 25A, and/or any other embodiment of the query execution module 2504 described herein. In other embodiments, the query execution module 2504 of FIG. 25A implements the join process 2530 via a single join operator of a single processes rather than the plurality of parallelized processes 2550.

In some embodiments, the plurality of parallelized processes 2550.1-2550.L are implemented via a corresponding plurality of nodes 37.1-37.L of a same level, such as a given inner level, of a query execution plan 2405 executing the given query. In some embodiments, the plurality of parallelized processes 2550.1-2550.L are implemented via a corresponding plurality of processing core resources 48, such as multiple virtual machine cores, on a same given node 37 and/or across multiple parallelized nodes 37. In some embodiments, the plurality of parallelized processes 2550.1-2550.L can be implemented as a parallelized set of operator instances 2520 in parallel tracks of a given query operator execution flow 2517. The plurality of parallelized processes 2550.1-2550.L can be implemented as a set via any other set of parallelized and/or distinct memory and/or processing resources.

Each parallelized process 2550 can be responsible for generating its own sub-output 2548 based on processing a corresponding left input row subset 2547 of the left input row set 2541 and processing a corresponding right input row subset 2557. As discussed in further detail herein, each right input row subset 2557 can be a proper subset of the full right input row set 2543 and/or can include all of the right input row set 2543. Alternatively or in addition, each left input row subset 2547 can be a proper subset of the full left input row set 2541 and/or can include all of the left input row set 2541.

The dispersal of the left input row set 2543 into respective left input row subsets 2547.1-2547.L can be performed via one or more row dispersal operators 2566, such as one or more multiplexer operators, one or more tee operators, and/or one or more shuffle operators.

Figure 25C:
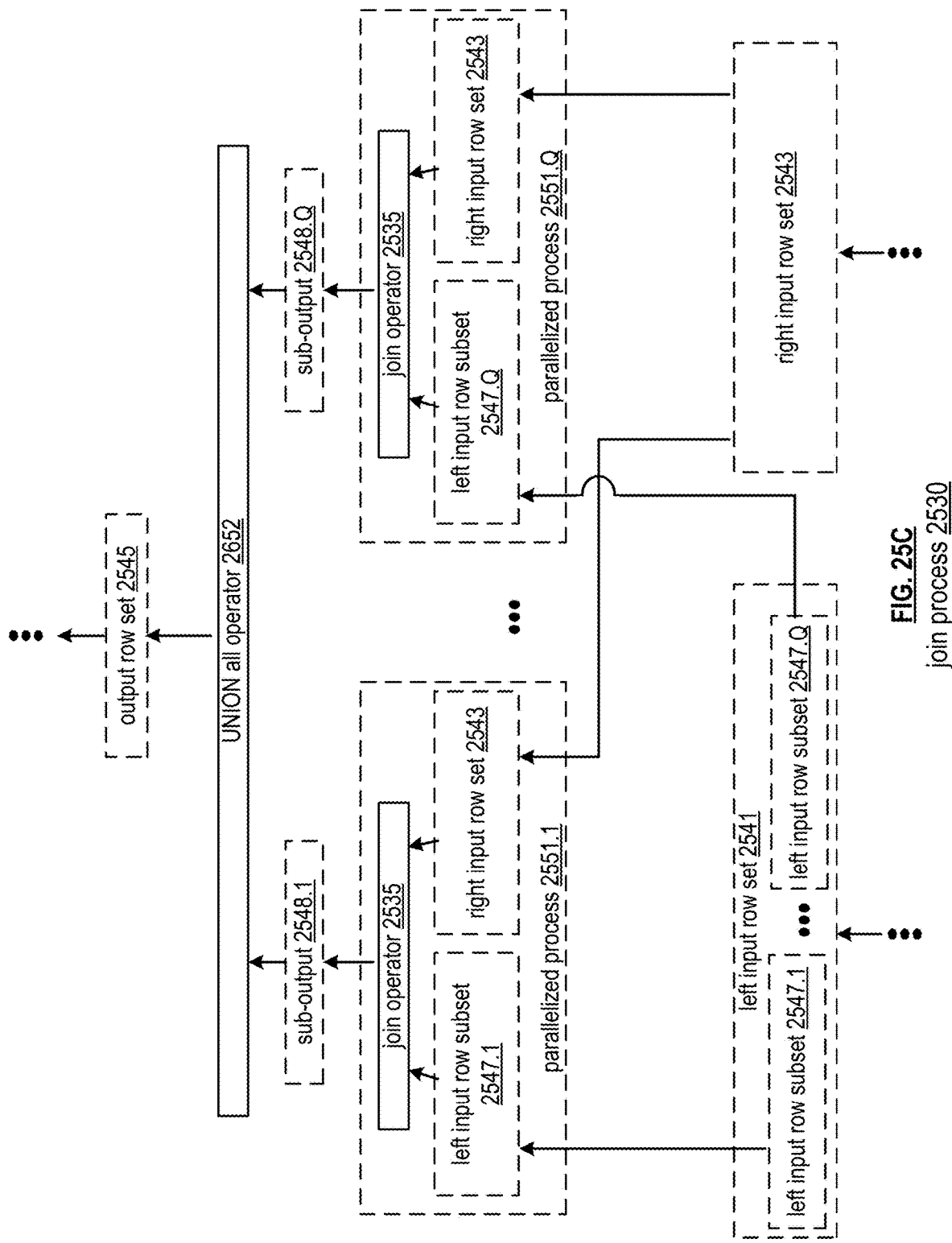

When implemented as a multiplexer operator, a row dispersal operator 2566 can be operable to emit different subsets of a set of incoming rows of an input row set, such as the right input row set 2543 and/or the left input row set 2541, to different parallelized processes for processing, for example, via respective parent operators. Each subset of rows sent to a given parallelized process 2550 can be is mutually exclusive from subsets of rows sent to other parallelized processes 2550, and/or the plurality of subsets of rows sent to the plurality of parallelized process 2550.1-2550.L are collectively exhaustive with respect to the input row set. This can be utilized to facilitate partitioning of a set of left input rows for processing across parallelized processes as illustrated in FIG. 25C.

When implemented as a tee operator, a row dispersal operator 2566 can be operable to emit all of a set of incoming rows of input row set to each different parallelized processes 2550 of the set of parallelized processes 2550.1-2550.L for processing, such as to respective parent operators. Each subset of rows sent to a given parallelized process 2550 is equivalent to that sent to other parallelized processes 2550, and/or the plurality of subsets of rows sent to the plurality of patent parallelized processes 2550 are equivalent to the input row set. This can be utilized to facilitate sharing of all of a same set of right input rows across all parallelized processes as illustrated in FIG. 25C.

When implemented as a set of shuffle operators, a respective set of row dispersal operators 2566 can be operable to share incoming rows with other operators to render all corresponding parallelized processes 2550 receiving all rows for processing, despite each shuffle operator receiving only one input set of rows itself. For example, each parallelized process implements its own shuffle operator to enable this sharing of rows. This can be utilized to facilitate sharing of all of a same set of right input rows across all parallelized processes as illustrated in FIG. 25C.

Each row in the left input row set 2541 can be included inexactly one of the respective left input row subsets 2547, can be included in more than one but less than all of the respective left input row subsets 2547, and/or can be included in every respective left input row subset 2547. Each row in the right input row set 2543 can be included in exactly one of the respective left input row subsets 2557, can be included in more than one but less than all of the respective left input row subsets 2557, and/or can be included in every respective left input row subset 2557. The dispersal and respective processing by the parallelized processing can guarantee that the union outputted via union operator 2652 does not include duplicate rows that should not be included in the output for query correctness and/or is not missing any rows that should be included in the output for query correctness.

FIG. 25C illustrates an embodiment of execution of a join process 2530 via a plurality of parallelized processes 2551.1-2551.Q. Some or all features and/or functionality of FIG. 25C can implement the join process 2530 of FIG. 25B, FIG. 25A, and/or any other embodiment of join process 2530 described herein.

The plurality of parallelized processes 2551.1-2551.Q can implement the plurality of parallel processes 2550.1-2550.L of FIG. 25B, where a given process 2551 of FIG. 25C implements some or all of a given process 2550 of FIG. 25B. Alternatively or in addition, a given plurality of parallelized processes 2551.1-2551.Q can be a plurality of inner, subprocesses of a given parallelized process 2550, where some or all of the plurality of parallel processes 2550.1-2550.L implement their own plurality of inner parallelized subprocesses 2551.1-2551.Q.

Each parallelized process 2551 can be responsible for generating its own sub-output 2548 based on processing a corresponding left input row subset 2547 of the left input row set 2541, and by further processing all of the right input row set. The full output row set 2545 can be generated by applying a UNION all operator 2652 implementing a union across all L sets of sub-output 2548, where all output rows 2546 of all sub-outputs 2548 are thus included in the output row set 2545. The output rows 2546 of a given sub-output 2548 can be generated via the join operator 2535 of the corresponding parallelized process 2555 as a stream of data blocks sent to the UNION all operator 2652.

In some embodiments, each parallelized process 2551 only receives the left input rows 2542 generated by its own one or more child nodes, where each of these child nodes only sends its output data blocks to one parent. The left input row set 2541 can otherwise be segregated into the set of left input row subsets 2547.1-2547.Q, each designated for a corresponding one of the set of parallelized processes 2551.1-2551.Q. The plurality of left input row subsets 2547.1-2547.Q can be mutually exclusive and collectively exhaustive with respect to the left input row set 2541, where each left input row 2542 is received and processed by exactly one parallelized process 2551.

In some embodiments, the right input row set 2543 is generated via another set of nodes that is the same as, overlapping with, and/or distinct from the set of nodes that generate the left input row subsets 2547.1-2547.L. For example, similar to the nodes generating left input row subsets 2547, Q different nodes and/or Q different subsets of nodes that each include multiple nodes generate a corresponding subset of right input rows, where these subsets are mutually exclusive and collectively exhaustive with respect to the right input row set 2543. Unlike the left input rows, all right input rows 2544 can be received by all parallelized processes 2551.1, for example, based on each node of this other set of nodes sending its output data blocks to all L nodes implementing the Q parallelized processes 2551, rather than a single parent. Alternatively, the right input rows 2544 generated by a given node can be sent by the node to one parent implementing a corresponding one of the plurality of parallelized processes 2551.1-2551.Q, where the Q nodes perform a shuffle and/or broadcast process to share received rows of the right input row set 2543 with one another via a shuffle network 2480 to facilitate all Q nodes receiving all of the right input rows 2544. Each right input row 2544 is otherwise received and processed by every parallelized process 2551.

This mechanism can be employed for correctly implementing inner joins and/or left outer joins. In some embodiments, further adaptation of this join process 2530 is required to facilitate performance of full outer joins and/or right outer joins, as a given parallel process cannot ascertain whether a given right row matches with a left row of some or the left input row subset, or should be padded with nulls based on not matching with any left rows.

In some embodiments, to implement a right outer join, the right and left input rows of a right outer join are designated in reverse, enabling the right outer join to be correctly generated based on instead segregating the right input rows of the right outer join across all parallelized processes 2551, and instead processing all left input rows of the right outer join by all parallelized processes 2551.

The left input row set that is segregated across all parallelized processes 2551 vs. the right input row set processed via every parallelized processes 2551 can be selected, for example, based on an optimization process performed when generating the query operator execution flow 2517. For example, for a join specified as being performed upon two sets of input rows, while the input row set segregated amongst different parallelized processes 2551 and the input row set processed via every parallelized processes 2551 could be interchangeably selected, an intelligent selection is employed to optimize processing via the parallelized processes. For example, the input row set that is estimated and/or known to require smaller memory space due to column value types and/or number of input rows meeting the respective parameters is optionally designated as the right input row set 2543, and the larger input row set that is estimated and/or known to require larger memory space is designated as the left input row set 2541, for example, to reduce the full set of right input rows required to be processed by a given parallelized process. In some cases, this optimization is performed even in the case of a left outer join or right outer join, where, if the right hand side designated in the query expression is in fact estimated to be larger than the left hand side, the "left" input row set 2541 that is segregated across all parallelized processes 2551 is selected to instead correspond to the right hand side designated by the query expression, and the "right" input row set 2543 that is segregated across all parallelized processes 2551 is selected to instead correspond to the left hand side designated by the query expression. In other embodiments, the vice versa scenario is applied, where the larger row set is designated as the right input row set 2543 processed by every parallelized process, and where the smaller row set is designated as the left input row set 2541 segregated into subsets each for processing by only one parallelized process.

Figure 25D:
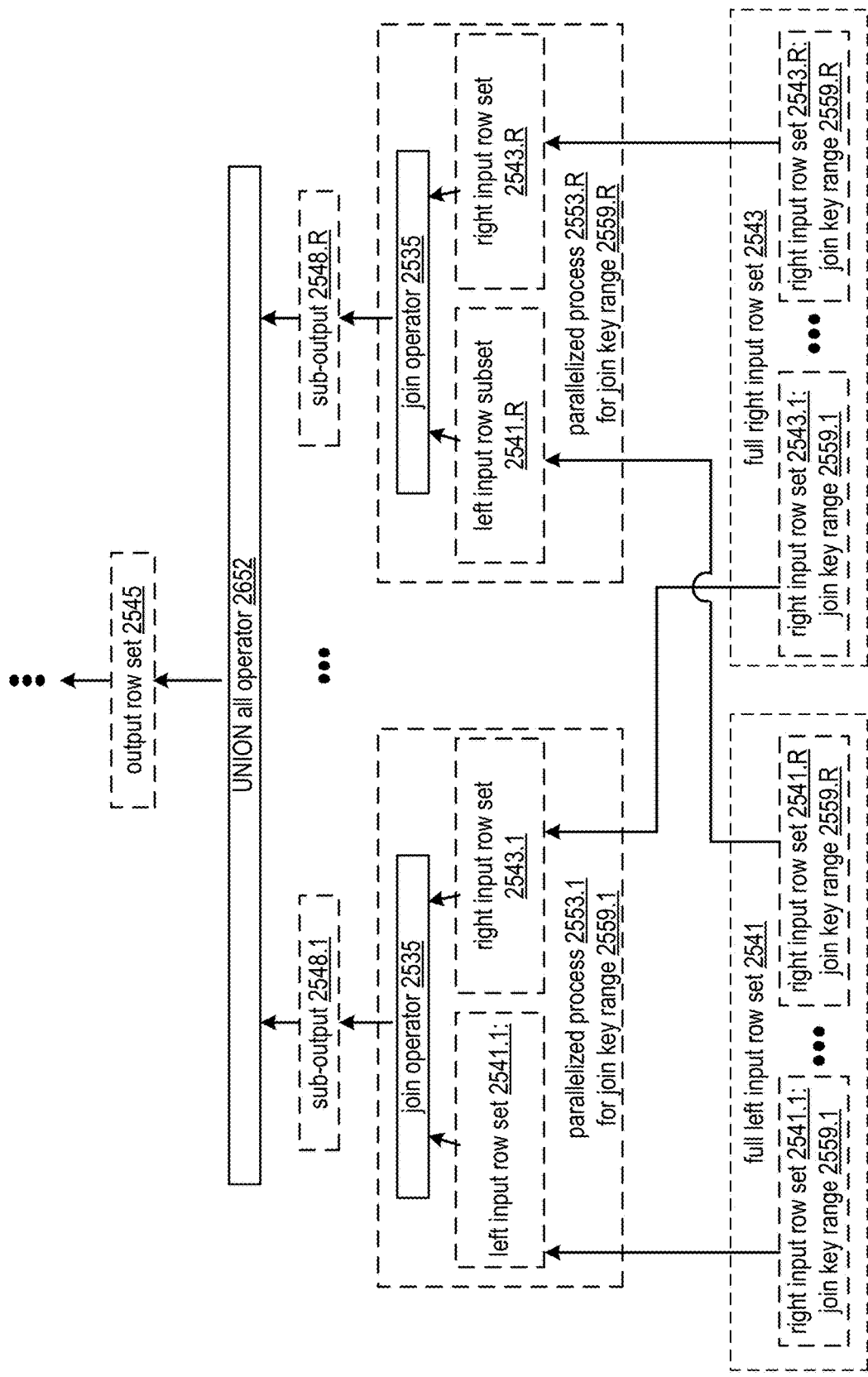

FIG. 25D illustrates an embodiment of execution of a join process 2530 via a plurality of parallelized processes 2553.1-2553.R. Some or all features and/or functionality of FIG. 25D can implement the join process 2530 of FIG. 25B, FIG. 25A, and/or any other embodiment of join process 2530 described herein.

The plurality of parallelized processes 2553.1-2553.R can implement the plurality of parallel processes 2550.1-2550.L of FIG. 25B, where a given process 2553 of FIG. 25D implements some or all of a given process 2550 of FIG. 25B. Alternatively or in addition, a given plurality of parallelized processes 2553.1-2553.R can be a plurality of inner, sub-processes of a given parallelized process 2550, where some or all of the plurality of parallel processes 2550.1-2550.L implement their own plurality of inner parallelized sub-processes 2553.1-2553.R.

Each parallelized process 2553 can be responsible for generating its own sub-output 2548 based on processing a corresponding one of the plurality of subsets of the full left input row set 2541, denoted as left input row sets 2541.1-2541.R, and by further processing a corresponding one of the plurality of subsets of the full right input row set 2543, denoted as right input row sets 2543.1-2543.R.

The left input row sets 2541.1-2541.R can be mutually exclusive and collectively exhaustive with respect to the full left input row set 2541, and can be partitioned by the join key of respective left input rows into a corresponding one of a set of join key ranges 2559.1-2559.R. For example, the join key of a left row is the value of one or more columns compared with values of right rows to determine whether the left row matches with any right rows. Thus, a given left input row sets 2541 from the full set is guaranteed to include all, and only, ones of the rows from the full set that fall within the respective join key range 2559.

Similarly, the right input row sets 2543.1-2543.R can be mutually exclusive and collectively exhaustive with respect to the full left input row set 2543, and also can be partitioned by the join key of respective right input rows into a corresponding one of a set of join key ranges 2559.1-2559.R, which can be identical ranges utilized to partition the left input rows into their respective sets 2541.1-2541.R. For example, the join key of a right row is the value of one or more columns compared with values of right rows to determine whether the left row matches with any right rows.

A given join key range 2559 can specify a single value, a set of continuous values, any set of multiple non-continuous values, and/or another portion of the domain of all possible join keys that is non-overlapping with other join key ranges. Applying the same set of join key ranges 2559.1-2559.R to route both left and right incoming rows to a parallelized process processing all rows having join keys in the respective range guarantees that any two rows in a matching pair of rows to be identified via the join will be processed by the same parallelized process 2553, and will thus be identified in the join process correctly. Thus, each parallelized process 2553 is guaranteed not to be missing any potential matches, and the output emitted by the union ALL operator can be therefore guaranteed to be correct.

In some cases, the value of null is implemented via own join key range 2559, is included in a given join key range 2559 with other non-null values, or is not included any join key ranges 2559 based on being filtered out and/or assigned to parallelized processes in a different manner.

Figure 25E:
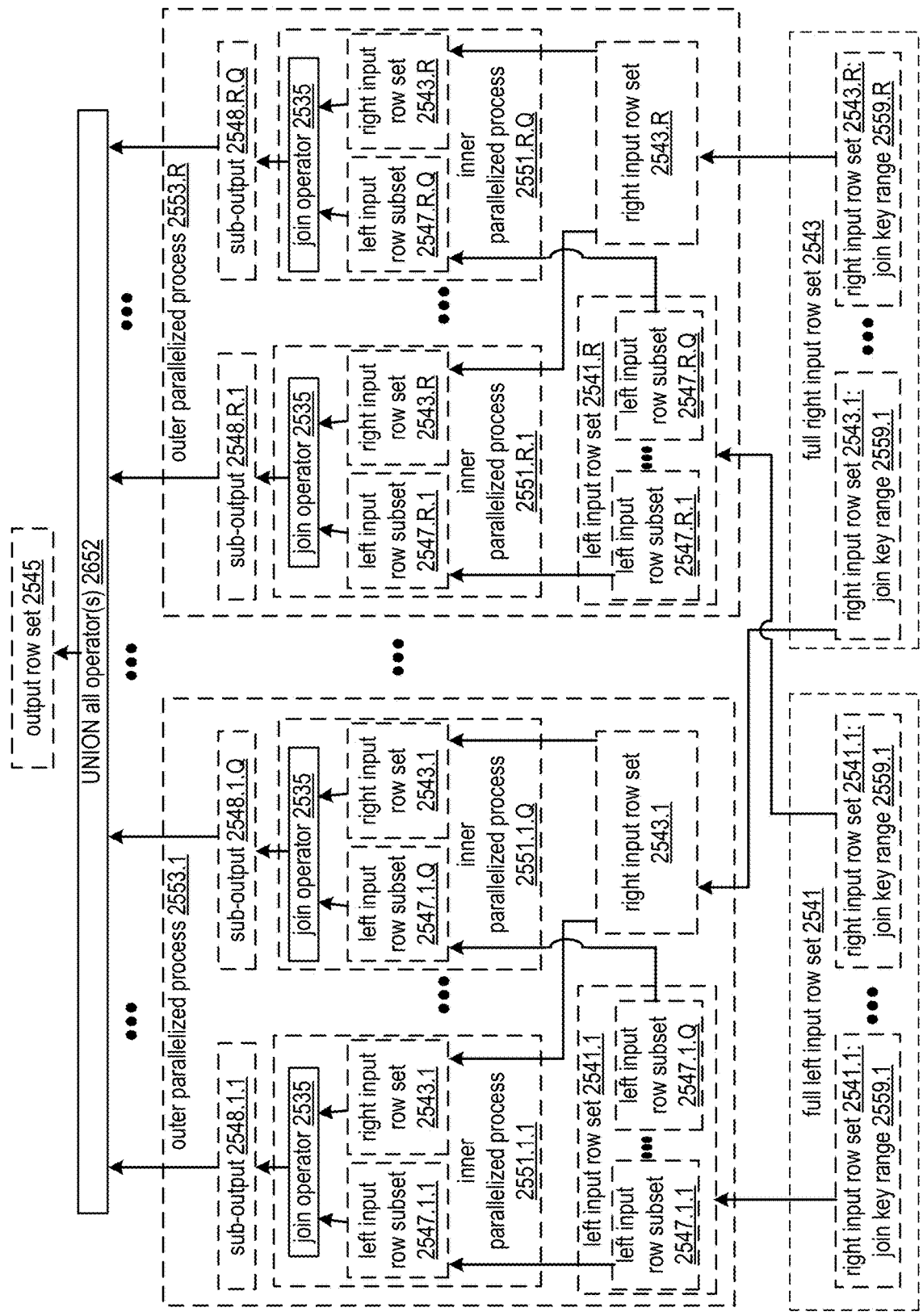

FIG. 25E illustrates an embodiment where the mechanisms of parallelization of both FIGS. 25C and 25D are combined to implement a join process. Some or all features and/or functionality of FIG. 25E can implement the join process 2530 of FIG. 25B, FIG. 25A, and/or any other embodiment of join process 2530 described herein.

The plurality of parallelized processes 2553.1-2553.R of FIG. 25D can be implemented as a plurality of outer parallelized processes, each performing its own set of inner parallelized processes implemented via the parallelized processes 2551.1-2551.Q of FIG. 25C. The number Q of inner parallelized processes 2551 implemented via a given outer parallelized process 2553 can be the same or different for different outer parallelized processes 2553.

The plurality of outer parallelized processes 2553.1-2553.R and/or the plurality of inner parallelized processes 2551.1-2551.Q across all of the plurality of outer parallelized processes 2553.1-2553.R can implement the plurality of parallel processes 2550.1-2550.L of FIG. 25B, where a given process 2553 and/or 2551 of FIG. 25E implements some or all of a given process 2550 of FIG. 25B. Alternatively or in addition, a given plurality of parallelized processes 2553.1-2553.R can be a plurality of inner, sub-processes of a given parallelized process 2550, where some or all of the plurality of parallel processes 2550.1-2550.L implement their own plurality of inner parallelized subprocesses 2553.1-2553.R, which each in turn implement their own plurality of parallelized processes 2551.1-2551.Q.

This embodiment can be preferred in reducing the size of hash map 2555 stored via each parallelized instance by leveraging partitioning via join key range, while further parallelization of the left input set of a given join key range further improves performance of implementing the join process for a given join key range 2559. Other embodiments only implement one of the forms of parallelization, or neither, in performing join processes 2530.

Figure 25F:
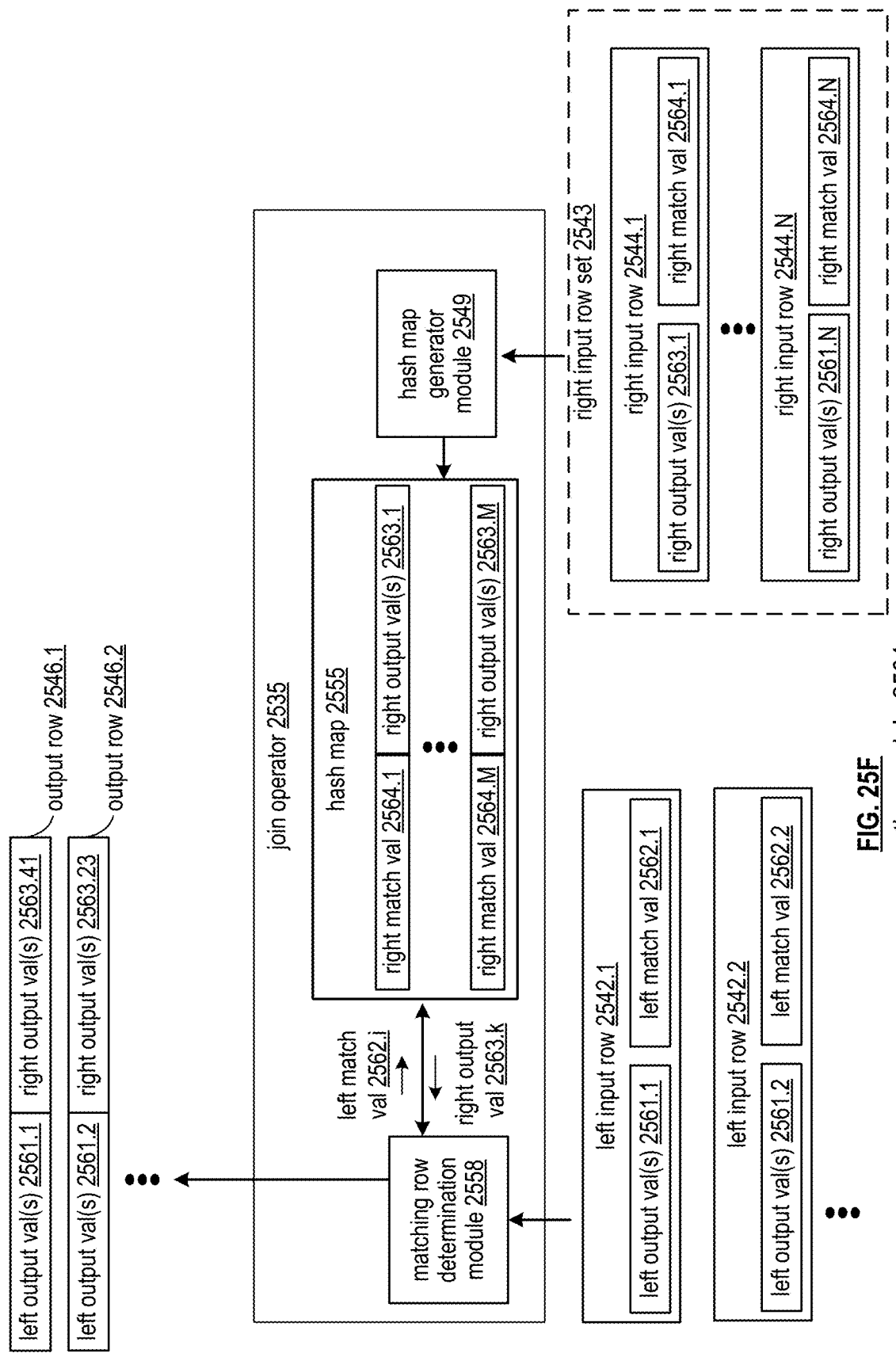
FIG. 25F is a schematic block diagram of a query execution module executing a join operator based on utilizing a hasp map generated from right input rows in accordance with various embodiments.

FIG. 25F illustrates an embodiment of a query execution module 2504 executing a join operator 2535. The embodiment of implementing the join operator 2535 of FIG. 25F can be utilized to implement the join process 2530 of FIG. 25A and/or can be utilized to implement the join operator 2535 executed via each of a set of parallelized processes 2550 of FIG. 25B, and/or via each of a set of parallelized processes 2551 and/or 2553 of FIG. 25D, 25D, and/or 25E.

The join operator can process all right input rows 2544.1-2544.N of a right input row set 2543, and can process some or all left input rows 2542, such as only left input rows of a corresponding left input row subset 2547. The right input rows 2544 and/or left input rows can be received as one or more streams of data blocks.

A plurality of left input rows 2542 can have a respective plurality of columns each having its own column value. One or more of these column values can be implemented as left output values 2561, designated for output in output rows 2546, where these left output values 2561, if outputted, are padded with nulls or combined with corresponding right rows when matching condition 2519 is met. One or more of these column values can be implemented as left match values 2562, designated for use in determining whether the given row matches with one or more right input rows. The left match values 2562 can implement the join keys discussed previously that are optionally utilized to partition incoming rows into distinct parallelized portions for processing as discussed in conjunction with FIGS. 25D and 25E. These left match values 2562 can be distinct columns from the columns that include left output values 2561, where these columns are utilized to identify matches only as required by the matching condition 2519, but are not to be emitted as output in output rows 2546. Alternatively, some or all of these left match values 2562 can be same columns as one or more columns that include left output values 2561, where these columns are utilized to not only identify matches as required by the matching condition 2519, but are further emitted as output in output rows 2546.

In some cases, the left input rows 2542 utilize a single column whose values implement both the left output values 2561 and the left match values 2562. In other cases, the left input rows 2542 can utilize multiple columns, where a first subset of these columns implement one or more left output values 2561, where a second subset of these columns implement one or more left match values 2562, and where the first subset and the second subset are optionally equivalent, optionally have a non-null intersection and/or a non-null difference, and/or optionally are mutually exclusive. Different columns of the left input rows can optionally be received and processed in different column streams, for example, via a distinct set of processes operating in parallel with or without coordination.

Similarly to the left input rows, the plurality of right input rows 2544 can have a respective plurality of columns each having its own column value. One or more of these column values can be implemented as right output values 2563, designated for output in output rows 2546, where these left output values 2561, if outputted, are padded with nulls or combined with corresponding left rows when matching condition 2519 is met. One or more of these column values can be implemented as left match values 2564, designated for use in determining whether the given row matches with one or more left input rows. The right match values 2564 can implement the join keys discussed previously that are optionally utilized to partition incoming rows into distinct parallelized portions for processing as discussed in conjunction with FIGS. 25D and 25E. These right match values 2564 can be distinct columns from the columns that include right output values 2563, where these columns are utilized to identify matches only as required by the matching condition 2519, but are not to be emitted as output in output rows 2546. Alternatively, some or all of these right match values 2564 can be implemented via same columns as one or more columns that include left output values 2561, where these columns are utilized to not only identify matches as required by the matching condition 2519, but are further emitted as output in output rows 2546.

In some cases, the right input rows 2544 utilize a single column whose values implement both the left output values 2561 and the left match values 2564. In other cases, the right input rows 2544 can utilize multiple columns, where a first subset of these columns implement one or more right output values 2563, where a second subset of these columns implement one or more right match values 2564, and where the first subset and the second subset are optionally equivalent, optionally have a non-null intersection and/or a non-null difference, and/or optionally are mutually exclusive. Different columns of the right input rows can optionally be received and processed in different column streams, for example, via a distinct set of processes operating in parallel with or without coordination.

Some or all of the set of columns of the left input rows can be the same as or distinct from some or all of the set of columns of the right input rows. For example, the left input rows and right input rows come from different tables, and include different columns of different tables. As another example, the left input rows and right input rows come from different tables each having a column with shared information, such as a particular type of data relating the different tables, where this column in a first table from which the left input rows are retrieved is used as the left match value 2562, and where this column in a second table from which the right input rows are retrieved is used as the right match value 2564. As another example, the left input rows and right input rows come from a same table, for example, where the left input row set 2541 and right input row set 2543 are optionally equivalent sets of rows upon which a self-join is performed.

The join operator 2535 can utilize a hash map 2555 generated from the right input row set 2543, mapping right match values 2564 to respective right output values 2563. For example, the raw right match values 2564 and/or other values generated from, hashed from, and/or determined based on the raw right match values 2564, are stored as keys of the hash map. In the case where the right match value 2564 for a given right input row includes multiple values of multiple columns, the key can optionally be generated from and/or can otherwise denote the given set of values.

These keys can be implemented as, and/or can be generated as a deterministic function of such as a hash function of, join keys of incoming rows that utilized to identify whether the join's matching condition is satisfied. The join keys stored in a given hash map can correspond to join keys of a plurality of possible keys for the join, and/or only the join keys in the join key range 2559 that this hash map is generated for, where the given input row set 2541 utilized to generate the hash map 2555 is one of a plurality of distinct input row sets 2541.1-2541.R for a respective join key range 2559 of the plurality of distinct join key ranges 2559.1-2559.R.

The right match values 2564 in entries the hash map 2555 as corresponding keys of the hash map 2555 can each denote respective right output values 2563, for example, based on being mapped to row numbers and/or pointers to the respective row for the respective right output values 2563. Rather than the hash map storing the raw right output values 2563 themselves in its entries, these values can be denoted as row numbers and/or pointers mapped to a given key (e.g. given right match value 2564), denoting the storage location of the respective one or more right output values 2563 of a respective row, such as its ordering in a list of rows, an offset and/or other location information for this respective row in a corresponding column stream stored in query execution memory resources.

In some embodiments, the join operator 2535 be implemented as a hash join, and/or the join operator 2535 can utilize the hash map 2555 generated from the right input row set 2543 based on being implemented as a hash join.

The number of entries M of the hash map 2555 is optionally strictly less than the number of right input rows N based on one or more right input rows 2544 having a same right match value 2564 and/or otherwise mapping to the same key generated from their right match values. These right match values 2564 can thus be mapped to multiple corresponding right output values 2563 of multiple corresponding right input rows 2544. The number of entries M of the hash map 2555 is optionally equal to N in other cases based on no pairs of right input rows 2544 sharing a same right match value 2564 and/or otherwise not mapping to the same key generated from their right match values.

The join operator 2535 can generate this hash map 2555 from the right input row set 2543 via a hash map generator module 2549. Alternatively, the join operator can receive this hash map and/or access this hash map in memory. In embodiments where multiple parallelized processes 2550 are employed, each parallelized processes 2550 optionally generates its own hash map 2555 from the full set of right input rows 2544 of right input row set 2543. Alternatively, as the hash map 2555 is equivalent for all parallelized processes 2550, the hash map 2555 is generated once, and is then sent to all parallelized processes and/or is then stored in memory accessible by all parallelized processes.

The join operator 2535 can implement a matching row determination module 2558 to utilize this hash map 2555 to determine whether a given left input row 2542 matches with a given right input row 2543 as defined by matching condition 2519. For example, the matching condition 2519 requires equality of the column that includes left match values 2562 with the column that includes right match values 2564, or indicates another required relation between one or more columns that includes one or more corresponding left match values 2562 with one or more columns that include one or more right match values 2564. For a given incoming left input row 2542.$i$, the matching row determination module 2558 can access hash map 2555 to determine whether this given left input row's left match value 2562 matches with any of the right match values 2564, for example, based on the left match value being equal to and/or hashing to a given key and/or otherwise being determined to match with this key as required by matching condition 2519.

In the case where a match is identified as a right input row 2544$k$, the right output value 2563 is retrieved and/or otherwise determined based on the hash map 2555, and the respective output row 2546 is generated to include the new row generated to include both the one or more left output values 2561.$i$ of the left input row 2542.$i$, as well as the right output values 2563.$k$ of the identified matching right input row 2544.$k$.

In this example, a first output value includes left output value 2561.1 and right output value 2563.41 based on the left match value 2562.1 of left input row 2542.1 being determined to be equal to, or otherwise match with as defined by the matching condition 2519, the right match value 2564.41 of the right input row 2542.41. Similarly, a second output value includes left output value 2561.2 and right output value 2563.23 based on the left match value 2562.2 of left input row 2542.2 being determined to be equal to, or otherwise match with as defined by the matching condition 2519, the right match value 2564.23 of the right input row 2542.23.

While not illustrated, in some cases, one or left match values 2562 of one or more left input rows 2542 are determined match with no right match values 2564 of any right input rows 2544, for example, based on matching row determination module 2558 searching the hash map for these raw and/or processed left match values 2562 and determining no key is included in the hash map, or otherwise determining no right match value 2564 is equal to, or otherwise matches with as defined by the matching condition 2519, the given left match value 2562. The respective left output values of these left input rows 2542 can be padded with null values in output rows 2546, for example, in the case where the join type is a full outer join or a left outer join. Alternatively, the respective left output values of these left input rows 2542 are not emitted in respective output rows 2546, for example, in the case where the join type is an inner join or a right outer join.

While not illustrated, in some cases, one or left match values 2562 of one or more left input rows 2542 are determined match with right match values 2564 of multiple right input rows 2544, for example, based on matching row determination module 2558 searching the hash map for these raw and/or processed left match values 2562 and determining a key is included in the hash map 2555 that maps to multiple right output values 2563 of multiple right input rows 2544. The respective left output values of these left input rows 2542 can be emitted in multiple corresponding output rows 2546, where each of these multiple corresponding output rows 2546 includes the right output values 2563 of a given one of the multiple right input rows 2544. For example, if the left match values 2562 of a given left input rows 2542 matches with right match values 2564 of three right input rows 2544, the left match values 2562 is emitted in three output rows 2546, each including the respective one or more right output values of a given one of the three right input rows 2544.

While not illustrated, in some cases, after processing the left input rows, one or more or right match values 2562 of one or more right input rows 2544 are determined not to have matched with any left match values 2562 of any of the received left input rows 2542, for example, based on matching row determination module 2558 never accessing these entries having these keys in the hash map when identifying matches for the left input rows. For example, execution of the join operator 2535 implementing a full outer join or a right join includes tracking the right input rows 2544 having matches, and all other remaining rows of the hash map are determined to not have had matches, and thus never had their output values 2563 emitted. In the case of a full outer join or a right join, the output values 2563 of these remaining, unmatched rows can be emitted as output rows 2546 padded with null values.

Figure 26A:
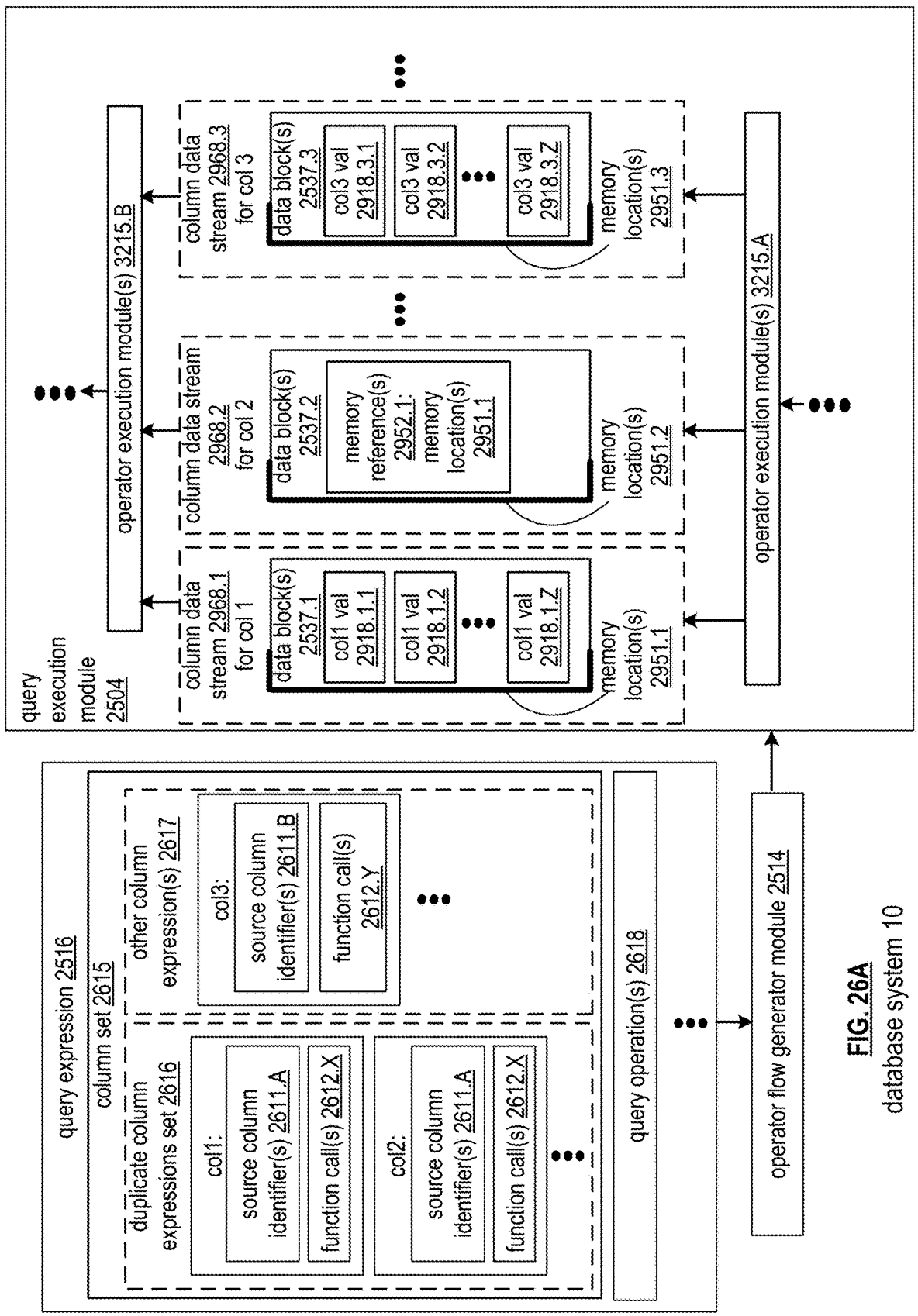
FIG. 26A is a schematic block diagram of a query execution module processing a multiple of column streams corresponding to a duplicate column expression in accordance with various embodiments.

FIG. 26A presents an embodiment of a query execution module 2504 of a database system 10 that processes multiple column streams corresponding to duplicate column expressions of a given query expression 2516 for execution based on storing column values in only one column stream of the multiple column streams, and storing references to the one column stream in other ones of the multiple column streams. Some or all features and/or functionality of the database system 10 of FIG. 26A can implement any other embodiment of database system 10 described herein.

Some query expression 2516 for execution (e.g. indicated in query requests 2515 in accordance with SQL syntax or in another query language) can indicate multiple instances of a same column expression be emitted or otherwise processed. Consider the following example query expression illustrating an example of such a case:

SELECT c1, c1, c1, abc(c1), abc(c1), abc(c1) FROM sys.dummy10

This example query expression can correspond to a full example query request, or a portion of a corresponding query request. In this example, a column having column identifier "c1" is indicated to be sourced and emitted directly three times via the SELECT statement, where "c1" corresponds to a first given column expression that is duplicated three times in this example query expression. For example, sys.dummy10 identifies a relational database table, and c1 is a column of the relational database table. Meanwhile, a second given column expression "abc(c1)" indicates a function having function identifier "abc" be applied to the column c1, and that the corresponding new column be emitted three times via the SELECT statement of the example query expression.

While this example expression illustrates a simple example, but is illustrative of cases where a query expression includes a same query expression many times (e.g. more than 10 times, dozens of times, etc.).

In some embodiments, processing such queries includes evaluating each duplicate instance of the column expression to generate corresponding column streams for processing. This can include copying the contents of a sourced column, and/or generating multiple instances of a new column, for each duplicate instance of the column expression. Such means of processing the example query expression above would thus involve generating a column stream for c1 and copying the contents of the column c1 twice, and would further involve and generating abc(c1) three times. In cases where the corresponding table has many rows and/or where column are duplicated many more times, copying the contents of a given row for each column or evaluating a same function upon a column multiple times to generate a corresponding column streams for processing can be expensive.

FIG. 26A illustrates an embodiment where, rather than copying the contents of a duplicated column of evaluating a corresponding expression multiple times, a single instance of the column stream is created, and a reference to that column stream is copied instead of manually copying the manually copying the column stream's contents. This can improve the technology of database systems based on reducing the storage required to store many copies of the same column and can further reduce the processing required to copy and emit values of a column by instead simply referencing the column.

The case where such functionality is employed can be detected when processing a given query expression based on detecting duplicate instances of a same column expression. In some embodiments, this case can be simple to detect, for example, because the postfix expression generated from a given query expression consists of only one token containing the name of the source column or corresponding expression. The database system can be operable to detect these cases and process the corresponding duplicate columns via reference accordingly during query execution.

In some embodiments, the referencing of column streams containing column values to implement column streams for other duplicate instances of the corresponding column expression can be similar conceptually to how entire data blocks or parts of data blocks are forwarded. For example, generation of column streams referencing a given column stream rather than containing column values can be performed via implementing some or all functionality of data block forwarding module 2949, and/or via implementing any embodiment of forwarding column values and/or corresponding sets of rows described herein.

In some embodiments, such relation to other column forwarding described herein can come with an additional caveat: in some cases, data block parts may not be unique, and so a corresponding serializer implemented by database system 10 cannot longer assume that each data block part is unique and only referenced once. This can also be the case in other functionality, such as in implementing tee operators directly below gathers.

As illustrated in FIG. 26A, a given query expression 2516 can indicate a column set 2615 (e.g. to be emitted via projection, to be processed via other operators, etc.). Some queries, such as the example discussed above and other similar cases, can indicate duplicate column expressions, where the column set 2615 thus implicitly includes at least one duplicate column expression set 2616, where multiple different columns to be emitted or processed defined via equivalent column expressions. These equivalent expressions can be identified via having a same postfix token, and/or based on identifying the same one or more source columns (e.g. columns of an existing table stored in memory resources, or of a new column generated during another portion of the query) and/or optionally further identifying the same function (e.g. a built-in function, a user-defined function, or any function denoted by a particular one or more characters defining how the one or more source columns be processed/manipulated in evaluating column values of a new column) be performed upon these one or more one or more same source columns (e.g. a column expression is defined as "c1+c2" denoting a new column be generated as a sum of these two columns identified via identifiers 2611 of "c1" and "c2", where "+" is the function call; a column expression is defined as "c1*10" denoting a new column be generated as ten times the column c1, of the column identified via identifier 2611 of "c1", where "*" is the function call and "10" is a literal value involved in the corresponding expression; etc.). In this example, a duplicate column expression set 2616 indicates at least a first and second column col1 and col2 (e.g. to be emitted or processed during query execution via corresponding column stream) correspond to duplicate column expressions based on indicating a same one or more source column identifiers 2611.A (e.g. "c1" of the example above) and/or, if applicable, further indicating a same function call 2612 (e.g. "abc( )" of the example above) be performed upon the one or more sourced columns indicated by source column identifiers 2611.A. Any number of additional columns can be included in duplicate column expression set 2616 in addition to col1 and col2 based on also being defined via the same column expression.

The column set 2615 can optionally further include one or more other column expressions different from the column expression of the duplicate column expression ser 2616 defined via the one or more source column identifiers 2611.A and/or the optional one or more function calls 2612.X. In this example, at least one other column col3 e.g. to be emitted or processed during query execution via corresponding column stream) is defined via a different column expression than that of col1 and col2, based on being indicated via source column identifiers 2611.B that are different from source column identifiers 2611.A of col1 and col2, and/or based on having different function calls 2612.Y that are different from function calls 2612.X of col1 and col2. In some cases, one or more other column expressions 2617 can have the same one or more source column identifiers 2611.A as those of col1 and col2, where the expressions are still different due to having different function calls (e.g. as in the example above, where "c1" and "abc(c1)" are different column expression despite indicating the source same column identifier "c1"). In some cases, one or more other column expressions 2617 can have the same function calls 2612.Y as those of col1 and col2, where the expressions are still different due to having different function identifiers (e.g. "abc(c1)" vs. and "abc(c2)" are different column expression despite indicating the source function call "abc( )"; "c1" and "c2" are different column expression despite both sourcing a column directly with no function applied to the sourced columns; etc.).

The other column expressions 2617 can include any number of same or different column expressions for any number of additional columns. The other column expressions 2617 can include one more additional duplicate column expression sets 2616 based on including other sets of two or more columns also having their own same column expression different from that of the duplicate column expression set 2616 that includes col1 and col2.

In the example expression discussed above, two different duplicate column expression sets 2616 are indicated in column set 2615: a first duplicate column expression set 2616 indicates three column streams generated for expression "c1" to source the existing column c1 and thus include the column values of column c1 for some or all rows of a corresponding table (e.g. all rows, or a filtered set of rows due to filtering being applied based on applying a filtering predicate indicated in the query expression 2516); and a second duplicate column expression set 2616 indicates three additional column streams generated for expression "abc (c1)" to include the values evaluated by performing the function "abc( )" upon the column values of column c1 for this same some or all rows of the corresponding table.

The query expression 2516 can further indicate one or more query operations 2618 that can be performed upon the various columns of the column set 2615. For example, two or more columns of the column set 2516 undergo a join operation, and aggregation operation, filtering based on a filtering predicate, or other query operation implemented via execution of one or more corresponding operators 2520. In some cases, some or all of the columns of column set 2615 are simply emitted, for example, based on being projected and/or otherwise included in the query resultant.

The query execution module 2504 can execute a corresponding operator execution flow 2517 generated via operator flow generator module 2514 from the corresponding query. Based on there being at least one duplicate column expression set 2616 in the column set 2615 indicated by the query expression 2516, the execution of the corresponding query via query execution module 2504 can be configured to include implementing one or more column data streams 2968 to reference another column stream with the column values of the expression defining the duplicate column expression set 2616, where only one column data stream 2968.1 for one column of the set of columns in a given duplicate column expression set 2616 (e.g. for col1 in this example) has actual column values written to one or more corresponding data blocks 2537.1 (e.g. column values for a set of rows either read from storage and/or evaluated based on performing at least one function, for example, upon other column values read from storage), while all other column data streams 2938 for all other columns of the set of columns included in a given duplicate column expression set 2616 (e.g. including at least the column data stream 2968 col2 in this example) instead includes one or more memory references 2952.1 written to one or more corresponding data blocks 2537.2, where these one or more memory references 2952.1 indicate the one or more memory locations 2951.1 of the one or more corresponding data blocks 2537.1 that includes the column values for the corresponding column expressions, rather than also including copies of these column values.

The memory references 2952 and corresponding memory locations 2951 can be implemented via some or all features and/or functionality as discussed in conjunction with FIG. 24N and/or 24O, and/or via any other functionality of column streams and/or forwarding of rows/corresponding column values described herein. The memory references 2952.1 to memory locations 2951.1 can indicate memory locations of one or more data blocks 2537.1 implementing the column data stream 2968, and/or can indicate memory locations of one or more fixed-size memory fragments 2622 implementing these one or more data blocks 2537.1.

Other column streams for other column expressions can similarly include the respective column values for the set of rows (e.g. read from storage and/or evaluated based on performing at least one function). Any of these other column expression duplicated for multiple columns can similarly be referenced, where any given column expression indicated in the query expression, regardless of how many times it is duplicated, has column values included in only one column stream, while any other column streams for the same column expression reference the one or more memory location of this column stream.

These column streams can be generated based on execution of a corresponding or more operators 2520. For example, a same operator is executed to emit multiple ones of the set of column streams, and/or different operators are executed, for example, in parallel, to emit different ones of the set of column streams. The arrangement of such operators can be dictated by the corresponding operator execution flow. These one or more operators can be implemented via corresponding one or more operator execution modules 3215.A. For example, a given operator execution module 3215.A generates some or all of the column data streams 2968 based on implementing execution of at least one IO operator 2520; at least one filtering operator; at least one expression evaluation (e.g. an extend operation to generate new columns via evaluating a corresponding one or more function calls indicated in the corresponding column expression) and/or otherwise read/generate the column values 2918 for some or all rows (e.g. all rows of a corresponding relational database table or a filtered subset of these rows based on having applied at least one filtering predicate).

In some embodiments, a corresponding new column is generated based on evaluating a corresponding expression via based on operator execution modules 3215 implementing some or all features and/or functionality of: expression evaluation operator 2524; extend element 3240; extend operation 3110 to evaluate a corresponding extend function 3113; and/or any other corresponding functionality to generate corresponding new values of a new column based on evaluating a corresponding expression; as disclosed by: U.S. Utility application Ser. No. 17/073,567. entitled "DELAYING EXCEPTIONS IN QUERY EXECUTION", filed Oct. 19, 2020, which is hereby incorporated herein by reference in its entirety and made part of the present U.S. Utility Patent Application for all purposes; U.S. Utility application Ser. No. 18/321,906. entitled "PROCESSING LEFT JOIN OPERATIONS VIA A DATABASE SYSTEM BASED ON FORWARDING INPUT", filed May 23, 2023, which is hereby incorporated herein by reference in its entirety and made part of the present U.S. Utility Patent Applications for all purposes; U.S. Utility application Ser. No. 18/310,177. entitled "OPTIMIZING AN OPERATOR FLOW FOR PERFORMING AGGREGATION VIA A DATABASE SYSTEM", filed May 1, 2023, which is hereby incorporated herein by reference in its entirety and made part of the present U.S. Utility Patent Applications for all purposes; and/or U.S. Utility application Ser. No. 18/309,897. entitled "OPTIMIZING AN OPERATOR FLOW FOR PERFORMING FILTERING BASED ON NEW COLUMNS VALUES VIA A DATABASE SYSTEM", filed May 1, 2023, which is hereby incorporated herein by reference in its entirety and made part of the present U.S. Utility Patent Applications for all purposes.

The same or different operator execution module 3215.A can generate some or all column streams referencing a given column stream by memory reference(s) 2952 to the corresponding memory location(s) 2951 for some or all corresponding columns having a duplicated column expression. This can include these one or more operator execution modules 3215.A implementing some or all features and/or functionality of data block forwarding module 2949. In some embodiments, a first operator execution module 3215 generates the column values of a given column (e.g. col1) as output data blocks, where a second operator execution module 3215 processes the these data blocks for this given column to generate some or all of the other column streams for the additional columns for the same column expression (e.g. col2) as its own output data blocks. In other embodiments, a first operator execution module 3215 generates the column values of a given column (e.g. col1) as output data blocks, and also generates some or all of the other column streams for the additional columns for the same column expression (e.g. col2) as its own output data blocks.

The same or different operator execution module 3215.A can generate some or all column streams corresponding to different column expressions. In some embodiments, a first operator execution module 3215 generates the column values of a given column (e.g. col1) as output data blocks, where a second operator execution module 3215 generates the column values of another given column (e.g. col3) as output data blocks. In other embodiments, a first operator execution module 3215 generates the column values of a given column (e.g. col1) as output data blocks, and also generates the column values of another given column (e.g. col3) as output data blocks.

These column streams generated by can be processed by one or more other operator execution module 3215.B in conjunction with executing the corresponding query. For example, a same operator is executed to processes multiple ones of the set of column streams, and/or different operators are executed, for example, in parallel, to process different ones of the set of column streams. The arrangement of such operators can be dictated by the corresponding operator execution flow. These one or more operators can be implemented via corresponding one or more operator execution modules 3215.B. For example, a given operator execution modules 3215.B processes some or all of the column data streams 2968 as input to generate respective output (e.g. its own one or more data blocks for processing by one or more another operators, or to generate the query resultant) based on implementing execution of at least one filtering operator; at least one aggregation operator; at least one projection operator (e.g. simply emit the columns of these column streams as the query resultant based on these columns being requested in a SELECT operation); at least one join operator; and/or otherwise filter/aggregate/join/forward/copy/project/manipulate/process the column values 2918 of incoming data blocks for some or all of the rows (e.g. all rows of a corresponding relational database table or a filtered subset of these rows based on having applied at least one filtering predicate). Different column streams can optionally be processed differently via different operator execution modules.

A given operator execution module 3215.B can process some or all column streams referencing a given column stream by memory reference(s) 2952 to the corresponding memory location(s) 2951 based on reading the memory reference(s) 2952 in the corresponding input data block, and accessing the corresponding data block(s) 2537 accordingly. For example, an operator execution module 3215.B processing the column data stream 2968.2 for col2 reads the memory reference(s) 2952.1 to memory location(s) 2951.2 from the one or more data blocks 2537.2 stored in memory location 2952.2 accordingly to identify the corresponding data block(s) 2537.1 storing the column values 2918 for col1 (and thus also col2, as they represent equivalent column expressions).

Depending on the operator being executed, the operator execution module 3215.B can read the column values 2918 to generate its output (e.g. these values are read, copied as output, processed as input to generate new values as output, processed as input to filter out rows, processed as input to build a hash map for a join expression or aggregation or blocking operation, processed as input to identify matches with values in a hash map for a join expression, and/or otherwise processed). Alternatively or in addition, depending on the operator being executed, the operator execution module 3215.B optionally forwards the column values 2918 based on forwarding the memory reference(s) 2952.1. This forwarding can optionally include forwarding the data block(s) 2537.1 directly via copying memory reference(s) 2952.1 from the input data block to an output data block (e.g. read memory reference(s) 2952.1 from the input data block, and copy the value into the output data block). This forwarding can optionally instead include forwarding the data block(s) 2537.1 via forwarding the data block(s) 2537.2 referencing these data blocks by reference itself via instead writing new memory reference(s) 2952.2 to memory location 2951.2 of data block 2537.2 to an output data block, where this output data block is optionally later processed to identify the original column values by reading the memory reference(s) 2952.2 to access data block 2537.2 in memory location 2951.2, and then by further reading memory reference(s) 2952.1 from data block 2537.2 based on accessing data block 2537.2 in memory location 2951.2 to ultimately access data block 2537.1, where the column values 2918 can be read/processed/copied as needed.

FIG. 26B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26B. In particular, a node 37 can utilize the query processing module 2435 to execute some or all of the steps of FIG. 26B, where multiple nodes 37 implement their own query processing modules 2435 to independently execute the steps of FIG. 26B, for example, to facilitate execution of a query as participants in a query execution plan 2405. Some or all of the method of FIG. 26B can be performed by the query processing system 2510, for example, by utilizing an operator flow generator module 2514 and/or a query execution module 2504. In particular, some or all of the method of FIG. 26B can be performed via one or more operator executions of one or more row dispersal operators and/or one or more load operators 2535. Some or all of the steps of FIG. 26B can optionally be performed by any other processing module of the database system 10. Some or all of the steps of FIG. 26B can be performed to implement some or all of the functionality of the database system 10 as described in conjunction with FIGS. 26A, for example, by implementing some or all of the functionality of processing column streams 2968, where some of these column streams are stored in data blocks that include memory references to the memory location(s) of data blocks for other column streams in the case where they implement a duplicated column expression. Some or all of the steps of FIG. 26B can be performed to implement some or all of the functionality row dispersal operators implemented in executing queries by query processing system 2510 as described in conjunction with FIGS. 25A-25F. Some or all of the steps of FIG. 26B can be performed to implement some or all of the functionality regarding execution of a query via the plurality of nodes in the query execution plan 2405 as described in conjunction with some or all of FIGS. 24A-24I. Some or all steps of FIG. 26B can be performed by database system 10 in accordance with other embodiments of the database system 10 and/or nodes 37 discussed herein. Some or all steps of FIG. 26B can be performed in conjunction with one or more steps of any other method described herein.

Step 2682 includes determining a query expression for execution indicating processing of a set of columns defined via a corresponding set of column expressions, In various examples, multiple ones of the set of columns are defined via duplicate instances of a same column expression of the corresponding set of column expressions.

Step 2684 includes executing a query corresponding to the query expression based on processing a set of column streams corresponding to the set of columns. In various examples, based on the multiple ones of the set of columns being defined via the duplicate instances of the same column expression, the set of column streams includes: a first column stream corresponding to a first one of the multiple ones of the set of columns that includes a plurality of column values; and/or at least one additional column stream corresponding to all other ones of the multiple ones of the set of columns that includes at least one memory reference indicating at least one memory location of the first column stream.

In various examples, executing the query corresponding to the query expression further includes: generating the set of column streams as output data blocks of at least one first operator of the query. In various examples, generating the set of column streams includes generating the first column stream by: evaluating the same column expression to generate the plurality of column values; and/or storing the plurality of column values in the at least one memory location of the first column stream. In various examples, generating the set of column streams includes generating the at least one additional column stream by storing the at least one memory reference in at least one second memory location of the at least one additional column stream.

In various examples, the set of column streams corresponding to the set of columns are processed as input data blocks of at least one second operator of the query. In various examples, processing the set of column streams includes processing the first column stream by accessing the plurality of column values in the at least one memory location of the first column stream. In various examples, processing the set of column streams includes processing the at least one additional column stream by: accessing the at least one memory reference in the at least one second memory location of the at least one additional column stream; and/or utilizing the at least one memory reference to access the plurality of column values in the at least one memory location of the first column stream.

In various examples, the method further includes generating a query operator execution flow based on the query expression that indicates execution of the first operator serially before execution of the second operator, wherein executing the query is based on executing the query operator execution flow.

In various examples, the at least one first operator includes at least one IO operator, and wherein generating the first column stream is based on accessing the plurality of column values in database storage resources.

In various examples, the at least one second operator includes at least one of: at least one projection operator; at least one filtering operator; at least one join operator; or at least one aggregation operator.

In various examples, the query expression indicates execution of the query against a relational database table. In various examples, the same column expression indicates a column identifier for a first column of the relational database table. In various examples, the plurality of column values are based on corresponding column values of the first column for a subset of a plurality of rows of the relational database table.

In various examples, the subset of the plurality of rows of the relational database table includes all of the plurality of rows of the relational database table, or only a proper subset of the plurality of rows of the relational database table based on at least one filtering predicate of the query expression being applied to the first column.

In various examples, the same column expression indicates only the column identifier. In various examples, the plurality of column values are the corresponding column values of the first column for the at least some of the plurality of rows of the relational database table.

In various examples, the same column expression further indicates a function identifier for a function to be performed upon the first column. In various examples, the method further includes generating the plurality of column values as a plurality of new values based on executing the function upon the corresponding column values of the first column.

In various examples, each new value of the plurality of new values is generated as output of executing the function upon a corresponding column value of the corresponding column values for a corresponding row of the subset of the plurality of rows.

In various examples, the method further includes generating a postfix expression from the query expression indicating exactly one token indicating a corresponding name of the same column expression. In various examples, determining the multiple ones of the set of columns are defined via the duplicate instances of the same column expression of the corresponding set of column expressions based on the exactly one token for the same column expression being indicated in the postfix expression. In various examples, determining the multiple ones of the set of columns are defined via the duplicate instances of the same column expression of the corresponding set of column expressions is based on the exactly one token for the same column expression being indicated in the postfix expression multiple times based on being duplicated for the multiple ones of the set of columns.

In various examples, a single one of the set of columns is defined via a single instance of a second column expression of the corresponding set of column expressions. In various examples, the second column expression is different from the same column expression. In various examples, based on the single one of the set of columns being defined via the single instance of the second column expression, the set of column streams further includes only a single column stream corresponding to the second column expression. In various examples, the single column stream corresponding to the second column expression includes a second plurality of column values. In various examples, the single column stream is stored in at least one second memory location, and no other column streams of the set of column streams indicate the second memory location based on only the single one of the set of columns being defined via the second column expression.

In various examples, second multiple ones of the set of columns are defined via second duplicate instances of a second same column expression of the corresponding set of column expressions. In various examples, the second same column expression is different from the same column expression. In various examples, based on the second multiple ones of the set of columns being defined via the second duplicate instances of the second same column expression, the set of column streams further includes: a second column stream corresponding to a first one of the second multiple ones of the set of columns that includes a second plurality of column values; and/or at least one second additional column stream corresponding to all other ones of the second multiple ones of the set of columns that includes at least one second memory reference indicating a second memory location of the second column stream.

In various examples, the same column expression indicates a first column of a relational database table, and the second same column expression indicates a second column of the relational database table.

In various examples, the same column expression indicates a first function be performed upon a first column of a relational database table, and the second same column expression indicates a second function be performed upon the first column of the relational database table.

In various embodiments, any one or more of the various examples listed above are implemented in conjunction with performing some or all steps of FIG. 26B. In various embodiments, any set of the various examples listed above can implemented in tandem, for example, in conjunction with performing some or all steps of FIG. 2726B B.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26B described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26B, for example, in conjunction with further implementing any one or more of the various examples described above.

In various embodiments, the operational instructions, when executed by the at least one processor, cause the database system to: determine a query expression for execution indicating processing of a set of columns defined via a corresponding set of column expressions, where multiple ones of the set of columns are defined via duplicate instances of a same column expression of the corresponding set of column expressions; and/or execute a query corresponding to the query expression based on processing a set of column streams corresponding to the set of columns, where, based on the multiple ones of the set of columns being defined via the duplicate instances of the same column expression, the set of column streams includes a first column stream corresponding to a first one of the multiple ones of the set of columns that includes a plurality of column values and at least one additional column stream corresponding to all other ones of the multiple ones of the set of columns that includes at least one memory reference indicating at least one memory location of the first column stream.

Figure 27A:
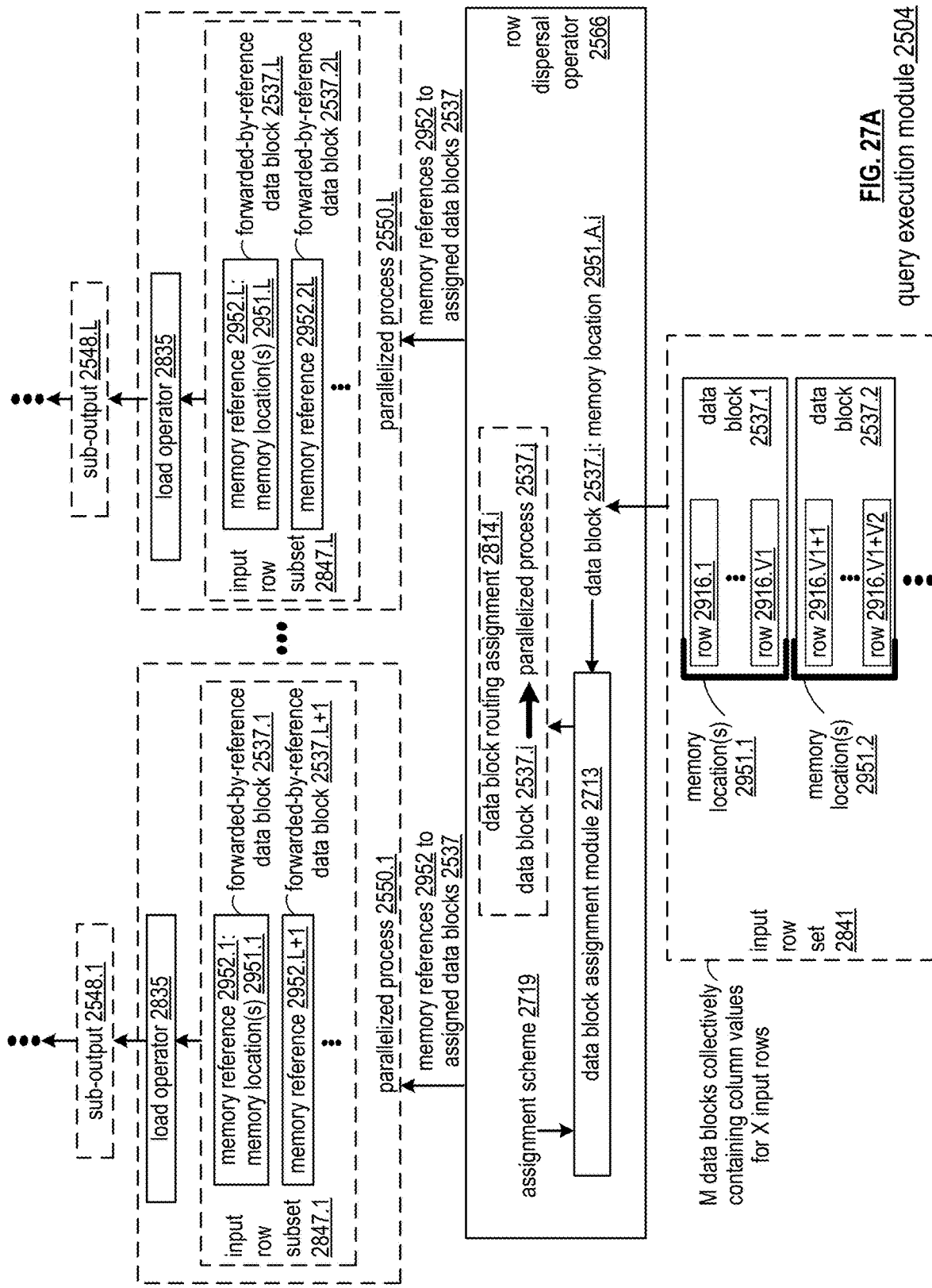
FIG. 27A is a schematic block diagram of a query execution module executing a row dispersal operator based on forwarding data blocks by reference in accordance with various embodiments.

FIG. 27A presents an embodiment of database system 10 that executes a query via a query execution module 2504 based on implementing a row dispersal operator 2566 that disperses rows of input row set 2841 based on forwarding data blocks 2537 by reference to corresponding parallelized processes 2550 in accordance with an assignment scheme 2719. Some or all features and/or functionality of the database system 10 of FIG. 27A can implement any embodiment of database system 10 described herein.

Row dispersal can be implemented via performing a random shuffle to send incoming blocks or incoming rows to a random and/or round-robin-ed peer in order to place a relatively equal amount of data/work on each corresponding parallelized process. A corresponding row dispersal operator 2566 can perform this dispersal in corresponding query operator execution flows 2517, for example, via placement in the flow. IO operators that read the corresponding full set of rows to be shuffled and/or below a parallelize serially before a set of load operators operable to process corresponding, random subsets of this full set of rows. For example, the row dispersal operator 2566 can be implemented as a shuffle operator as described herein, and/or can optionally implement any row and/or data shuffling via a shuffle node set 2485 via a shuffle network 2480. The set of parallelized load operators can be implemented as join operators, aggregation operators blocking operators, filtering operators, parent operators of the row dispersal operator, and/or any operator 2520 described herein, and/or any other operator that processes a plurality of rows, for example, in a stream to generate a stream of output, and/or parallel with other processes to ultimately have their outputs UNION-ed together. In particular, union-ing the output of the set of parallelized load operators each processing a corresponding subset of rows from a full row set can be semantically equivalent to a single load operator processing the full row set, where this divided, parallelized processing is utilized to render higher processing efficiency, for example, based on each parallelized process needing to process fewer rows and/or based on different sets of parallelized resources implementing each load operator.

In some embodiments, the random shuffling implemented by row dispersal operator 2566 is implemented to evenly distribute data. In some embodiments, random shuffling is implemented after IO operators, for example, when estimated table row cardinality is low. Alternatively or in addition, random shuffling can be implemented before load operators, for example unconditionally, because the absence of partitioning does not necessarily indicate an absence of data skew).

In some embodiments, the row dispersal operator 2566 can assign each incoming row 2916 to a parallelized process 2550 for processing. For example, rows are dispersed via a round robin or other uniform scheme across outputs destined for each parent (e.g. each parallelized process 2550). This can require the row dispersal operator 2566 eventually manually copy all such input rows, which can be extremely expensive.

FIG. 27A presents a more efficient means of dispersing rows, while still maintaining a desired distribution (e.g. uniform distribution). Rather than assigning individual rows across the parents (e.g. parallelized processes 2550.1-2550.L). This enables the forwarding of a reference to the data, rather than copying it, which can be much faster. This can include implementing some or all features and/or functionality of the forwarding by reference discussed in conjunction with FIG. 26A and/or other forwarding of data blocks by reference described herein. This solution can still render appropriate distribution, for example, when the number of data blocks is sufficiently large and/or based on the contents/sizes across data blocks being sufficiently even, where such round robin division of such larger units suffices.

As illustrated in FIG. 27A, an input row set 2841 that includes a plurality of rows 2916 can be dispersed across parallelized processes based on forwarding of each corresponding data blocks 2537.1-2537.M containing a proper subset of the plurality of rows by reference.

Each data block 2537 can include a corresponding plurality of rows 2916.1-2916.V, where the number of rows V in each data block is the same or different for each data block 2537. The plurality of data blocks 2537.1-2537.M can correspond to a plurality of data blocks of a particular column stream 2968, storing/referencing column values 2918 for one or more particular columns (e.g. of a corresponding relational database table. Each data block 2537 can be stored in a corresponding one or more memory locations 2951, for example, based on the column values of its rows 2916 being stored in one or more corresponding fixed-sized memory fragments 2622.1-2622.Z of the data block 2537.

A data block assignment module 2713 can assign each given incoming data block 2537.i to exactly one corresponding parallelized process 2537.j for processing via a corresponding data block routing assignment 2814.j. A memory reference 2952.i indicating a corresponding memory location 2951.i of data block 2537.i can be sent to the corresponding parallelized process 2550.j indicated by the data block routing assignment 2814.i for data block 2537.i.

As a result, a set of parallelized processes 2550.1-2550.L are each assigned a corresponding input row subset 2847 for processing, where the set of input row subsets 2847.1-2847.L assigned across the parallelized processes 2550.1-2550.L are mutually exclusive and collectively exhaustive with respect to the input row set 2841. Furthermore, as the rows are dispersed via assigning of full data blocks to different parallelized processes, the set of parallelized processes 2550.1-2550.L are each assigned the corresponding input row subset 2847 for processing based on being assigned a corresponding subset of data blocks 2537 of the full set of data blocks 2537.1-2537.M for processing, where a plurality of subsets of data blocks assigned across the parallelized processes 2550.1-2550.L are mutually exclusive and collectively exhaustive with respect to the full set of data blocks 2537.1-2537.M.

The corresponding subset of data blocks 2537 encompassing a corresponding input row subset 2847 of a given parallelized process 2550 can be indicated by a corresponding set of memory references 2952 indicating the respective memory locations 2951 of these corresponding data blocks 2537, indicating the forwarded-by-reference data blocks rather than the contents of each data block having been copied and sent to the parallelized process (e.g. in new data blocks of a new data stream). This can include implementing some or all features and/or functionality of data block forwarding module 2949 of FIG. 24O. The given parallelized process can access/process the corresponding forwarded-by-reference data blocks based on accessing the contents via the memory location 2951 indicated by the respective memory reference 2951. For example, a load operator 2835 executed via the given parallelized process can process the input row subset 2847 based on accessing the respective rows 2916 in the data block via the memory location 2951 indicated by the respective memory reference 2951. In some cases, the load operator 2835 executed via the given parallelized process can process the input row subset 2847 based on further forwarding some or all of these data blocks to forward some or all corresponding rows 2916.

The assignment of data blocks 2537.1-2537.M across parallelized processes 2550.1-2550.L can be in accordance with a corresponding assignment scheme 2719. For example, the assignment scheme 2719 is a uniform assignment scheme rendering uniform/substantially uniform distribution of the data blocks (and thus uniform/substantially uniform distribution of the underlying rows in the case where M is sufficiently large and/or where V is sufficiently even across data blocks). In such cases, each input row set can include exactly/approximately M/L data blocks (e.g. within a threshold difference from M/L data blocks, corresponding to sufficiently even dispersal of data blocks), which can render each input row set including exactly/approximately X/L rows (e.g. within a threshold difference from X/L rows, corresponding to sufficiently even dispersal of rows), where X is the total number of rows in input row set 2841.

Such a uniform assignment scheme can optionally be implemented as a round-robin assignment scheme, where data block 1 is assigned to parallelized process 1; data block 2 is assigned to parallelized process 2; and so on, repeating after L data blocks have been assigned. For example, given data block 2537.i is assigned to parallelized processes 2537.j as illustrated in FIG. 27A, where j is equal to and/or based on the value of i modulo L. Such an example of round robin assignment in illustrated in FIG. 27A, where input row subset 2847.1 of parallelized process 2550.1 includes data block 2537.1, data block 2537.L+1, data block 2537.2L+1, and so on; where input row subset 2847.2 of parallelized process 2550.2 includes data block 2537.2, data block 2537.L+2, data block 2537.2L+2, and so on; etc.; where input row subset 2847.L of parallelized process 2550.L includes data block 2537.L, data block 2537.2L, data block 2537.3L, and so on.

In other embodiments, the assignment scheme 2719 corresponds to non-uniform assignment, for example, based on other factors where non-uniform distribution is favorable. An example embodiment of implementing a non-uniform assignment scheme 2719 is discussed in conjunction with FIGS. 28A-28E.

In some embodiments, the forwarding of data block by reference via row dispersal operator 2566 of FIG. 27A implements some or all features and/or functionality of row forwarding module 2610 and/or any other forwarding of rows (e.g. in conjunction with executing a join expression) and/or any other join forwarding as disclosed by U.S. Utility application Ser. No. 18/321,906, entitled "PROCESSING LEFT JOIN OPERATIONS VIA A DATABASE SYSTEM BASED ON FORWARDING INPUT", filed May 23, 1923, which is hereby incorporated herein by reference in its entirety and made part of the present U.S. Utility Patent Applications for all purposes.

In some embodiments, the forwarding of data block by reference via row dispersal operator 2566 of FIG. 27A implements some or all features and/or functionality of the forwarding of columns disclosed by U.S. Utility application Ser. No. 18/322,688, entitled "PROCESSING MULTI-COLUMN STREAMS DURING QUERY EXECUTION VIA A DATABASE SYSTEM", filed May 24, 1923, which is hereby incorporated herein by reference in its entirety and made part of the present U.S. Utility Patent Applications for all purposes.

Figure 27B:
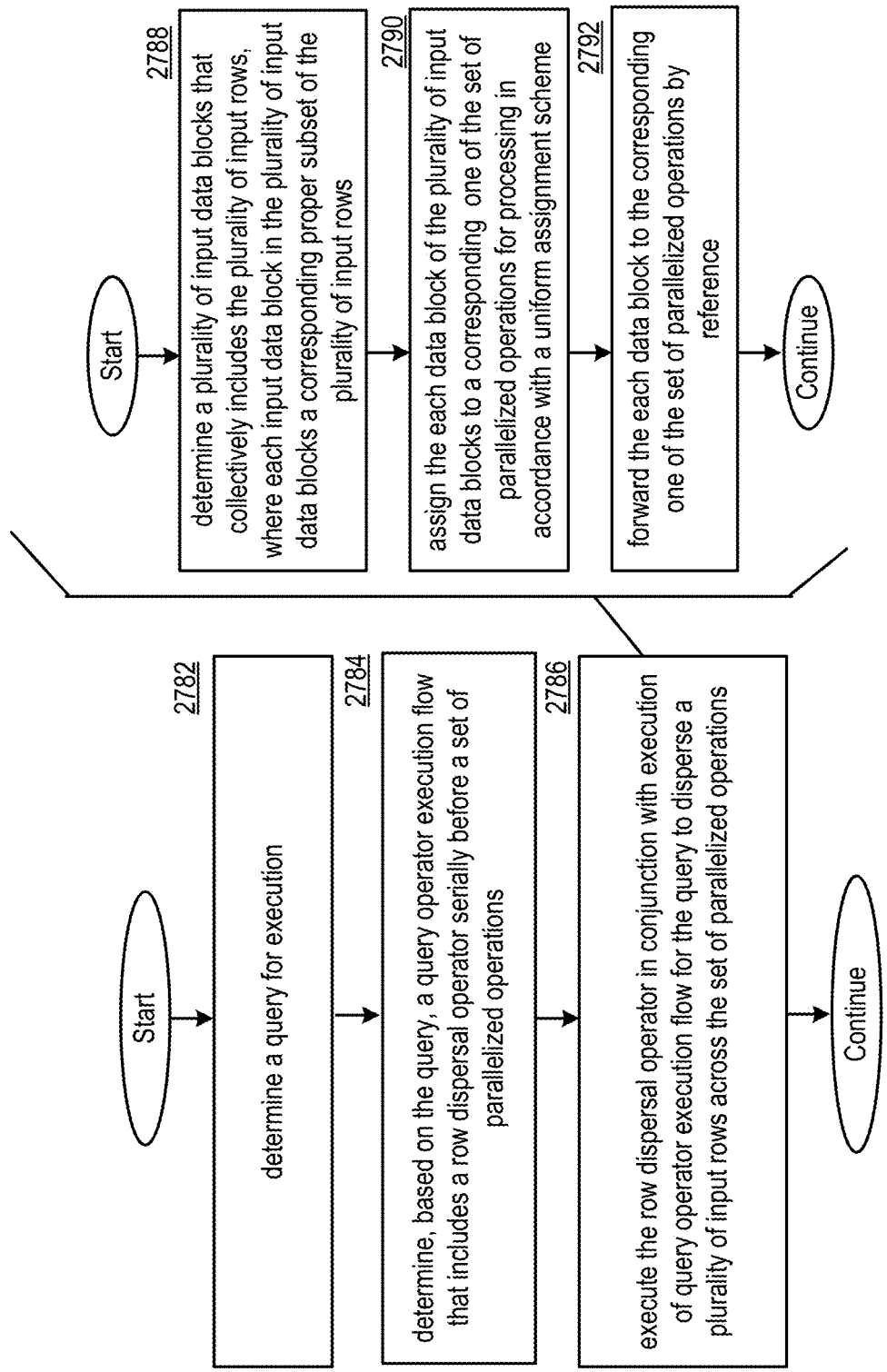
FIG. 27B is a logic diagram illustrating a method for execution in accordance with various embodiments.

FIG. 27B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27B. In particular, a node 37 can utilize the query processing module 2435 to execute some or all of the steps of FIG. 27B, where multiple nodes 37 implement their own query processing modules 2435 to independently execute the steps of FIG. 27B, for example, to facilitate execution of a query as participants in a query execution plan 2405. Some or all of the method of FIG. 27B can be performed by the query processing system 2510, for example, by utilizing an operator flow generator module 2514 and/or a query execution module 2504. In particular, some or all of the method of FIG. 27B can be performed via one or more operator executions of one or more row dispersal operators and/or one or more load operators 2535. Some or all of the steps of FIG. 27B can optionally be performed by any other processing module of the database system 10. Some or all of the steps of FIG. 27B can be performed to implement some or all of the functionality of the database system 10 as described in conjunction with FIGS. 27A, for example, by implementing some or all features and/or functionality of row dispersal operator 2566. Some or all of the steps of FIG. 26B can be performed to implement some or all of the functionality row dispersal operators implemented in executing queries by query processing system 2510 as described in conjunction with FIGS. 25A-25F. Some or all of the steps of FIG. 27B can be performed to implement some or all of the functionality regarding execution of a query via the plurality of nodes in the query execution plan 2405 as described in conjunction with some or all of FIGS. 24A-24I. Some or all steps of FIG. 27B can be performed by database system 10 in accordance with other embodiments of the database system 10 and/or nodes 37 discussed herein. Some or all steps of FIG. 27B can be performed in conjunction with one or more steps of FIG. 28E, and/or of any other method described herein.

Step 2782 includes determining a query for execution. Step 2784 includes determining, based on the query, a query operator execution flow that includes a row dispersal operator serially before a set of parallelized operations. Step 2786 includes executing the row dispersal operator in conjunction with execution of query operator execution flow for the query to disperse a plurality of input rows across the set of parallelized operations.

Performing step 2786 can include performing some or all of steps 2788, 2790, and/or 2792. Step 2788 includes determining a plurality of input data blocks that collectively includes the plurality of input rows, wherein each input data block in the plurality of input data blocks a corresponding proper subset of the plurality of input rows. Step 2790 includes assigning the each data block of the plurality of input data blocks to a corresponding one of the set of parallelized operations for processing in accordance with a uniform assignment scheme. Step 2792 includes forwarding the each data block to the corresponding one of the set of parallelized operations by reference.

In various examples, the plurality of input data blocks are stored in memory resources, and wherein the each data block is forwarded by reference based on sending a reference to a location of the each data block to the corresponding one of the set of parallelized operations.

In various examples, a plurality of proper subsets of the plurality of input data blocks are assigned across the set of parallelized operations in accordance with the uniform assignment scheme. In various examples, each of the set of parallelized operations is assigned a corresponding proper subset of the plurality of proper subsets of the plurality of input data blocks for processing. In various examples, a maximum difference in numbers of input data blocks assigned to different ones of the plurality of proper subsets falls below a threshold data block count difference based on assigning the plurality of input data blocks in accordance with the uniform assignment scheme.

In various examples, a plurality of proper subsets of the plurality of input rows are assigned across the set of parallelized operations. In various examples, the each of the set of parallelized operations is assigned a corresponding proper subset of the plurality of proper subsets of the plurality of input rows for processing based on the corresponding proper subset of the plurality of proper subsets of the plurality of input rows being a set union of input rows included across the corresponding proper subset of the plurality of proper subsets of the plurality of input data blocks assigned to the each of the set of parallelized operations. In various examples, a maximum difference in numbers of input rows assigned to different ones of the plurality of proper subsets falls below a threshold row count difference based on assigning the plurality of input data blocks in accordance with the uniform assignment scheme, and further based on an average per-block row difference across the plurality of input data blocks falling below a threshold per-block row difference.

In various examples, the method further includes generating the query operator execution flow based on selecting the row dispersal operator for execution in conjunction with selecting an arrangement of a plurality of operators for execution of the query.

In various examples, the row dispersal operation is selected for inclusion serially after a plurality of IO operators operable to read the plurality of input rows from storage resources based on determining an estimated cardinality of the plurality of input rows meets a low row cardinality condition.

In various examples, the row dispersal operation is selected for inclusion serially before the set of parallelized operations based on the set of parallelized operations implementing a plurality of parallelized load operators operable each to process a corresponding set of input rows.

In various examples, the plurality of parallelized load operators correspond to a least one of: a plurality of join operators operable to collectively execute a join operation; and/or a plurality of aggregation operators operable to collectively execute an aggregation operation.

In various examples, the query operator execution flow is executed via a plurality of nodes of a query execution plan, and wherein the set of parallelized operations are executed via a corresponding plurality of peer nodes of the query execution plan.

In various examples, the row dispersal operator is executed via a node of the plurality of nodes, and wherein the node is one of the corresponding plurality of peer nodes of the query execution plan that executes a corresponding one of the set of parallelized operations.

In various examples, each other one of the corresponding plurality of peer nodes of the query execution plan further execute a corresponding row dispersal operator upon their own corresponding plurality of input data blocks. In various examples, the node executes the corresponding one of the set of parallelized operations upon a first set of data blocks from the plurality of input data blocks local to the node for which the row dispersal operator of the node selects the corresponding one of the set of parallelized operations of the node for processing, and further upon a second set of data blocks non-local to the node, for which other corresponding row dispersal operators of other nodes select the corresponding one of the set of parallelized operations of the node for processing.

In various examples, the uniform assignment scheme is a round robin-based assignment scheme.

In various examples, the row dispersal operator is executed to process two consecutive data blocks in the plurality of input data blocks based on: assigning a first data block in the two consecutive data blocks to a first one of the set of parallelized operations; assigning a second data block in the two consecutive data blocks to a second one of the set of parallelized operations based on applying the round robin-based assignment scheme; and/or assigning an Lth data block in the two consecutive data blocks to an Lth one of the set of parallelized operations based on applying the round robin-based assignment scheme.

In various examples, the set of parallelized operations includes L operations, and the row dispersal operator is executed to a given ith data blocks in the plurality of input data blocks based on assigning the ith data block to a jth one of the set of parallelized operations, where the value of j is determined based on applying a modulo operation with the value of L as a divisor of the modulo operation and the value of i as a dividend of the operation. In various examples, based on applying the round robin-based assigned scheme, the value of j is set such that i=nL+j, where n is a positive integer value.

In various examples, the each data block includes a plurality of column values for the corresponding proper subset of the plurality of input rows determined based on accessing a set of relational database rows of a relational database system via at least one IO operator of the query operator execution flow.

In various examples, the plurality of input data blocks are stored in memory resources. In various examples, the each data block is forwarded by reference based on sending a reference to a location of the each data block in a corresponding column stream to the corresponding one of the set of parallelized operations. In various examples, the one of the set of parallelized operations processes the corresponding proper subset of plurality of input rows of the each data block based on accessing the plurality of column values for the corresponding proper subset of the plurality of input rows in the location based on the reference.

In various embodiments, any one of more of the various examples listed above are implemented in conjunction with performing some or all steps of FIG. 27B. In various embodiments, any set of the various examples listed above can be implemented in tandem, for example, in conjunction with performing some or all steps of FIG. 27B.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27B described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27B, for example, in conjunction with further implementing any one or more of the various examples described above.

In various embodiments, the operational instructions, when executed by the at least one processor, cause the database system to: determine a query for execution; determine, based on the query, a query operator execution flow that includes a row dispersal operator serially before a set of parallelized operations; and/or execute the row dispersal operator in conjunction with execution of query operator execution flow for the query to disperse a plurality of input rows across the set of parallelized operations. In various embodiments, executing the row dispersal operator in conjunction with execution of query operator execution flow for the query to disperse the plurality of input rows across the set of parallelized operations is based on determining a plurality of input data blocks that collectively includes the plurality of input rows, where each input data block in the plurality of input data blocks a corresponding proper subset of the plurality of input rows; assigning the each data block of the plurality of input data blocks to a corresponding one of the set of parallelized operations for processing in accordance with a uniform assignment scheme; and/or forwarding the each data block to the corresponding one of the set of parallelized operations by reference.

In various embodiments, a node of a database system includes at least one processor; and a memory that stores operational instructions that, when executed by the at least one processor, causes the node to execute a row dispersal operator in conjunction with execution of a query to disperse a plurality of input rows across a set of peer nodes based on: determining a plurality of input data blocks that collectively includes the plurality of input rows, wherein each input data block in the plurality of input data blocks a corresponding proper subset of the plurality of input rows; assigning the each data block of the plurality of input data blocks to a corresponding one of the set of peer nodes for processing in accordance with a uniform assignment scheme; and/or forwarding the each data block to the corresponding one of the set of peer nodes by reference. In various embodiments, the set of peer nodes includes the node.

FIGS. 28A-28E illustrate embodiments of a database system 10 operable to execute queries via implementing at least one row dispersal operator that disperses rows amongst a plurality of parallelized processes for execution by a corresponding set of load operators, for example, in accordance with performing load aware shuffle operations. Some or all features and/or functionality of FIGS. 28A-28E can be utilized to implement the join processes of some or all of FIGS. 25A-27H, and/or can be utilized to implement database system 10 of FIGS. 24A-24N when executing queries indicating parallelized processing of different portions of data (e.g. in accordance with a random dispersal) via any type of load operator. Some or all features and/or functionality of FIGS. 28A-28E can be utilized to implement any embodiment of the database system 10 described herein.

Some or all features and/or functionality of FIGS. 28A-28E can be utilized to implement the row dispersal operator 2566 of FIG. 27A, for example, based on forwarding data blocks by reference to disperse rows. However, while the embodiment of FIG. 27A discusses uniform distribution of data across parallelized operations via data block assignment module 2713, in some cases, it can be preferred to distribute data in accordance with a non-uniform distribution in some or all cases as illustrated by the data block random assignment module 2813 of FIG. 28A.

For example, uniform dispersal of data can add a significant networking penalty for queries where the total data volume is large. If each node has a relatively equal amount of data, which can be roughly equivalent to the total amount of work to do on a node, then optionally no data redistribution needs to occur. If random shuffle operators are able to detect this scenario and keep local data on the local node while still distributing data when an imbalance is detected, then load balancing across nodes can be achieved with minimal networking cost.

In some embodiments, each node and each shuffle operation within a node (e.g. operator execution module 3215 executing the corresponding node's row dispersal operator) has very limited knowledge of the state of every other node, and/or how much data is present on a given node. One embodiment of implementing load aware shuffles assumes that each peer has a roughly equal amount of local work to do (if it has any work at all), and will not distribute any data until a peer signals that it has no more local work by sending a corresponding signal/notification, such as an end of file (EOF) signal.

For each incoming block, the row dispersal operator 2566 can implement this load aware shuffle based on assigning a set of rows to a given peer (possibly itself) of a full set of peers (e.g. the set of nodes in a corresponding shuffle node set, and/or any set of parallelized processes 2550.1-2550.L implementing a corresponding set of load operators 2835) for processing by this given peer. Sending a given set of rows can include forwarding an entire block that includes a corresponding plurality of rows to a peer, or otherwise sending/assigning a corresponding one or more rows to the selected peer for processing via its load operator.

In some embodiments, the assigning of the set of rows to a given peer can be based on a weighted probability. The set of potential peers to which a given data block can be forwarded/assigned in accordance with a load aware random shuffle can corresponding to only the available peers (e.g. a set that corresponds to the union of itself, and all peers that have sent an eof signal or are otherwise determined to be available. As a particular example of computing the weighted probabilities, the probability of keeping a data block local (e.g. assignment to itself for processing) can be (total num peers−#peers that have sent an eof)/total num peers (e.g. the number of unavailable peers divided by the total number of peers). Alternatively or in addition, the probability of sending a block to any eof peer (e.g. any given available peer) can optionally be simply 1/total num peers. This weighting towards keeping data local can be favorable in preventing biasing data towards peers that have sent eofs, or have otherwise been deemed available.

For example, consider the case where there are 10 peers (e.g. L=10). Peer 1 has sent an eof signal, and each other peer processes 10 blocks. Each of the other 9 peers will keep 9/10 of their data blocks local while sending 1/10 to peer 0. This results in 9 blocks residing on all 10 peers with only 9/90 total blocks being sent across the network. With other embodiments where a round robin and/or uniformly random shuffle is utilized to disperse data blocks, there would still be 9 blocks on each peer, but 81/90 blocks would have been sent over the network.

Figure 28A:
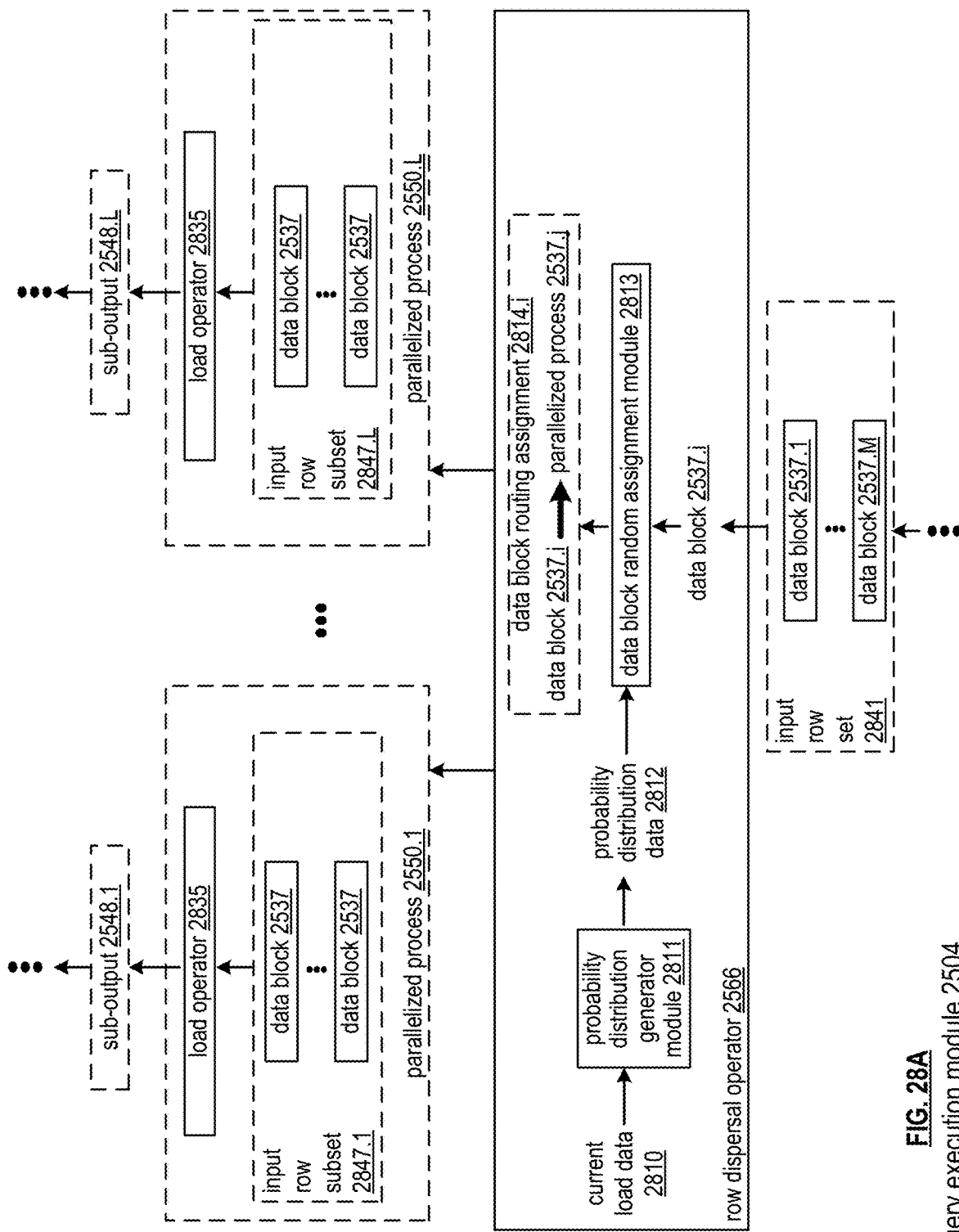
FIG. 28A is a schematic block diagram of a query execution module executing a row dispersal operator based on current load data in accordance with various embodiments.

FIG. 28A illustrates an embodiment of a row dispersal operator 2566 that selects generates a plurality of input row subsets 2847.1-2847.L to be processed via a plurality of parallelized processes 2550.1-2550.L. Some or all features and/or functionality of the row dispersal operator 2566 can implement the row dispersal operator 2566 of FIG. 25B and/or any embodiment of row dispersal and/or shuffling discussed herein.

Each of the plurality of input row subsets 2847.1-2847.L can include sets of rows in the form of one more of entire data blocks assigned for inclusion in the given input row subset 2847 for processing by the load operator of the corresponding parallelized process, where each data block includes one or more column values for each of a plurality of rows, such as column values for one or more columns. The data blocks 2537 of FIG. 28A can be implemented via some or all features and/or functionality of data blocks 2537 of one or more of FIGS. 24L-24N.

The plurality of input row subsets 2847.1-2847.L can be mutually exclusive and collectively exhaustive with respect to an input row set 2841. For example, each row, and/or each full data block 2537, can be sent to exactly one parallelized process for processing.

In some embodiments, the plurality of input row subsets 2847.1-2847.L can be implemented as the left input row subsets 2547.1-2547.L and/or right input row subsets 2557.1-2557.L sent to parallelized processes 2550 as discussed in conjunction with FIG. 25B, where the input row set 2841 includes left input row set 2541 and/or right input row set 2543, and/or where the load operator 2835 is implemented via join operator 2535. For example, the row dispersal operator 2566 and/or plurality of parallelized processes 2550.1-2550.L of FIG. 28A can optionally implement some or all of the features and/or functionality of performing joins via a plurality of parallelized processes 2550.1-2550.L, such as a plurality of outer parallelized processes 2553.1-2553.R in the case where the respective query operator execution flow of FIG. 28A implements some or all of a join process 2530.

Determining which parallelized process 2550.1-2550.L processes a given row can be based on implementing a data block random assignment module that selects a random and/or pseudorandom parallelized process 2537.$j$ to process a given data block 2537.$i$ in a corresponding data block routing assignment 2814.$i$.

In some embodiments, some or all functionality of row dispersal operator 2556 of FIG. 28A can be implemented via a corresponding operator execution module 3515 executing the row dispersal operator 2556, for example, as discussed in conjunction with FIG. 24J.

As discussed previously, while in some embodiments the data block routing assignment 2814.$i$ can be generated by data block random assignment module 2813 in accordance with a round-robin and/or random selection in accordance with a uniform distribution to disperse the incoming rows evenly, in other embodiments as illustrated in conjunction with FIGS. 28A-28E, the data block random assignment module 2813 can generate data block routing assignment 2814 for each incoming data block 2537 by applying probability distribution data 2812, which may denote a non-uniform probability distribution where probabilities of assigning data block to different parallelized processes is optionally non-equal.

In particular, a probability distribution generator module 2611 can generate the probability distribution data based on current load data 2810, for example, denoting which parallelized processes are available to process data blocks (e.g. where load operator has finished processing all of its their incoming data blocks or is otherwise available). The probability distribution data 2812 can be updated over time as the current load data 2810 is updated based on changing availability of load operators of various parallelized processes, where the probability distribution data 2812 is optionally different for some or all incoming data blocks 2537.

Figure 28B:
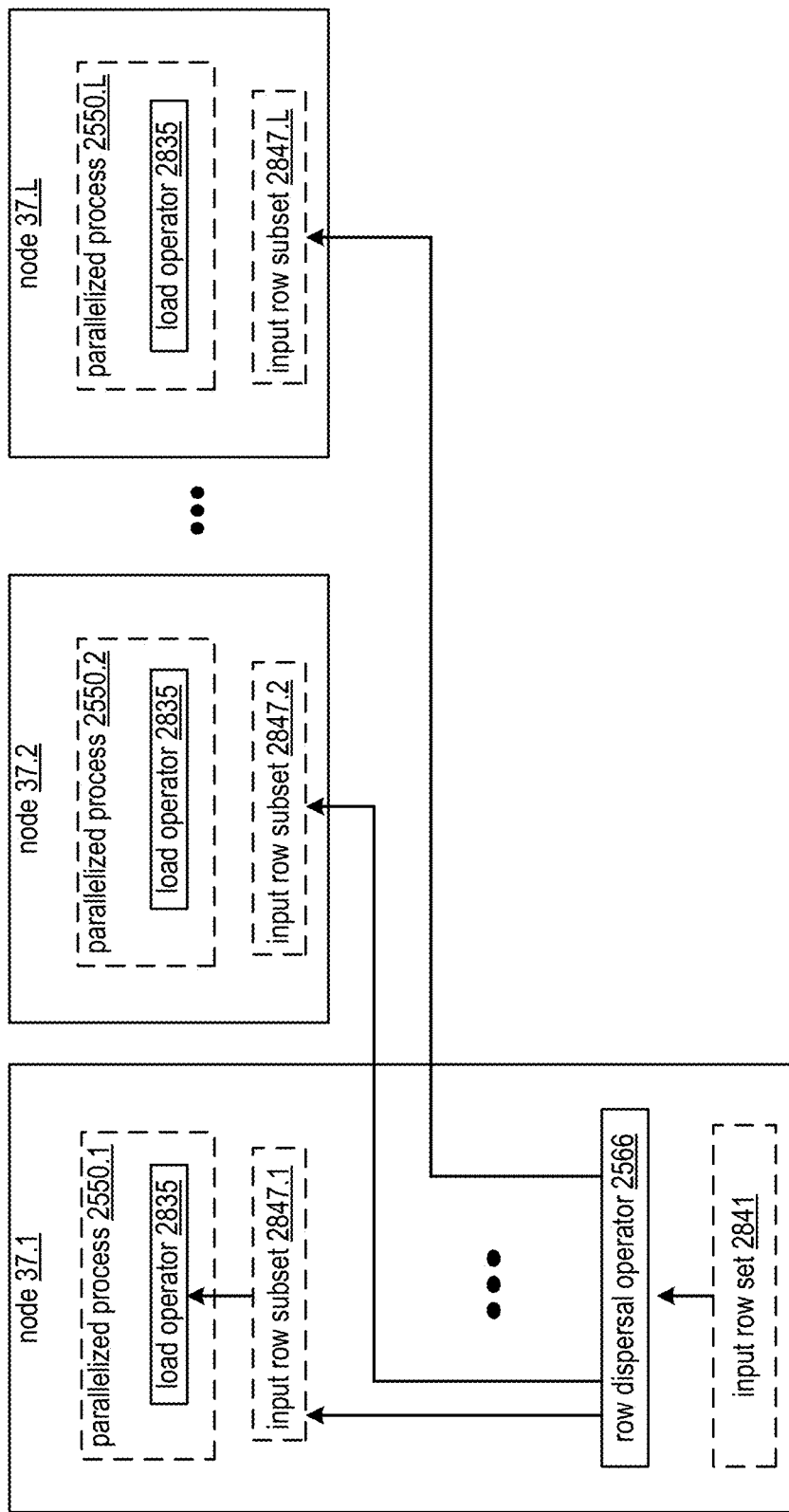
FIG. 28B is a schematic block diagram of a node dispersing data blocks across a set of nodes via a row dispersal operator in accordance with various embodiments.

FIG. 28B illustrates an embodiment where the plurality of parallelized processes implemented via a corresponding plurality of nodes 37.1-37.L. A given row dispersal operator 2566 can be implemented by a given one of these nodes 37.1 that implements parallelized process 2550.1 of the set of parallelized processes 2550.1-2550.L. Thus, the row dispersal operator 2566 of a given node 37.1 assigns some of its input row set 2841 for inclusion in the input row subset 2847.1 designated for processing by the parallelized process 2550.1 of this given node 37.1.

Some or all features and/or functionality of the row dispersal module 2566 and/or parallelized processes 2550.1-2550.L of FIG. 28B can implement the row dispersal module 2566 of FIG. 28A and/or any other embodiment of the row dispersal module described herein.

As used herein, assignment of processing of a data block by "itself" or "self" or "locally" can correspond to this case where the same processing resources (e.g. the same node) are utilized to process this given data block (e.g. rather than sending it to another node for processing). As used herein, the given input row set 2841 dispersed by a row dispersal operator 2566 executed by a given node 37 can be "local" to the given node 37, for example, based on the given node accessing the data blocks in its own memory resources (e.g. its own memory drives 2425) and/or based on the given node receiving/being forwarded these data block (e.g. from child IO nodes of a corresponding query execution plan 2405).

The set of nodes 37.1-37.L can be implemented via some or all features and/or functionality of a shuffle node set 2485 of FIG. 24E, for example, where the forwarding/sending of data blocks from node 37.1 to other nodes 37.2-37.L to other nodes is via communication resources, processing resources, and/or memory resources of a shuffle network 2480 of FIG. 24E. Some or all features and/or functionality of the load aware shuffling performed via the implementation of row dispersal module 2566 of FIGS. 28A-28E can implement any shuffle row sets 2485, any shuffle networks 2480, and/or any shuffling of rows described herein.

As described in further detail herein, the input row subset 2847.1 generated by node 37.1 can be expected and/or guaranteed to be larger than other input row subsets 2847.2-2847.L designated for processing by the other nodes 37.2-37.L, for example, based on the weighted probability for assignment of a given data block to the node itself being guaranteed to be greater than or equal to assignment of the given data block to other nodes, for example, for all incoming data blocks.

Figure 28C:
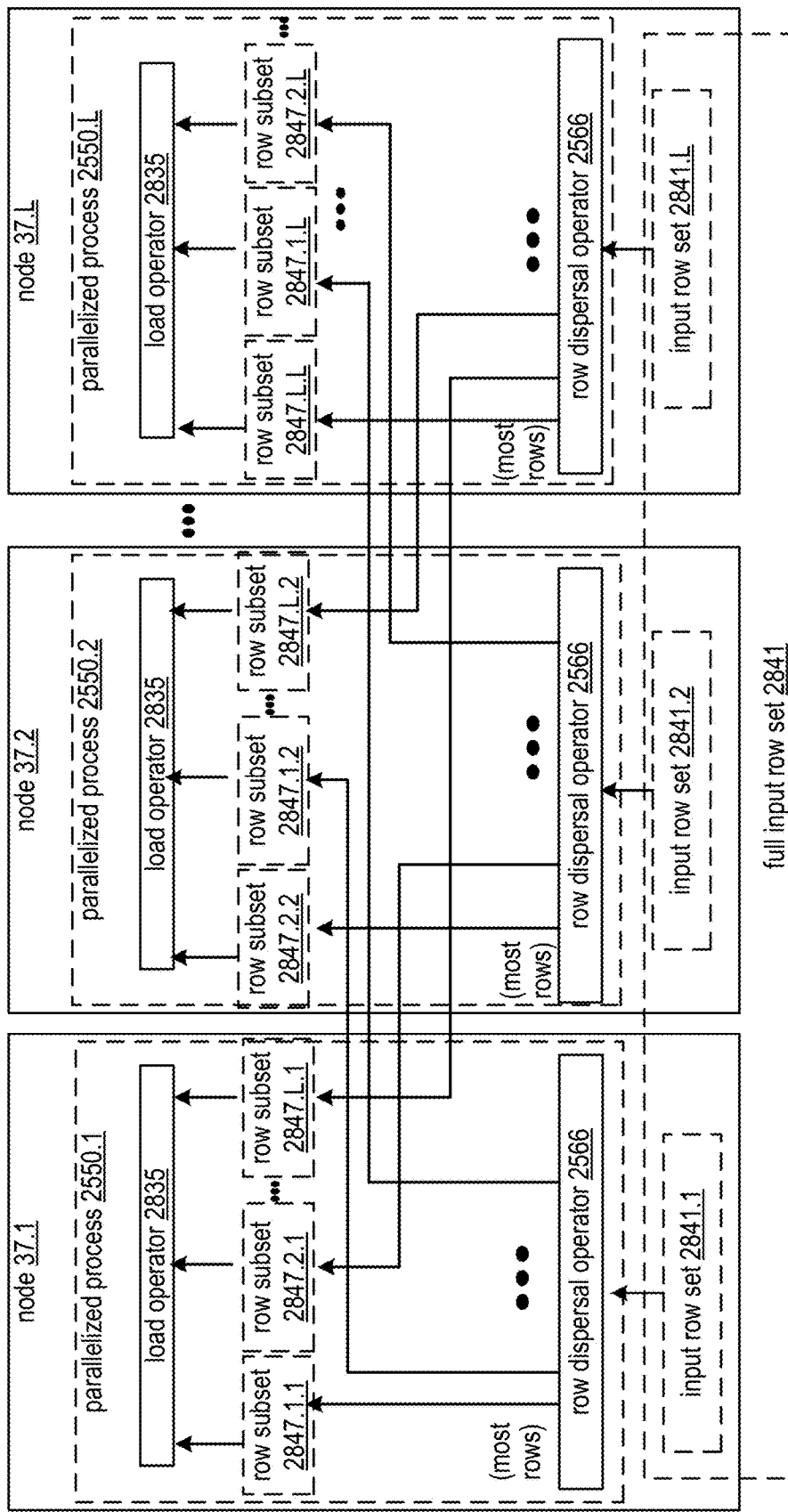
FIG. 28C is a schematic block diagram of a set of nodes node dispersing data blocks amongst each other via each implementing row dispersal operators in accordance with various embodiments.

FIG. 28C illustrates an embodiment where all nodes 37 in this set of nodes 37.1-37.L similarly implement this functionally themselves, for example, in accordance with all being members of a same shuffle node set collectively shuffling rows as discussed herein. Each node's row dispersal operator 2566 can process its own respective (e.g. local) one of a plurality of input row sets 2841.1-2841.L, which can be each be considered subset of a full input row set 2841 that collectively constitute this full input row set 2841, e.g. of a corresponding process such as a join process or other process that is divided across the parallelized processing resources 2550.1-2550.L via first performing a shuffle of inputs across these parallelized processing resources.

Some or all features and/or functionality of the set of nodes 37 of FIG. 28C can implement the row dispersal module 2566 of FIG. 28B and/or any other embodiment of the row dispersal module described herein.

The row subset generated by a given row dispersal operator 2566 designated for itself can be expected and/or guaranteed to be larger (e.g. have more rows/data blocks than) any other of its row subsets. This row subset generated by a given row dispersal operator 2566 designated for itself can thus be expected and/or guaranteed to constitute plurality of its input row set, and/or in some cases, optionally a majority of its input row set (e.g. have more rows/data blocks than all other row subsets combined)

As illustrated in FIG. 28C, as all nodes 37 collectively perform both the row dispersal and loading in parallel with other nodes, the parallelized processes 2550.1-2550.L of FIGS. 28A-28E and/or other parallelized processes described herein can optionally be considered to include both the performance of load operator 2835 and the row dispersal operator 2566 (e.g. despite the fact that the shuffling can thus introduce dependencies between the parallelized processes of the different nodes, rather than these parallelized processes being performed entirely independently of the parallelized processes of other nodes). For example, the row dispersal operator(s) of FIG. 25B can be implemented via such parallelized performance of row dispersal via a plurality of row dispersal operators executing upon different portions of the data as illustrated in conjunction with FIG. 28C.

Alternatively or in addition, the row dispersal module 2566 of a given node 37 and/or corresponding load operator 2835 of a corresponding parallelized process 2550 of the given node 37 can be implemented as and/or considered a same operator optionally implemented via a same operator execution module 3515. Alternatively or in addition, the parallelized processes 2550.1-2550.L (and/or a corresponding set of operator execution modules 3515.1-3515.L, each implementing the corresponding load operator and/or optionally the corresponding row dispersal module 2566 of the given node 37) can be considered lateral operators and/or peer operators, for example, based on collectively sharing/shuffling their data blocks as illustrated in FIG. 28C.

Figure 28D:
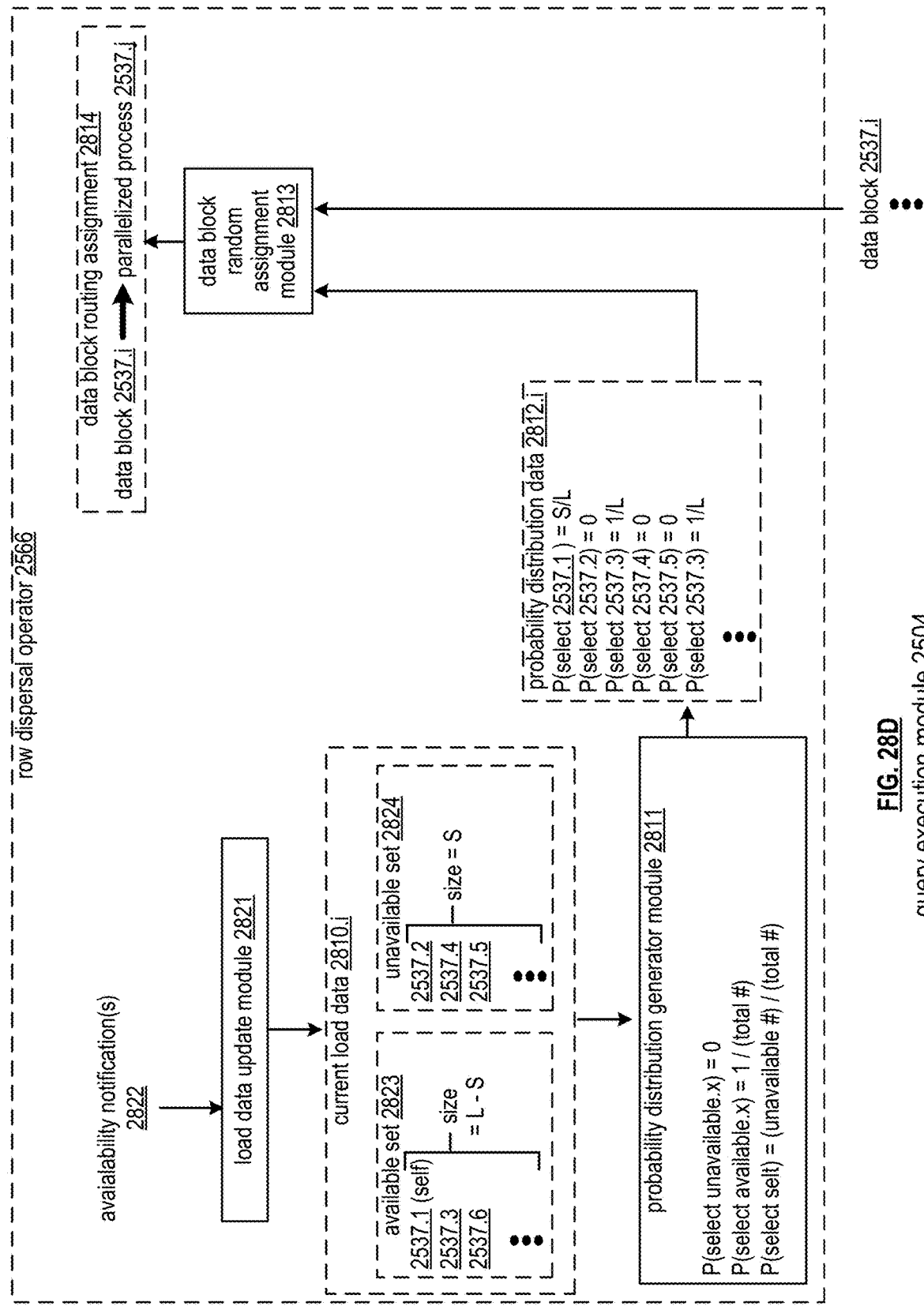
FIG. 28D is a schematic block diagram of a query execution module executing a row dispersal operator based on updating current load data in accordance with various embodiments.

FIG. 28D illustrates an embodiment of row dispersal module 2566 implementing an example probability distribution generator module based on example current load data 2810.i (e.g. the most recent version of the current load data 2810 utilized to generate the corresponding data block). Some or all features and/or functionality of the row dispersal module 2566 of FIG. 28D can implement the row dispersal module 2566 of FIG. 28A and/or any other embodiment of the row dispersal module described herein.

Current load data 2810 at a given time can indicate which parallelized processes 2537 (e.g. corresponding nodes 37) are available vs. unavailable. In some embodiments, the load data update module 2821 can update nodes as being unavailable to available based on receiving availability notifications 2822 from the respective parallelized processes 2537 (e.g. via corresponding operator execution modules 3515 via corresponding nodes 37, for example, via communication resources of shuffle network 2480 and/or other communication resources). The availability notifications 2822 can be implemented as EOF signals or other types of notifications denoting availability. In such cases, a given process can be presumed to be unavailable until availability notification 2822 is received. Alternatively, other information (e.g. rather than receiving data from the other processes directly) can be utilized to estimate/determine whether other processes 2537 are available (e.g. estimated load, estimated amount of time to process the load, prior measurements from other query processing, etc.).

In this example, unavailable set 2824 includes S processes that includes at least the set of processes 2537.2, 2537.4, and/or 2537.5, and the available set 2823 includes L-S processes that includes at least the set of processes 2537.1 (i.e. itself), 2537.3, and/or 2537.6.

Probability distribution generator module 2811 can denote a predetermined means of assigning probabilities/weights to different nodes in generating corresponding probability distribution data 2812 as a function of their availability denoted in current load data. In this example, the probability distribution generator module 2811 is configured to: assign a probability of selection with a value of zero for each unavailable process; assign a probability of selection with a value of 1/total #processes (e.g. 1/L) for each available process; and/or assign a probability of selection with a value of (total ##processes-available #processes)/total # processes (e.g. S/L) to the given process itself.

Other schemes of assigning weights can be used in other embodiments. In some embodiments, the scheme can be selected based on: meeting network usage requirements (e.g. to minimize network usage induced by passing large numbers of rows between nodes); meeting data skew removal requirements (e.g. to ensure that sufficient shuffling is performed to remove data skew/handle low cardinality cases); and/or meeting even processing distribution requirements (e.g. to ensure that all nodes have relatively even load, and/or optionally uneven loads in the cases where some nodes process their data more quickly to ensure that nodes process their data in relatively similar amounts of time and/or are not waiting for data while other nodes are overloaded).

The data block random assignment module 2813 can select the parallelized process 2537.j based on applying the most recent probability distribution data 2812. This can include performing a weighted round robin process for multiple incoming data blocks, utilizing a random number generator and/or selecting the parallelized process 2537.j based on a randomly generated numeric value falling within a range assigned to the parallelized process 2537.j having a size proportional and/or as an increasing function of its assigned weight/probability, and/or other means of applying the probability distribution data 2812.

As the current load data updates overtime, the probability distribution generator module 2811 can be utilized to process new versions of the current load data to update the probability distribution data accordingly, for example, in accordance with the predetermined scheme by which the probability distribution generator module 2811 is configured to assign these weights/probabilities.

While not illustrated in FIG. 28D, in some embodiments, the load update module 2821 can optionally further utilize the data block routing assignment data 2814 to designate parallelized processes to which data blocks are assigned as being unavailable (e.g. as they are now processing the given data block). In such cases, the data block is deemed unavailable until an availability notification 2822 is again received from the node denoting it is again available (e.g. that is has finished processing of the given data block) and/or until a predetermined time window corresponding to an estimated time to process the data block has elapsed.

Note that while the current load data is designated as 2810.i in the example of FIG. 28D, the current load data is optionally not updated for every incoming data block, where a same version of current load data is optionally utilized to generate data block routing assignment data for multiple consecutive data blocks, for example, based on the current load data not changing during this longer time window.

The examples embodiments of determining probability distributions and dispersing data blocks accordingly discussed in FIGS. 28A-28D assumes that each peer is accomplishing approximately the same amount of work in the same amount of time. However one peer is processing the same amount of data faster and the shuffle eofs earlier, this could result in memory being skewed towards that peer. In some embodiments, this may be acceptable if the peer continues to accomplish work faster, but may not be desirable if the goal is to evenly distribute memory rather than distributing the amount of work a node has to do at that point in the query. In other embodiments, to evenly distribute memory while handling this case, the nodes implementing row dispersal operators can be operable to periodically broadcast the number of blocks that have been sent to their local parent operator. In such embodiments, each node implementing row dispersal operators can recalculate the probability of selecting any target peer for incoming blocks based on the block counts broadcasted by its peers.

Figure 28E:
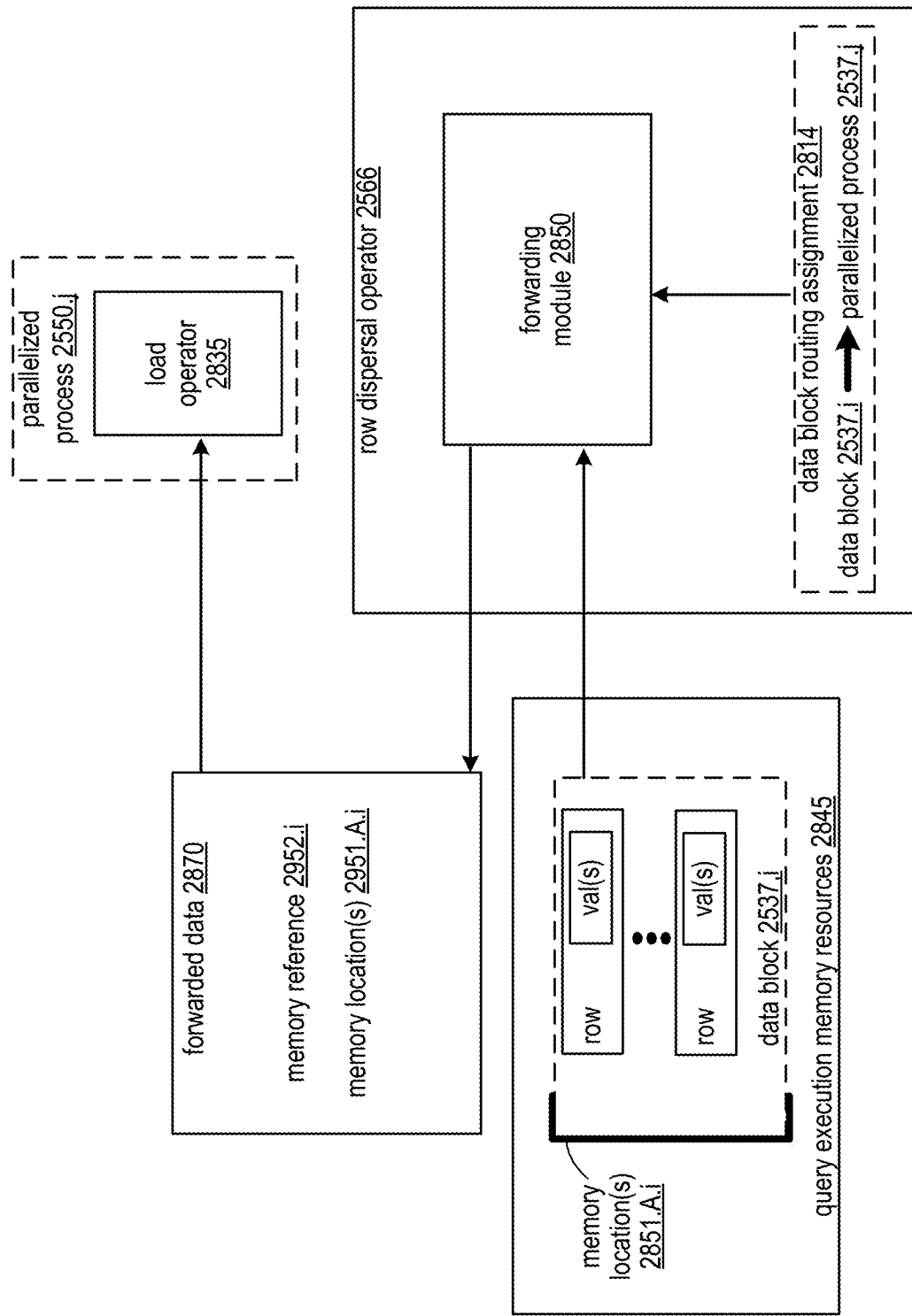
FIG. 28E is a schematic block diagram of a query execution module executing a row dispersal operator that implements a row forwarding module in accordance with various embodiments.

FIG. 28E illustrates an embodiment of a row dispersal operator that implements a forwarding module 2850 that assigns a given data block 2537.i to a given parallelized process 2550.j based on passing a memory reference 2952 denoting a memory location of the given data block 2537.i in query execution memory resources 2845 in forwarded data 2870 communicated to the parallelized process 2537.j (e.g. to implement "forwarding" the data block to the parallelized process 2537.j). Some or all features and/or functionality of FIG. 28E can implement the row dispersal operator 2566 of FIGS. 28A-28D and/or can implement any performance of shuffle operators and/or transfer/shuffling of data between operators described herein.

As discussed in conjunction with FIGS. 28A-28D, the row dispersal operator can assign entire data blocks, rather than individual rows, to processes 2537 for processing. This can be preferred over the case of sending/assigning each individual row to a given process 2537, even in cases where the shuffling is performed in accordance with a round-robin scheme/uniform distribution. In particular, rather than the row dispersal operator processing each row individually, which could require the expensive process of copying all input rows, the full data blocks containing a plurality of rows can be assigned to the processes 2537. This functionality can be particularly ideal by enabling the forwarding of a reference to the data (e.g. a pointer/memory location data to its storage location in memory resources), rather than copying it, which can be significantly faster and/or can require less processing and/or memory resources than copying all the rows. This solution can further be useful in cases where random and/or even shuffling of data blocks across different processes is required to handle data skew/low cardinality, for example, because the number of data blocks can be guaranteed and/or expected to be high enough (and the contents can be known and/or expected to be evenly distributed enough) that the weighted, load based assignment (or optionally the simple round robin based/uniform assignment) of such larger units suffices.

The given data block 2537.i can be stored in query execution memory resources 2845, for example, based on being stored in a corresponding column stream generated via retrieval and/or processing of relational database rows stored in memory as discussed in conjunction with some or all of FIGS. 24K-24N. The query execution memory resources 2845 storing the given data block 2537.i can correspond to memory resources of the given node processing this data block as input to its row dispersal module 2566 and/or any memory resources utilized to execute queries that are optionally shared by/accessible by nodes in a same shuffle node set to enable other nodes to access the given memory location, given the memory reference, to process the respective column values as needed.

The forwarded data 2870 can be sent to/communicated to/accessible by the parallelized process 2550 for receipt/access by the parallelized process 2550, for example, based on being sent to the corresponding node via communication resources of shuffle network 2480 and/or based on being stored in memory resources accessible by the node.

In some embodiments, while not depicted in FIG. 28E, the forwarded data 2870 denoting memory reference 2952 can optionally be included in a new data block 2537 of same or different size. The new data block 2537 can optionally include multiple other memory references to other data blocks assigned to the load operator of the given parallelized process for processing. The new data block can be stored in the same or different query execution memory resources 2845 for access by the corresponding process 2537.j/the corresponding node, in a different location from the given data block 2537.i, for example, as a newly created output data block in a similar fashion as illustrated in FIG. 24N that included memory reference data rather than column values copied from the data block 2537.i. The new data block can alternatively be sent/communicated directly to the corresponding process 2537.j/the corresponding node via communication resources (e.g. shuffle network 2480).

Figure 28F:
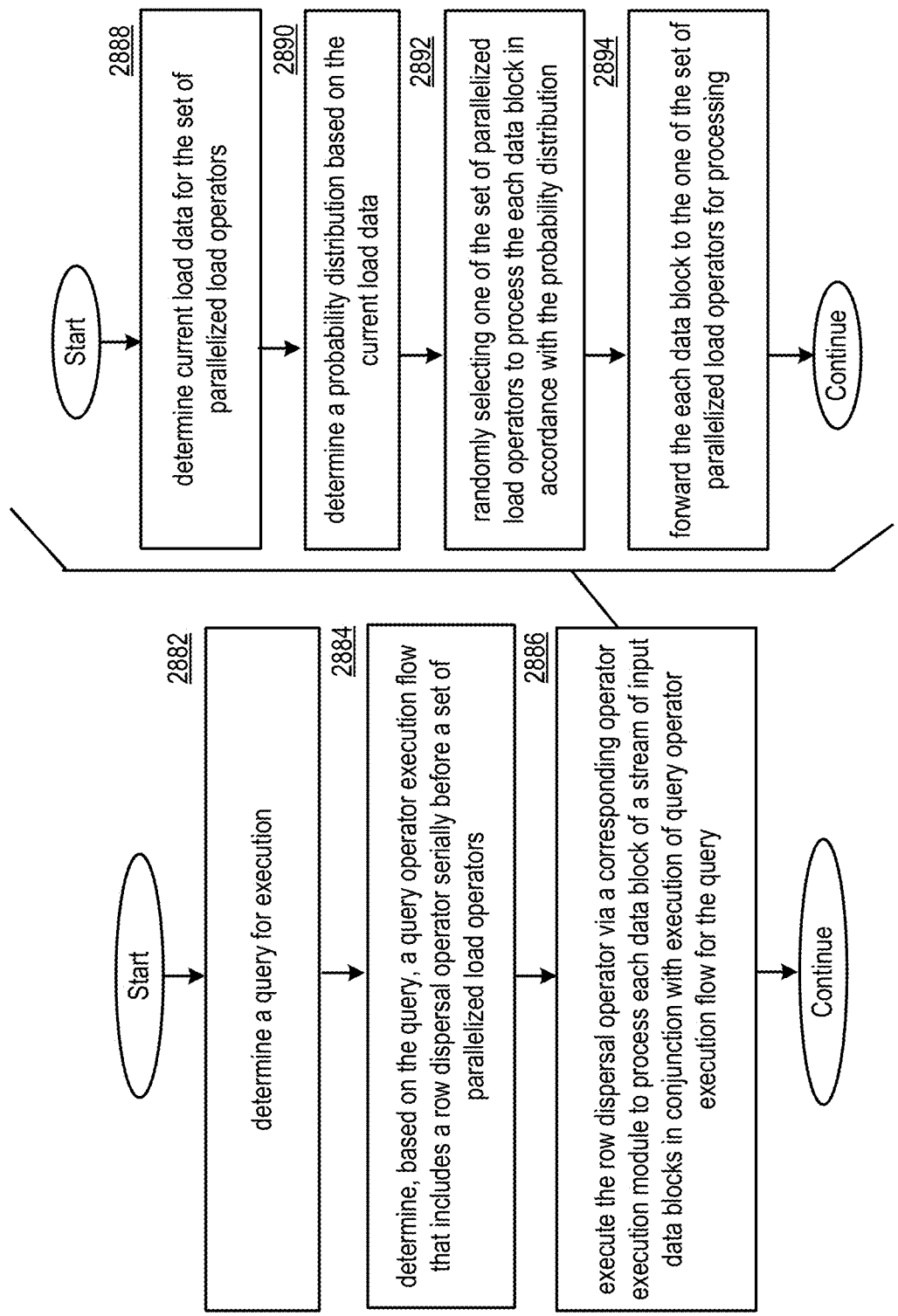
FIG. 28F is a logic diagram illustrating a method for execution in accordance with various embodiments.

FIG. 28F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28F. In particular, a node 37 can utilize the query processing module 2435 to execute some or all of the steps of FIG. 28F, where multiple nodes 37 implement their own query processing modules 2435 to independently execute the steps of FIG. 28F, for example, to facilitate execution of a query as participants in a query execution plan 2405. Some or all of the method of FIG. 28F can be performed by the query processing system 2510, for example, by utilizing an operator flow generator module 2514 and/or a query execution module 2504. In particular, some or all of the method of FIG. 28F can be performed via one or more operator executions of one or more row dispersal operators and/or one or more load operators 2535. Some or all of the steps of FIG. 28F can optionally be performed by any other processing module of the database system 10. Some or all of the steps of FIG. 28F can be performed to implement some or all of the functionality of the database system 10 as described in conjunction with FIGS. 28A-28E, for example, by implementing some or all of the functionality of row dispersal operators in queries executed by query processing system 2510 as described in conjunction with FIGS. 25A-27H. Some or all of the steps of FIG. 28F can be performed to implement some or all of the functionality regarding execution of a query via the plurality of nodes in the query execution plan 2405 as described in conjunction with some or all of FIGS. 24A-24I. Some or all steps of FIG. 28F can be performed by database system 10 in accordance with other embodiments of the database system 10 and/or nodes 37 discussed herein. Some or all steps of FIG. 28F can be performed in conjunction with one or more steps of FIG. 27B, and/or of any other method described herein.

Step 2882 includes determining a query for execution. Step 2884 includes determining, based on the query, a query operator execution flow that includes a row dispersal operator serially before a set of parallelized load operators. Step 2886 includes executing the row dispersal operator via a corresponding operator execution module to process each data block of a stream of input data blocks s in conjunction with execution of query operator execution flow for the query based on, for each data block of the stream of input data blocks. In various examples, executing the row dispersal operator via the corresponding operator execution module renders dispersal of the stream of input data blocks to the set of parallelized load operators for processing by the set of parallelized load operators in conjunction with further execution of the query.

Performing step 2886 can include performing some or all of steps 2888-2894. In various example, some or all of steps 2888-2894 are performed for each data block in conjunction with processing each data block, and/or some or all of steps 2888-2894 can be repeated a plurality of times to process the full stream of input data blocks.

Step 2888 includes determining current load data for the set of parallelized load operators. Step 2890 includes determining a probability distribution based on the current load data. In various examples, the probability distribution indicates, for each of the set of parallelized load operators, a corresponding one of a set of probabilities of selection.

Step 2892 includes randomly selecting one of the set of parallelized load operators to process the each data block in accordance with the probability distribution. Step 2894 includes forwarding the each data block to the one of the set of parallelized load operators for processing.

In various examples, the query operator execution flow is executed via a plurality of nodes of a query execution plan. In various examples, the set of parallelized load operators are executed via a corresponding plurality of peer nodes of the query execution plan.

In various examples, the row dispersal operator is executed via a node of the plurality of nodes. In various examples, the node is one of the plurality of peer nodes of the query execution plan that executes a corresponding one of the set of parallelized load operators.

In various examples, for all data blocks of the stream of input data blocks, the corresponding one of the set of probabilities for the one of the set of parallelized load operators executed by the node is one of: greater than all other probabilities of the set of probabilities, or equal to all other probabilities of the set of probabilities.

In various examples, each other one of the plurality of peer nodes of the query execution plan further execute a corresponding row dispersal operator upon their own corresponding stream of input data blocks, and wherein the node executes the corresponding one of the set of parallelized load operators upon a first set of data blocks from the stream of input data blocks local to the node for which the row dispersal operator of the node selects the corresponding one of the set of parallelized load operators of the node for processing, and further upon a second set of data blocks non-local to the node, for which other corresponding row dispersal operators of other nodes select the corresponding one of the set of parallelized load operators of the node for processing.

In various examples, the probability distribution is a non-uniform distribution based at least one of the set of probabilities being different from at least one other one of the set of probabilities.

In various examples, the row dispersal operator is executed to process two consecutive data blocks in the stream of input data blocks based on processing a first data block in the two consecutive data blocks based on determining a first probability distribution based on first current load data. In various examples, a first one of the set of parallelized load operators is selected to process the first data block in accordance with the first probability distribution. In various examples, the row dispersal operator is executed to process the two consecutive data blocks in the stream of input data blocks further based on processing a second data block in the two consecutive data blocks based on determining a second probability distribution based on second current load data. In various examples, a second one of the set of parallelized load operators is selected to process the second data block in accordance with the second probability distribution. In various examples, a second set of probabilities of the second probability distribution is different from a first set of probabilities of the first probability distribution based on the second current load data being different from the first current load data.

In various examples, determining the current load data for the set of parallelized load operators is based on determining a subset of parallelized load operators of the set of parallelized load operators that have completed processing of previously received data blocks in the stream of input data blocks.

In various examples, determining the subset of parallelized load operators is based on receiving a signal, denoting the completed processing, sent by operator execution modules implementing the ones of the set of parallelized load operators.

In various examples, the set of probabilities of selection include probabilities of zero assigned to all of the parallelized load operators in a set difference between the set of parallelized load operators and the subset of parallelized load operators. In various examples, a subset of probabilities in the set of probabilities corresponding to the subset of parallelized load operators sum to one.

In various examples, the set of probabilities of selection include a first non-zero probability assigned to a first one of the subset of parallelized load operators. In various examples, the set of probabilities of selection include a second non-zero probability assigned to all remaining ones of the subset of parallelized load operators. In various examples, the second non-zero probability is less than or equal to the first non-zero probability.

In various examples, each data block includes a plurality of column values for a plurality of rows determined based on accessing a set of relational database rows of a relational database system via at least one IO operator of the query operator execution flow.

In various examples, the stream of input data blocks are stored in memory resources, and wherein the each data block is forwarded based on sending a reference to a location of the each data block in the column stream to the one of the set of parallelized load operators. In various examples, the one of the set of parallelized load operators processes the plurality of rows of the each data block based on accessing the plurality of column values for the plurality of rows in the location based on the reference. In various examples, the each data block is forwarded based on otherwise sending/routing the plurality of column values for the plurality of rows to the one of the set of parallelized load operators.

In various embodiments, any one of more of the various examples listed above are implemented in conjunction with performing some or all steps of FIG. 28F. In various embodiments, any set of the various examples listed above can implemented in tandem, for example, in conjunction with performing some or all steps of FIG. 28F.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28F, for example, in conjunction with further implementing any one or more of the various examples described above.

In various embodiments, the operational instructions, when executed by the at least one processor, cause the database system to: determine a query for execution; determine, based on the query, a query operator execution flow that includes a row dispersal operator serially before a set of parallelized load operators; and/or execute the row dispersal operator via a corresponding operator execution module to processes a stream of input data blocks in conjunction with execution of query operator execution flow for the query. Executing the row dispersal operator via a corresponding operator execution module to processes the stream of input data blocks in conjunction with execution of query operator execution flow for the query can be based on, for each data block of the stream of input data blocks: determining current load data for the set of parallelized load operators; determining a probability distribution based on the current load data indicating, for each of the set of parallelized load operators, a corresponding one of a set of probabilities of selection; randomly selecting one of the set of parallelized load operators to process the each data block in accordance with the probability distribution; and/or forwarding the each data block to the one of the set of parallelized load operators for processing.

In various embodiments, a node of a database system includes: at least one processor; and/or a memory that stores operational instructions that, when executed by the at least one processor, causes the node to: execute a row dispersal operator via a corresponding operator execution module to disperse a stream of input data blocks to a set of parallelized load operators in conjunction with execution of a corresponding query based on, for each data block of the stream of input data blocks: determining current load data for a set of parallelized load operators; determining a probability distribution based on the current load data indicating, for each of a set of parallelized load operators executed by a set of peer nodes, a corresponding one of a set of probabilities of selection; randomly selecting one of the set of parallelized load operators to process the each data block in accordance with the probability distribution; and/or forwarding the each data block to the one of the set of parallelized load operators for processing. In various examples, the set of peer nodes includes the node.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining $-A$ matches $-B$ or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   determining a query for execution;
   determining, based on the query, a query operator execution flow that includes a row dispersal operator serially before a set of parallelized operations; and
   executing the row dispersal operator in conjunction with execution of query operator execution flow for the query to disperse a plurality of input rows across the set of parallelized operations based on:
      determining a plurality of input data blocks that collectively includes the plurality of input rows, wherein each data block in the plurality of input data blocks includes a corresponding proper subset of the plurality of input rows;
      assigning the each data block of the plurality of input data blocks to a corresponding one of the set of parallelized operations for processing in accordance with a uniform assignment scheme; and
      forwarding the each data block to the corresponding one of the set of parallelized operations by reference;
   wherein a plurality of proper subsets of the plurality of input data blocks are assigned across the set of parallelized operations in accordance with the uniform assignment scheme, wherein each of the set of parallelized operations is assigned a corresponding proper subset of the plurality of proper subsets of the plurality of input data blocks for processing, and wherein a maximum difference in numbers of input data blocks assigned to different ones of the plurality of proper subsets falls below a threshold data block count difference based on assigning the plurality of input data blocks in accordance with the uniform assignment scheme; and
   wherein a plurality of proper subsets of the plurality of input rows are assigned across the set of parallelized operations, wherein the each of the set of parallelized operations is assigned a corresponding proper subset of the plurality of proper subsets of the plurality of input rows for processing based on the corresponding proper subset of the plurality of proper subsets of the plurality of input rows being a set union of input rows included across the corresponding proper subset of the plurality of proper subsets of the plurality of input data blocks assigned to the each of the set of parallelized operations, and wherein a maximum difference in numbers of input rows assigned to different ones of the plurality of proper subsets falls below a threshold row count difference based on assigning the plurality of input data blocks in accordance with the uniform assignment scheme, and further based on an average per-block row difference across the plurality of input data blocks falling below a threshold per-block row difference.

2. The method of claim 1, wherein the plurality of input data blocks are stored in memory resources, and wherein the each data block is forwarded by reference based on sending a reference to a location of the each data block to the corresponding one of the set of parallelized operations.

3. The method of claim 1, further comprising:
   generating the query operator execution flow based on selecting the row dispersal operator for execution in conjunction with selecting an arrangement of a plurality of operators for execution of the query.

4. The method of claim 3, wherein the row dispersal operation is selected for inclusion serially after a plurality of IO operators operable to read the plurality of input rows from storage resources based on determining an estimated cardinality of the plurality of input rows meets a low row cardinality condition.

5. The method of claim 3, wherein the row dispersal operation is selected for inclusion serially before the set of parallelized operations based on the set of parallelized operations implementing a plurality of parallelized load operators operable each to process a corresponding set of input rows.

6. The method of claim 5, wherein the plurality of parallelized load operators correspond to a least one of:
   a plurality of join operators operable to collectively execute a join operation; or
   a plurality of aggregation operators operable to collectively execute an aggregation operation.

7. The method of claim 1, wherein the query operator execution flow is executed via a plurality of nodes of a query execution plan, and wherein the set of parallelized operations are executed via a corresponding plurality of peer nodes of the query execution plan.

8. The method of claim 7, wherein the row dispersal operator is executed via a node of the plurality of nodes, and wherein the node is one of the corresponding plurality of peer nodes of the query execution plan that executes a corresponding one of the set of parallelized operations.

9. The method of claim 8, wherein each other one of the corresponding plurality of peer nodes of the query execution plan further execute a corresponding row dispersal operator upon their own corresponding plurality of input data blocks, and wherein the node executes the corresponding one of the set of parallelized operations upon a first set of data blocks from the plurality of input data blocks local to the node for which the row dispersal operator of the node selects the corresponding one of the set of parallelized operations of the node for processing, and further upon a second set of data blocks non-local to the node, for which other corresponding row dispersal operators of other nodes select the corresponding one of the set of parallelized operations of the node for processing.

10. The method of claim 1, wherein the uniform assignment scheme is a round robin-based assignment scheme.

11. The method of claim 10, wherein the row dispersal operator is executed to process two consecutive data blocks in the plurality of input data blocks based on:
   assigning a first data block in the two consecutive data blocks to a first one of the set of parallelized operations; and
   assigning a second data block in the two consecutive data blocks to a second one of the set of parallelized operations based on applying the round robin-based assignment scheme.

12. The method of claim 1, wherein the each data block includes a plurality of column values for the corresponding proper subset of the plurality of input rows determined based on accessing a set of relational database rows of a relational database system via at least one IO operator of the query operator execution flow.

13. The method of claim 12, wherein the plurality of input data blocks are stored in memory resources, wherein the each data block is forwarded by reference based on sending a reference to a location of the each data block in a corresponding column stream to the corresponding one of the set of parallelized operations, and wherein the one of the set of parallelized operations processes the corresponding proper subset of plurality of input rows of the each data block based on accessing the plurality of column values for the corresponding proper subset of the plurality of input rows in the location based on the reference.

14. A node of a database system includes:
   at least one processor; and
   a memory that stores operational instructions that, when executed by the at least one processor, causes the node to:
   executing a row dispersal operator in conjunction with execution of a query to disperse a plurality of input rows across a set of peer nodes based on:
      determining a plurality of input data blocks that collectively includes the plurality of input rows, wherein each data block in the plurality of input data blocks includes a corresponding proper subset of the plurality of input rows;
      assigning the each data block of the plurality of input data blocks to a corresponding one of the set of peer nodes for processing in accordance with a uniform assignment scheme; and
      forwarding the each data block to the corresponding one of the set of peer nodes by reference;
   wherein a plurality of proper subsets of the plurality of input data blocks are assigned across the set of peer nodes in accordance with the uniform assignment scheme, wherein each of the set of peer nodes is assigned a corresponding proper subset of the plurality of proper subsets of the plurality of input data blocks for processing, and wherein a maximum difference in numbers of input data blocks assigned to different ones of the plurality of proper subsets falls below a threshold data block count difference based on assigning the plurality of input data blocks in accordance with the uniform assignment scheme; and
   wherein a plurality of proper subsets of the plurality of input rows are assigned across the set of peer nodes, wherein the each of the set of peer nodes is assigned a corresponding proper subset of the plurality of proper subsets of the plurality of input rows for processing based on the corresponding proper subset of the plurality of proper subsets of the plurality of input rows being a set union of input rows included across the corresponding proper subset of the plurality of proper subsets of the plurality of input data blocks assigned to the each of the set of parallelized operations, and wherein a maximum difference in numbers of input rows assigned to different ones of the plurality of proper subsets falls below a threshold row count difference based on assigning the plurality of input data blocks in accordance with the uniform assignment scheme, and further based on an average per-block row difference across the plurality of input data blocks falling below a threshold per-block row difference.

15. The node of claim 14, wherein the set of peer nodes includes the node.

16. A database system includes:
   at least one processor; and
   a memory that stores operational instructions that, when executed by the at least one processor, causes the database system to:
   determine a query for execution;
   determine, based on the query, a query operator execution flow that includes a row dispersal operator serially before a set of parallelized operations; and
   execute the row dispersal operator in conjunction with execution of query operator execution flow for the query to disperse a plurality of input rows across the set of parallelized operations based on:
      determine a plurality of input data blocks that collectively includes the plurality of input rows, wherein each data block in the plurality of input data blocks includes a corresponding proper subset of the plurality of input rows;
      assign the each data block of the plurality of input data blocks to a corresponding one of the set of parallelized operations for processing in accordance with a uniform assignment scheme; and
      forward the each data block to the corresponding one of the set of parallelized operations by reference;
   wherein a plurality of proper subsets of the plurality of input data blocks are assigned across the set of parallelized operations in accordance with the uniform assignment scheme, wherein each of the set of parallelized operations is assigned a corresponding proper subset of the plurality of proper subsets of the plurality of input data blocks for processing, and wherein a maximum difference in numbers of input data blocks assigned to different ones of the plurality of proper subsets falls below a threshold data block count difference based on assigning the plurality of input data blocks in accordance with the uniform assignment scheme; and
   wherein a plurality of proper subsets of the plurality of input rows are assigned across the set of parallelized operations, wherein the each of the set of parallelized operations is assigned a corresponding proper subset of the plurality of proper subsets of the plurality of input rows for processing based on the corresponding proper subset of the plurality of proper subsets of the plurality of input rows being a set union of input rows included across the corresponding proper subset of the plurality of proper subsets of the plurality of input data blocks assigned to the each of the set of parallelized operations, and wherein a maximum difference in numbers of input rows assigned to different ones of the plurality of proper subsets falls below a threshold row count difference based on assigning the plurality of input data blocks in accordance with the uniform assignment scheme, and further based on an average per-block row difference across the plurality of input data blocks falling below a threshold per-block row difference.

17. The database system of claim 16, wherein the plurality of input data blocks are stored in memory resources, and wherein the each data block is forwarded by reference based on sending a reference to a location of the each data block to the corresponding one of the set of parallelized operations.

* * * * *